(12) United States Patent
Zhang et al.

(10) Patent No.: US 11,252,436 B2
(45) Date of Patent: Feb. 15, 2022

(54) VIDEO PICTURE INTER PREDICTION METHOD AND APPARATUS, AND CODEC

(71) Applicant: Huawei Technologies Co., Ltd., Shenzhen (CN)

(72) Inventors: Na Zhang, Shenzhen (CN); Jianhua Zheng, Beijing (CN); Jicheng An, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/832,707

(22) Filed: Mar. 27, 2020

(65) Prior Publication Data

US 2020/0228830 A1 Jul. 16, 2020

Related U.S. Application Data

(63) Continuation of application No. PCT/CN2018/105148, filed on Sep. 12, 2018.

(30) Foreign Application Priority Data

Sep. 29, 2017 (CN) .......................... 201710912607.0

(51) Int. Cl.
 *H04N 19/00* (2014.01)
 *H04N 19/587* (2014.01)
 (Continued)

(52) U.S. Cl.
 CPC ......... *H04N 19/587* (2014.11); *H04N 19/137* (2014.11); *H04N 19/159* (2014.11); *H04N 19/176* (2014.11)

(58) Field of Classification Search
 CPC ................................ H04N 7/00; H04N 19/00
 See application file for complete search history.

(56) References Cited

U.S. PATENT DOCUMENTS

2011/0135000 A1\* 6/2011 Alshina ................ H04N 19/119
 375/240.13
2012/0183070 A1 7/2012 Pateux et al.
 (Continued)

FOREIGN PATENT DOCUMENTS

CN 102215388 A 10/2011
CN 103098467 A 5/2013
 (Continued)

OTHER PUBLICATIONS

Panusopone, K., et al., "Unequal Weight Planar Prediction and Constrained PDPC", XP030150550, Joint Video Exploration Team (JVET) of ITU-T SG 16 WP 3 and ISO/IEC JTC 1/SC 29/WG 11, JVET-E0068, 5th Meeting: Geneva, CH, Jan. 12-20, 2017, 6 pages.
 (Continued)

*Primary Examiner* — Maryam A Nasri
(74) *Attorney, Agent, or Firm* — Conley Rose, P.C.

(57) ABSTRACT

A video picture inter prediction method includes determining an inter prediction mode used to perform inter prediction on a current picture block, where the inter prediction mode is one mode in a candidate inter prediction mode set, and the candidate inter prediction mode set includes a plurality of inter prediction modes used for a non-directional motion field or a plurality of inter prediction modes used for a directional motion field, and performing inter prediction on the current picture block based on the determined inter prediction mode.

20 Claims, 24 Drawing Sheets

(51) Int. Cl.
*H04N 19/137* (2014.01)
*H04N 19/159* (2014.01)
*H04N 19/176* (2014.01)

(56) References Cited

U.S. PATENT DOCUMENTS

2016/0156932 A1* 6/2016 Lee .................. H04N 19/176
375/240.13
2017/0188041 A1 6/2017 Li et al.

FOREIGN PATENT DOCUMENTS

| | | |
|---|---|---|
| CN | 104539966 A | 4/2015 |
| CN | 104618714 A | 5/2015 |
| EP | 2242276 A2 | 10/2010 |
| EP | 2934013 A1 | 10/2015 |

OTHER PUBLICATIONS

Zhang, N., et al., "Planar Motion Vector Prediction", XP030151247, Joint Video Experts Team (JVET) of ITU-T SG 16 WP 3 and ISO/IEC JTC 1/SC 29/WG 11, JVET-J0061, 10th Meeting: San Diego, US, Apr. 10-20, 2018, 4 pages.

* cited by examiner

300

┌─────────────────────────────────────────────┐
│ Determine an inter prediction mode used to perform │
│ inter prediction on a current picture block, where the │
│ inter prediction mode is one mode in a candicate inter │ 301
│ prediction mode set, and the candidate inter prediction │
│ mode set includes a plurality of inter prediction modes │
│ used for a non-directional motion field and/or a │
│ plurality of inter prediction modes used for a │
│ directional motion field │
└─────────────────────────────────────────────┘
                      ↓
┌─────────────────────────────────────────────┐
│ Perform inter prediction on the current picture block │ 303
│ based on the determined inter prediction mode │
└─────────────────────────────────────────────┘

┌─────────────────────────────────────────────┐ 401
│ Decode a bitstream to obtain inter prediction data that │
│ includes a first identifier used to indicate whether to │
│ perform inter prediction on a current picture block by │
│ using a candidate inter prediction mode set │
└─────────────────────────────────────────────┘
                      ↓
┌─────────────────────────────────────────────┐ 403
│ When the inter prediction data instructs to predict the │
│ current picture block by using the candidate inter │
│ prediction mode set, determine an inter prediction mode │
│ used to perform inter prediction on the current picture │
│ block, where the inter prediction mode is one mode in │
│ the candidate inter prediction mode set │
└─────────────────────────────────────────────┘
                      ↓
┌─────────────────────────────────────────────┐ 405
│ Perform inter prediction on the current picture block │
│ based on the determined inter prediction mode │
└─────────────────────────────────────────────┘

| $P_{(0,0)}$ | $P_{(1,0)}$ | ... | ... | ... | ... | ... | $P_{(W-1,0)}$ | $R_{(W,0)}$ |
|---|---|---|---|---|---|---|---|---|
| $P_{(0,1)}$ | $P_{(1,1)}$ | ... | ... | ... | ... | ... | $P_{(W-1,1)}$ | $R_{(W,1)}$ |
| ⋮ | ⋮ | | | | | | ⋮ | ⋮ |
| ⋮ | ⋮ | | | | | | ⋮ | ⋮ |
| ⋮ | ⋮ | | | | | | ⋮ | ⋮ |
| ⋮ | ⋮ | | | | | | ⋮ | ⋮ |
| ⋮ | ⋮ | | | | | | ⋮ | ⋮ |
| $P_{(0,H-1)}$ | $P_{(1,H-1)}$ | ... | ... | ... | ... | ... | $P_{(W-1,H-1)}$ | $R_{(W,H-1)}$ |
| $R_{(0,H)}$ | $R_{(1,H)}$ | ... | ... | ... | ... | ... | $R_{(W-1,H)}$ | $R_{(W,H)}$ |

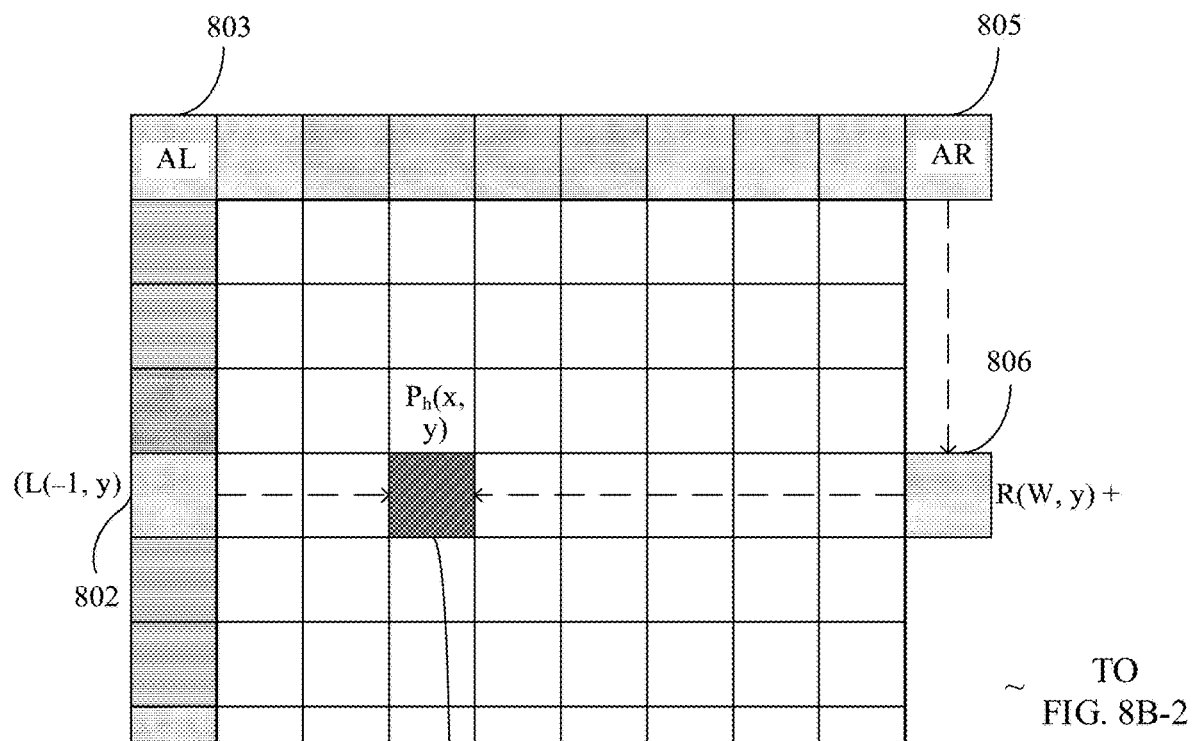
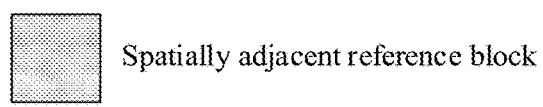
Spatially adjacent reference block
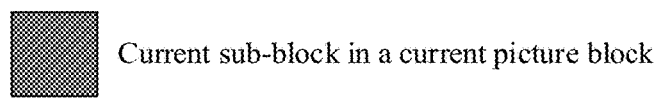
Current sub-block in a current picture block
FIG. 8C

VIDEO PICTURE INTER PREDICTION METHOD AND APPARATUS, AND CODEC

CROSS-REFERENCE TO RELATED APPLICATIONS

This application is a continuation of International Patent Application No. PCT/CN2018/105148, filed on Sep. 12, 2018, which claims priority to Chinese Patent Application No. 201710912607.0, filed on Sep. 29, 2017. The disclosures of the aforementioned applications are hereby incorporated by reference in their entireties.

TECHNICAL FIELD

This application relates to the field of video coding and decoding technologies, and in particular, to a video picture inter prediction method and apparatus, and a corresponding encoder and decoder.

BACKGROUND

Digital video capabilities can be incorporated into a wide variety of apparatuses, including digital televisions, digital live broadcast systems, wireless broadcast systems, personal digital assistants (PDA), laptop or desktop computers, tablet computers, e-book readers, digital cameras, digital recording apparatuses, digital media players, video game apparatuses, video game consoles, cellular or satellite radio phones (also referred to as "smartphones"), video conferencing apparatuses, video streaming apparatuses, and the like. Digital video apparatuses implement video compression technologies, for example, video compression technologies described in standards defined by MPEG-2, MPEG-4, ITU-T H.263, and ITU-T H.264/MPEG-4 part 10 advanced video coding (AVC), the video coding standard H.265/high efficiency video coding (HEVC) standard, and extensions of such standards. The video apparatuses can transmit, receive, encode, decode, and/or store digital video information more efficiently by implementing such video compression technologies.

The video compression technologies are used to perform spatial (intra-picture) prediction and/or temporal (inter-picture) prediction to reduce or remove inherent redundancy in video sequences. In block-based video coding, a video slice (that is, a video frame or a part of a video frame) may be partitioned into picture blocks, and the picture block may also be referred to as a tree block, a coding unit (CU), and/or a coding node. A picture block in a to-be-intra-coded (I) slice of a picture is coded through spatial prediction based on a reference sample in a neighboring block in the same picture. For a picture block in a to-be-inter-coded (P or B) slice of a picture, spatial prediction based on a reference sample in a neighboring block in the same picture or temporal prediction based on a reference sample in another reference picture may be used. The picture may be referred to as a frame, and the reference picture may be referred to as a reference frame.

Various video coding standards including an HEVC standard propose a predictive coding mode used for a picture block, in an embodiment, predicting a current to-be-encoded block based on an encoded video data block. In an intra prediction mode, a current block is predicted based on one or more previously decoded neighboring blocks in a same picture as the current block. In an inter prediction mode, a current block is predicted based on decoded blocks in different pictures.

However, several existing inter prediction modes, for example, a merge mode, a skip mode, and an advanced motion vector prediction mode (AMVP mode), still cannot meet motion vector prediction accuracy requirements of actual different application scenarios.

SUMMARY

Embodiments of this application provide a video picture inter prediction method and apparatus, and a corresponding encoder and decoder, to improve prediction accuracy of motion information of a picture block to some extent, thereby improving encoding and decoding performance.

According to a first aspect, an embodiment of this application provides a video picture inter prediction method, including determining an inter prediction mode used to perform inter prediction on a current picture block, where the inter prediction mode is one mode in a candidate inter prediction mode set, and the candidate inter prediction mode set includes a plurality of inter prediction modes used for a non-directional motion field and/or a plurality of inter prediction modes used for a directional motion field, and performing inter prediction on the current picture block based on the determined inter prediction mode.

In a feasible implementation, the performing inter prediction on the current picture block based on the determined inter prediction mode includes predicting motion information of one or more sub-blocks (which may specifically be each sub-block or all sub-blocks) in the current picture block based on the determined inter prediction mode, and performing inter prediction on the current picture block using the motion information of the one or more sub-blocks in the current picture block.

It should be understood that the candidate inter prediction mode set herein may be one mode, or may be a plurality of modes. When the candidate inter prediction mode set is one mode (for example, a first inter prediction mode used for a non-directional motion field, also referred to as a planar mode used for inter prediction), the mode may be determined as the inter prediction mode used to perform inter prediction on the current picture block. When the candidate inter prediction mode set is a plurality of modes, a mode with a highest priority or ranked top in the set may be determined by default as the inter prediction mode used to perform inter prediction on the current picture block, or a mode indicated by a second identifier may be determined as the inter prediction mode used to perform inter prediction on the current picture block, or a first inter prediction mode used for a non-directional motion field may be determined as the inter prediction mode used to perform inter prediction on the current picture block.

The plurality of inter prediction modes used for a non-directional motion field mentioned in the embodiments of this application may include, for example, the first inter prediction mode used for a non-directional motion field (which may also be referred to as the planar mode used for inter prediction, or an interpolation inter prediction mode), and a second inter prediction mode used for a non-directional motion field (which may also be referred to as a direct current coefficient (DC) mode used for inter prediction).

The plurality of inter prediction modes used for a directional motion field mentioned in the embodiments of this application may include, for example, various direction prediction modes used for inter prediction.

It can be learned that new inter prediction modes are classified, based on a motion field feature, into inter prediction modes used for a non-directional motion field and/or inter prediction modes used for a directional motion field, and the motion information (for example, a motion vector) of the one or more sub-blocks in the current picture block can be predicted based on any one of the inter prediction modes used for a directional motion field or a non-directional motion field. In this way, from a perspective of a result, a predicted motion vector of the current picture block is basically close to a motion vector obtained using a motion estimation method. This improves motion vector prediction accuracy. A motion vector difference (MVD) does not need to be transmitted during encoding such that a bit rate is reduced with video quality unchanged, and encoding and decoding performance is further improved.

For example, in some possible implementation scenarios, the determined inter prediction mode is the first inter prediction mode used for a non-directional motion field (which may also be referred to as the planar mode used for inter prediction). Correspondingly, predicting a motion vector of a current sub-block in the current picture block includes predicting or deriving, using motion vectors of a plurality of reference blocks, a first motion vector of a right-side spatially-adjacent block, of the current picture block, in a same row as the current sub-block of the current picture block and a second motion vector of a lower spatially-adjacent block, of the current picture block, in a same column as the current sub-block of the current picture block, where the plurality of reference blocks include a spatially adjacent reference block and/or a temporally adjacent reference block of the current picture block, and obtaining a first predicted value of the motion vector of the current sub-block based on a linear interpolation of the first motion vector and a third motion vector of a left-side adjacent block, of the current picture block, in the same row as the current sub-block, an example of which in a possible implementation is determining, as the first predicted value of the motion information of the current sub-block, a weighted value of the first motion information of the right-side adjacent block, of the current picture block, in the same row as the current sub-block and the third motion information of the left-side adjacent block, of the current picture block, in the same row as the current sub-block, where a ratio of a weighting factor of the third motion information to a weighting factor of the first motion information is determined based on a ratio of a first distance between the right-side spatially-adjacent block, of the current picture block, in the same row as the current sub-block of the current picture block and the current sub-block to a second distance between the current sub-block and the left-side spatially-adjacent block, of the current picture block, in the same row as the current sub-block, obtaining a second predicted value of the motion vector of the current sub-block based on a vertical interpolation of the second motion vector and a fourth motion vector of an upper adjacent block, of the current picture block, in the same column as the current sub-block, an example of which in a possible implementation is determining, as the second predicted value of the motion information of the current sub-block, a weighted value of the fourth motion information of the upper spatially-adjacent block, of the current picture block, in the same column as the current sub-block and the second motion information of the lower spatially-adjacent block, of the current picture block, in the same column as the current sub-block, where a ratio of a weighting factor of the fourth motion information to a weighting factor of the second motion information is determined based on a ratio of a third distance between the lower spatially-adjacent block, of the current picture block, in the same column as the current sub-block of the current picture block and the current sub-block to a fourth distance between the current sub-block and the upper spatially-adjacent block, of the current picture block, in the same column as the current sub-block, and determining the motion vector of the current sub-block using the first predicted value of the motion vector of the current sub-block and the second predicted value of the motion vector of the current sub-block, an example of which in a possible implementation is obtaining the motion vector of the current sub-block by performing weighting processing on the first predicted value of the motion vector of the current sub-block and the second predicted value of the motion vector of the current sub-block.

The predicting or deriving first motion information of a right-side spatially-adjacent block, of the current picture block, in a same row as the current sub-block of the current picture block may be implemented in various manners, including the following manners.

First manner The first motion information is obtained based on a linear interpolation of fifth motion information of a lower-right spatially-adjacent block of a first co-located block of the current picture block and sixth motion information of an upper-right spatially-adjacent block of the current picture block, where the first co-located block is a picture block that is in a reference picture and whose size, shape, and coordinates are the same as those of the current picture block.

Second manner Motion information of a first right-side spatially-adjacent block of a first co-located block of the current picture block is determined as the first motion information, where a row in which the first right-side spatially-adjacent block is located in the first co-located block is the same as the row in which the current sub-block is located in the current picture block.

Third manner Motion information of a second right-side spatially-adjacent block of a second co-located block of the current picture block is determined as the first motion information, where the second co-located block is a picture block that is in a reference picture and that has a specified location offset from the current picture block, a motion vector of a representative spatially-adjacent block of the current picture block is used to indicate the specified location offset, and a row in which the second right-side spatially-adjacent block is located in the second co-located block is the same as the row in which the current sub-block is located in the current picture block.

Fourth manner Sixth motion information of an upper-right spatially-adjacent block of the current picture block is determined as the first motion information, or an average value of motion information of a plurality of upper-right spatially-adjacent blocks of the current picture block is determined as the first motion information.

It should be understood that the foregoing four derivation manners may be used in combination based on specific logic. For example, if the first motion information cannot be derived in the first manner, the fourth manner is further used to derive the first motion information. For another example, the first manner, the second manner, the third manner, and the fourth manner are sequentially used for derivation to obtain the first motion information.

The predicting or deriving second motion information of a lower spatially-adjacent block, of the current picture block, in a same column as the current sub-block of the current picture block may be implemented in various manners, including the following manners.

First manner The second motion information is obtained based on a linear interpolation of the fifth motion information of the lower-right spatially-adjacent block of the first co-located block of the current picture block and seventh motion information of a lower-left spatially-adjacent block of the current picture block, where the first co-located block is the picture block that is in the reference picture and whose size, shape, and coordinates are the same as those of the current picture block.

Second manner Motion information of a first lower spatially-adjacent block of the first co-located block of the current picture block is determined as the second motion information, where the first co-located block is the picture block that is in the reference picture and whose size, shape, and coordinates are the same as those of the current picture block, and a column in which the first lower spatially-adjacent block is located in the first co-located block is the same as the column in which the current sub-block is located in the current picture block.

Third manner Motion information of a second lower spatially-adjacent block of the second co-located block of the current picture block is determined as the second motion information, where the second co-located block is the picture block that is in the reference picture and that has the specified location offset from the current picture block, the motion vector of the representative spatially-adjacent block of the current picture block is used to indicate the specified location offset, and a column in which the second lower spatially-adjacent block is located in the second co-located block is the same as the column in which the current sub-block is located in the current picture block.

Fourth manner Seventh motion information of a lower-left spatially-adjacent block of the current picture block is determined as the second motion information, or an average value of motion information of a plurality of lower-left spatially-adjacent blocks of the current picture block is determined as the second motion information.

It should be understood that the foregoing four derivation manners may be used in combination based on specific logic. For example, if the second motion information cannot be derived in the first manner, the fourth manner is further used to derive the second motion information. For another example, the first manner, the second manner, the third manner, and the fourth manner are sequentially used for derivation to obtain the second motion information.

It can be learned that, in an inter prediction process based on the first inter prediction mode used for a non-directional motion field, the motion vector of the current sub-block is derived using weighted values of horizontal and vertical linear interpolations such that a motion vector of a picture block with a graded motion field or a sub-block of such a picture block can be better predicted, thereby improving motion vector prediction accuracy.

For another example, in some possible implementation scenarios, the determined inter prediction mode is the second inter prediction mode used for a non-directional motion field (also referred to as the DC mode used for inter prediction), and predicting motion information of a current sub-block in the current picture block includes determining, as the motion information of the current sub-block, an average value of third motion information of a left-side spatially-adjacent block, of the current picture block, in a same row as the current sub-block of the current picture block and fourth motion information of an upper spatially-adjacent block, of the current picture block, in a same column as the current sub-block, or determining an average value of motion information of a plurality of left-side spatially-adjacent blocks of the current picture block and motion information of a plurality of upper spatially-adjacent blocks of the current picture block as the motion information of the one or more sub-blocks (for example, all sub-blocks) of the current picture block.

It can be learned that, in an inter prediction process based on the second inter prediction mode used for a non-directional motion field, the motion vector of the current sub-block is derived using an average value of motion vectors of the direct left-side spatially-adjacent block and the upper spatially-adjacent block of the current picture block such that a motion vector of a picture block with a smooth motion field or a sub-block of such a picture block can be better predicted, thereby improving motion vector prediction accuracy.

For another example, in some possible implementation scenarios, the determined inter prediction mode is an inter-frame direction prediction mode used for a directional motion field (also referred to as a direction prediction mode used for inter prediction), the predicting motion information of a current sub-block in the current picture block includes determining motion information of one target reference block (also referred to as a projection reference block) as the motion information of the current sub-block of the current picture block, or determining a weighted value of motion information of two target reference blocks as the motion information of the current sub-block, or determining a weighted value of motion information of two target reference blocks and two adjacent blocks of the two target reference blocks as the motion information of the current sub-block, where the target reference block is a reference block that is determined in a reference row or a reference column based on a prediction direction (angle) corresponding to the inter-frame direction prediction mode and that corresponds to the current sub-block.

Neither the reference row nor the reference column belongs to the current picture block, reference blocks in the reference row are a row of upper spatially-adjacent blocks adjacent to the first row of sub-blocks of the current picture block, and reference blocks in the reference column are a column of left-side spatially-adjacent blocks adjacent to the first column of sub-blocks of the current picture block.

It can be learned that, in an inter prediction process based on the inter-frame direction prediction mode used for a directional motion field, motion vectors of one or more sub-blocks in a prediction direction are the same, and a value of the motion vector depends on a motion vector of a target reference block such that a motion vector of a picture block with a directional motion field or a sub-block of such a picture block can be better predicted, thereby improving motion vector prediction accuracy.

Motion information mentioned in the embodiments of this application mainly refers to a motion vector. However, it should be understood that the motion information may further include reference picture information, and the reference picture information may include but is not limited to a reference picture list and a reference picture index corresponding to the reference picture list.

Further, to improve motion vector prediction effectiveness, before a linear interpolation, weighting, or averaging is performed on a plurality of groups of motion information, the method in the embodiments of this application may further include determining a target reference picture index, of the current picture block, corresponding to a specified reference picture list, determining whether a reference picture index that is included in each of the plurality of groups of motion information and that corresponds to the specified reference picture list is the same as the target reference picture index, and if a reference picture index that is included in current motion information and that corresponds to the specified reference picture list is different from the target reference picture index, performing time-domain-distance-based scaling processing on a motion vector that is included in the current motion information and that corresponds to the specified reference picture list, to obtain a motion vector that points to a reference frame corresponding to the target reference picture index.

Further, to reduce a contour effect of motion information of a current block caused by an edge effect of motion information of a reference block, the method in the embodiments of this application may further include selectively filtering the motion information of the target reference block based on the prediction direction or angle corresponding to the inter-frame direction prediction mode.

Further, to reduce discontinuity of block boundary motion information, the method in the embodiments of this application may further include filtering motion information of a boundary sub-block of the current picture block, where the boundary sub-block is one or more sub-blocks located at a boundary of the current picture block. In particular, motion information of a boundary sub-block of the current picture block in a specific inter prediction mode (for example, the second inter prediction mode, a vertical prediction mode, or a horizontal prediction mode) is filtered.

When being used to decode a video picture, the inter prediction method in the embodiments of this application may further include decoding a bitstream to obtain inter prediction data that includes a first identifier, where the first identifier is used to indicate whether to perform inter prediction on the current picture block using the candidate inter prediction mode set, and correspondingly, the determining an inter prediction mode used to perform inter prediction on a current picture block includes when the inter prediction data instructs to predict the current picture block using the candidate inter prediction mode set, determining, from the candidate inter prediction mode set, the inter prediction mode used to perform inter prediction on the current picture block.

Further, if the inter prediction data further includes a second identifier used to indicate the inter prediction mode of the current picture block, the determining an inter prediction mode used to perform inter prediction on a current picture block includes determining that the inter prediction mode indicated by the second identifier is the inter prediction mode used to perform inter prediction on the current picture block, or if the inter prediction data does not include a second identifier used to indicate the inter prediction mode of the current picture block, the determining an inter prediction mode used to perform inter prediction on a current picture block includes determining that the first inter prediction mode used for a non-directional motion field (also referred to as the planar mode used for inter prediction) is the inter prediction mode used to perform inter prediction on the current picture block.

When being used to encode a video picture, in the inter prediction method in the embodiments of this application, the determining an inter prediction mode used to perform inter prediction on a current picture block includes determining an inter prediction mode that is in the candidate inter prediction mode set and that has a smallest bit rate distortion cost for encoding the current picture block, as the inter prediction mode used to perform inter prediction on the current picture block. It should be understood that, if a first inter prediction mode used for a smooth or graded motion field (also referred to as a planar mode used for inter prediction) has the smallest bit rate distortion cost for encoding the current picture block, the first inter prediction mode used for a smooth or graded motion field is determined as the inter prediction mode used to perform inter prediction on the current picture block.

Further, when being used to encode the video picture, the inter prediction method in the embodiments of this application may further include encoding inter prediction data into a bitstream, where the inter prediction data includes a first identifier used to indicate whether to perform inter prediction on the current picture block using the candidate inter prediction mode set, or the inter prediction data includes a first identifier used to indicate whether to perform inter prediction on the current picture block using the candidate inter prediction mode set and a second identifier used to indicate the inter prediction mode of the current picture block.

According to a second aspect, an embodiment of this application provides a video picture inter prediction apparatus, including functional units configured to implement any method in the first aspect. For example, the video picture inter prediction apparatus may include an inter prediction mode determining unit configured to determine an inter prediction mode used to perform inter prediction on a current picture block, where the inter prediction mode is one mode in a candidate inter prediction mode set, and the candidate inter prediction mode set includes a plurality of inter prediction modes used for a non-directional motion field and/or a plurality of inter prediction modes used for a directional motion field, and an inter prediction processing unit configured to perform inter prediction on the current picture block based on the determined inter prediction mode.

If the inter prediction mode determining unit determines a first inter prediction mode used for a non-directional motion field (which may also be referred to as a planar mode used for inter prediction), the inter prediction processing unit is configured to predict or derive, using motion vectors of a plurality of reference blocks, a first motion vector of a right-side spatially-adjacent block, of the current picture block, in a same row as a current sub-block of the current picture block and a second motion vector of a lower spatially-adjacent block, of the current picture block, in a same column as the current sub-block of the current picture block, where the plurality of reference blocks include a spatially adjacent reference block and/or a temporally adjacent reference block of the current picture block, obtain a first predicted value of motion information of the current sub-block based on a linear interpolation of the first motion information and third motion information of a left-side adjacent block, of the current picture block, in the same row as the current sub-block, obtain a second predicted value of the motion information of the current sub-block based on a linear interpolation of the second motion information and fourth motion information of an upper adjacent block, of the current picture block, in the same column as the current sub-block, and determine the motion information of the current sub-block using the first predicted value of the motion information of the current sub-block and the second predicted value of the motion information of the current sub-block, an example of which in a possible implementation is obtain the motion vector of the current sub-block by performing weighting processing on the first predicted value of the motion vector of the current sub-block and the second predicted value of the motion vector of the current sub-block.

The video picture inter prediction apparatus is, for example, applied to a video coding apparatus (a video encoder) or a video decoding apparatus (a video decoder).

According to a third aspect, an embodiment of this application provides a video encoder, where the video encoder is configured to encode a picture block, and includes the foregoing inter predictor, where the inter predictor is configured to predict a prediction block of a to-be-encoded picture block based on an inter prediction mode, and the inter prediction mode is one mode in a candidate inter prediction mode set, an entropy encoder configured to encode a first identifier into a bitstream, where the first identifier is used to indicate whether to perform inter prediction on the to-be-encoded picture block using the candidate inter prediction mode set, in other words, the first identifier is used to indicate whether to use a new inter prediction mode for the current to-be-encoded picture block, and a reconstructor configured to reconstruct the picture block based on the prediction block, and store the reconstructed picture block in a memory.

In some possible implementations, the entropy encoder is further configured to encode a second identifier into the bitstream, where the second identifier is used to indicate an inter prediction mode of the to-be-encoded picture block, in other words, the second identifier is used to indicate which new inter prediction mode is used to perform inter prediction on the to-be-encoded picture block.

According to a fourth aspect, an embodiment of this application provides a video decoder, where the video decoder is configured to decode a bitstream to obtain a picture block, and includes an entropy decoder configured to decode a bitstream to obtain a first identifier, where the first identifier is used to indicate whether to perform inter prediction on a to-be-decoded picture block using a candidate inter prediction mode set, in other words, the first identifier is used to indicate whether to use a new inter prediction mode for the to-be-decoded picture block, the foregoing inter predictor, where the inter predictor is configured to predict a prediction block of the to-be-decoded picture block based on an inter prediction mode, and the inter prediction mode is one mode in the candidate inter prediction mode set, and a reconstructor configured to reconstruct the picture block based on the prediction block.

In some possible implementations, the entropy decoder is further configured to decode the bitstream to obtain a second identifier, where the second identifier is used to indicate the inter prediction mode of the to-be-decoded picture block, in other words, the second identifier is used to indicate which new inter prediction mode is used for the to-be-decoded picture block.

According to a fifth aspect, an embodiment of this application provides a device for decoding video data, where the device includes a memory configured to store video data in a bitstream form, and a video decoder configured to decode a bitstream to obtain inter prediction data that includes a first identifier, where the first identifier is related to a current to-be-decoded picture block, and when the first identifier is true, perform inter prediction on the current to-be-decoded picture block based on an inter prediction mode, where the inter prediction mode is one mode in a candidate inter prediction mode set, and the candidate inter prediction mode set includes a plurality of inter prediction modes used for a non-directional motion field and/or a plurality of inter prediction modes used for a directional motion field.

According to a sixth aspect, an embodiment of this application provides a device for encoding video data, where the device includes a memory configured to store video data, where the video data includes one or more picture blocks, and a video encoder configured to encode, into a bitstream, inter prediction data that includes a first identifier, where the first identifier is related to a current to-be-encoded picture block, when the first identifier is true, the first identifier is used to instruct to perform inter prediction on the current to-be-encoded picture block based on an inter prediction mode, the inter prediction mode is one mode in a candidate inter prediction mode set, and the candidate inter prediction mode set includes a plurality of inter prediction modes used for a non-directional motion field and/or a plurality of inter prediction modes used for a directional motion field.

According to a seventh aspect, an embodiment of this application provides a device for decoding video data, where the device includes a memory configured to store encoded video data, and a video decoder configured to predict first motion information of a right-side spatially-adjacent block, of a current to-be-decoded picture block, in a same row as a current sub-block of the picture block and second motion information of a lower spatially-adjacent block, of the picture block, in a same column as the current sub-block of the current to-be-decoded picture block, obtain a first predicted value of motion information of the current sub-block based on a linear interpolation of the first motion information and third motion information of a left-side adjacent block, of the picture block, in the same row as the current sub-block, obtain a second predicted value of the motion information of the current sub-block based on a linear interpolation of the second motion information and fourth motion information of an upper adjacent block, of the picture block, in the same column as the current sub-block, obtain the motion information of the current sub-block using the first predicted value of the motion information of the current sub-block and the second predicted value of the motion information of the current sub-block, and decode the picture block using motion information of one or more sub-blocks that are in the current to-be-decoded picture block and that include the current sub-block.

According to an eighth aspect, an embodiment of this application provides a motion information prediction method, where the method includes predicting or deriving first motion information of a right-side spatially-adjacent block, of a current picture block, in a same row as a current sub-block of the current picture block, predicting or deriving second motion information of a lower spatially-adjacent block, of the current picture block, in a same column as the current sub-block of the current picture block, obtaining a first predicted value of motion information of the current sub-block based on a linear interpolation of the first motion information and third motion information of a left-side adjacent block, of the current picture block, in the same row as the current sub-block, obtaining a second predicted value of the motion information of the current sub-block based on a linear interpolation of the second motion information and fourth motion information of an upper adjacent block, of the current picture block, in the same column as the current sub-block, and determining the motion information of the current sub-block using the first predicted value of the motion information of the current sub-block and the second predicted value of the motion information of the current sub-block.

According to a ninth aspect, an embodiment of this application provides an encoding device, including a non-volatile memory and a processor that are coupled to each other. The processor invokes program code stored in the memory, to perform some or all steps of any method in the first aspect.

According to a tenth aspect, an embodiment of this application provides a decoding device, including a non-volatile memory and a processor that are coupled to each other. The processor invokes program code stored in the memory, to perform some or all steps of any method in the first aspect.

According to an eleventh aspect, an embodiment of this application provides a computer-readable storage medium. The computer-readable storage medium stores program code, and the program code includes an instruction used to perform some or all steps of any method in the first aspect.

According to a twelfth aspect, an embodiment of this application provides a computer program product. When the computer program product runs on a computer, the computer is enabled to perform some or all steps of any method in the first aspect.

According to a thirteenth aspect, an embodiment of this application provides a video picture inter prediction method, including determining an inter prediction mode used to perform inter prediction on a current picture block, where the inter prediction mode is one mode in a candidate inter prediction mode set, and the candidate inter prediction mode set includes a first inter prediction mode used for a smooth or graded motion field, and predicting motion information of each sub-block in the current picture block based on the determined inter prediction mode, and performing inter prediction on the current picture block using the motion information of each sub-block in the current picture block.

According to a fourteenth aspect, an embodiment of this application provides a video picture inter prediction apparatus, including functional units configured to implement any method in the thirteenth aspect. For example, the video picture inter prediction apparatus may include an inter prediction mode determining unit configured to determine an inter prediction mode used to perform inter prediction on a current picture block, where the inter prediction mode is one mode in a candidate inter prediction mode set, and the candidate inter prediction mode set includes a first inter prediction mode used for a smooth or graded motion field, and an inter prediction processing unit configured to predict motion information of each sub-block in the current picture block based on the determined inter prediction mode, and perform inter prediction on the current picture block using the motion information of each sub-block in the current picture block.

It should be understood that technical solutions in the second to the fourteenth aspects of this application are consistent with technical solutions in the first aspect of this application, and beneficial effects achieved by the aspects and corresponding feasible implementations are similar. Details are not described again.

BRIEF DESCRIPTION OF DRAWINGS

To describe the technical solutions in the embodiments or background of this application more clearly, the following describes the accompanying drawings that need to be used in the embodiments or background of this application.

FIG. 3 is a flowchart of an inter prediction method for video picture encoding according to an embodiment of this application.

FIG. 4 is a flowchart of an inter prediction method for video picture decoding according to an embodiment of this application.

FIG. 8A to FIG. 8H are schematic principle diagrams of four example first inter prediction modes according to an embodiment of this application.

DESCRIPTION OF EMBODIMENTS

The following describes the embodiments of this application with reference to the accompanying drawings in the embodiments of this application.

For encoding of a video stream, or a part of a video stream, such as a video frame or a picture block, temporal and spatial similarities in the video stream may be used to improve encoding performance. For example, for a current picture block of the video stream, motion information used for the current picture block may be predicted based on a previously encoded block in the video stream, and a difference (also referred to as a residual) between a prediction block and the current picture block (that is, an original block) is identified in order to encode the current picture block based on the previously encoded block. According to this method, only the residual used to generate the current picture block and some parameters, rather than the entire current picture block, are included in a digital video output bitstream. This technology may be referred to as inter prediction.

A motion vector is an important parameter in an inter prediction process, and represents a spatial displacement of the previously encoded block relative to the current to-be-encoded block. A motion estimation method, such as motion search, may be used to obtain the motion vector. In an early inter prediction technology, a bit representing a motion vector is included in an encoded bitstream, to allow a decoder to reproduce a prediction block, and to further obtain a reconstructed block. To further improve encoding efficiency, it is further proposed to differentially encode a motion vector using a reference motion vector, in an embodiment, to encode only a difference between the motion vector and the reference motion vector instead of encoding the entire motion vector. In some cases, a reference motion vector may be selected from motion vectors previously used in a video stream. Selecting a previously used motion vector to encode a current motion vector can further reduce a quantity of bits included in an encoded video bitstream.

Figures 5, 6A:
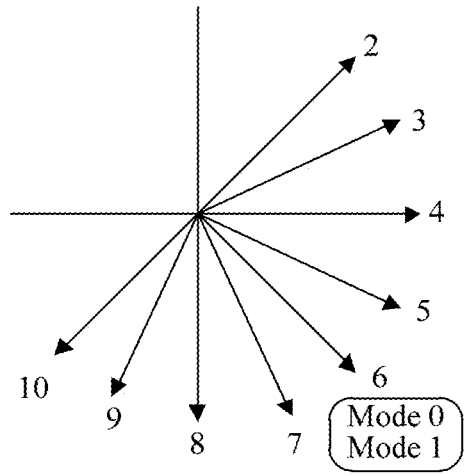
FIG. 5 is a schematic diagram of a plurality of candidate inter prediction modes according to an embodiment of this application.
FIG. 6A is an example schematic diagram of motion information of a current picture block and an adjacent reference block according to an embodiment of this application.

This application is not limited to inter prediction modes in existing standards, for example, two inter prediction modes for a prediction unit (PU) in the HEVC standard a merge mode (a skip mode is considered as a special case of the merge mode) and an AMVP mode. To further improve encoding and decoding performance, for example, make a difference between a motion vector of a current to-be-encoded block and a reference motion vector do not need to be transmitted during encoding, and to reduce, as much as possible, a quantity of residual values that need to be transmitted, this application further proposes a plurality of new inter prediction modes, including a plurality of inter prediction modes used for (predicting) a non-directional motion field and/or a plurality of inter prediction modes used for (predicting) a directional motion field, to form a candidate inter prediction mode set. In an example, as shown in FIG. 5 and Table 1, the plurality of inter prediction modes used for (predicting) a non-directional motion field herein may include a first inter prediction mode used for a non-directional motion field (for example, a first inter prediction mode used for a smooth motion field and a graded motion field, a mode 0) and a second inter prediction mode used for a non-directional motion field (for example, a second inter prediction mode mainly used for a smooth motion field, a mode 1). The plurality of inter prediction modes used for (predicting) a directional motion field (inter-frame direction prediction modes) herein may correspond to different prediction directions or angles. A quantity of inter-frame direction prediction modes in this application is not limited to 9 (that is, modes 2 to 10 shown in Table 2) or 32 (that is, modes 2 to 33 shown in Table 3), and the quantity of inter-frame direction prediction modes may increase or decrease with a motion vector prediction precision requirement.

It should be particularly noted that, in this application, the mode 0 may be understood as a planar mode used for inter prediction, the mode 1 may be understood as a DC mode used for inter prediction, and a mode N may be understood as an inter-frame direction prediction mode used for predicting a directional motion field, where N=2, 3, . . . , 10 or N=2, 3, . . . , 33. Further, in the planar mode used for inter prediction, an average value of horizontal and vertical linear interpolations of motion vectors of picture blocks/sub-blocks is used, and change characteristics of horizontal and vertical motion fields are considered such that a change of a prediction block/sub-block tends to be gentle. The planar mode is applicable to a picture block whose motion field changes slowly or a sub-block of such a picture block. In a DC mode used for intra prediction, an average value of motion vectors of a left-side adjacent block and an upper adjacent block of a current picture block is used as a motion vector of the current picture block or a sub-block of the current picture block. The DC mode is applicable to a smooth picture block or a sub-block of a smooth picture block. The inter-frame direction prediction mode is applicable to a picture block with a directional motion field, to predict a motion vector of the picture block or a sub-block of the picture block.

TABLE 1

| Inter prediction mode | Name | Remarks/Explanation |
|---|---|---|
| 0 | First inter prediction mode used for a smooth motion field and a graded motion field (mode 0) | Planar mode used for inter prediction |
| 1 | Second inter prediction mode used for a smooth motion field (mode 1) | DC mode used for inter prediction |
| N | An Nth inter prediction mode used for a directional motion field, an inter-frame direction prediction mode , for example, N = 2, 3, . . . , 10 or N = 2, 3, . . . , 33 | Angular(N) used for inter prediction, N = 2, 3, . . . , 10 or N = 2, 3, . . . , 33 |

In an example, as shown in Table 2, angular parameters A of the inter-frame direction prediction modes (2 to 10) have the following correspondence.

TABLE 2

| Mode | 2 | 3 | 4 | 5 | 6 | 7 | 8 | 9 | 10 |
|---|---|---|---|---|---|---|---|---|---|
| A | 32 | 15 | 0 | −15 | −32 | −15 | 0 | 15 | 32 |

Alternatively, in another example, as shown in Table 3, angular parameters A of the inter-frame direction prediction modes (2 to 33) have the following correspondence.

TABLE 3

| Horizontal modes | | | | | | | | | | | | | | | | |
|---|---|---|---|---|---|---|---|---|---|---|---|---|---|---|---|---|
| Mode | 2 | 3 | 4 | 5 | 6 | 7 | 8 | 9 | 10 | 11 | 12 | 13 | 14 | 15 | 16 | 17 |
| A | 32 | 26 | 21 | 17 | 13 | 9 | 5 | 2 | 0 | −2 | −5 | −9 | −13 | −17 | −21 | −26 |
| Vertical modes | | | | | | | | | | | | | | | | |
| Mode | 18 | 19 | 20 | 21 | 22 | 23 | 24 | 25 | 26 | 27 | 28 | 29 | 30 | 31 | 32 | 33 |
| A | −32 | −26 | −21 | −17 | −13 | −9 | −5 | −2 | 0 | 2 | 5 | 9 | 13 | 17 | 21 | 26 |

In this application, a candidate inter prediction mode set including but not limited to the foregoing modes 0, 1, 2, . . . , 10 is described. A video encoder determines or selects, from the candidate inter prediction mode set during video data sequence encoding, an inter prediction mode used to perform inter prediction on a current picture block (for example, the video encoder encodes video data using a plurality of inter prediction modes and selects an inter prediction mode with intermediate bit rate distortion for encoding the picture block), performs inter prediction on the current picture block based on the determined inter prediction mode, and then completes encoding of the current picture block. It should be understood that, for ease of describing the technical solutions in this application, the candidate inter prediction mode set including the foregoing modes 0, 1, 2, . . . , 10 is used for description herein. However, the candidate inter prediction mode set in this application is not limited thereto.

Figure 1:
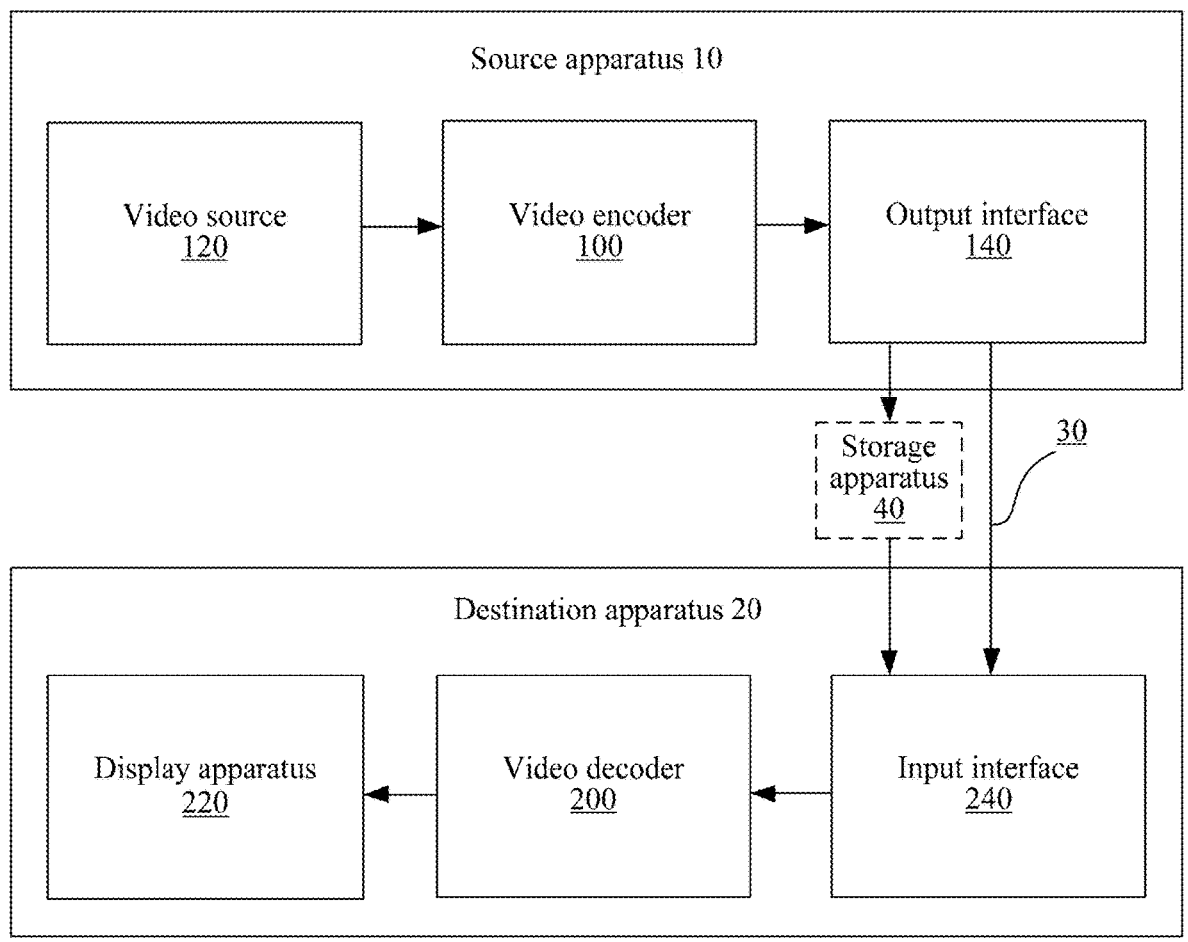
FIG. 1 is a schematic block diagram of a video coding and decoding system according to an embodiment of this application.

FIG. 1 is a block diagram of an example video coding and decoding system 1 according to an embodiment of this application. As used in this specification, the term "video codec" generally refers to a video encoder and a video decoder. In this application, the term "video coding/decoding" or "encoding/decoding" may generally refer to video coding or video decoding. A video encoder 100 and a video decoder 200 in the video coding and decoding system 1 are configured to predict motion information, for example, a motion vector, of a current encoded/decoded picture block or a sub-block of a current encoded/decoded picture block according to various method examples described in any one of the plurality of new inter prediction modes proposed in this application such that the predicted motion vector is maximally close to a motion vector obtained using a motion estimation method. In this way, a MVD does not need to be transmitted during encoding, thereby further improving encoding and decoding performance.

As shown in FIG. 1, the video coding and decoding system 1 includes a source apparatus 10 and a destination apparatus 20. The source apparatus 10 generates encoded video data. Therefore, the source apparatus 10 may be referred to as a video coding apparatus. The destination apparatus 20 may decode the encoded video data generated by the source apparatus 10. Therefore, the destination apparatus 20 may be referred to as a video decoding apparatus. Various implementation solutions of the source apparatus 10, the destination apparatus 20, or both the source apparatus 10 and the destination apparatus 20 may include one or more processors and a memory coupled to the one or more processors. The memory may include but is not limited to a random access memory (RAM), a read-only memory (ROM), an electrically erasable programmable ROM (EEPROM), a flash memory, or any other medium that can be used to store desired program code in a form of an instruction or a data structure accessible to a computer, as described in this specification.

The source apparatus 10 and the destination apparatus 20 may include various apparatuses, including a desktop computer, a mobile computing apparatus, a notebook (for example, laptop) computer, a tablet computer, a set-top box, a handheld telephone such as a "smart" phone, a television set, a camera, a display apparatus, a digital media player, a video game console, an in-vehicle computer, and similar apparatuses.

The destination apparatus 20 may receive the encoded video data from the source apparatus 10 over a link 30. The link 30 may include one or more media or apparatuses that can move the encoded video data from the source apparatus 10 to the destination apparatus 20. In an example, the link 30 may include one or more communications media that enable the source apparatus 10 to directly transmit the encoded video data to the destination apparatus 20 in real time. In this example, the source apparatus 10 may modulate the encoded video data according to a communications standard (for example, a wireless communications protocol), and may transmit the modulated video data to the destination apparatus 20. The one or more communications media may include a wireless communications medium and/or a wired communications medium, for example, a radio frequency (RF) spectrum or one or more physical transmission lines. The one or more communications media may form a part of a packet-based network, and the packet-based network is, for example, a local area network, a wide area network, or a global network (for example, the internet). The one or more communications media may include a router, a switch, a base station, or another device facilitating communication from the source apparatus 10 to the destination apparatus 20.

In another example, the encoded data may be output to a storage apparatus 40 through an output interface 140. Similarly, the encoded data may be accessed from the storage apparatus 40 through an input interface 240. The storage apparatus 40 may include any one of a plurality of distributed or locally accessed data storage media, for example, a hard disk drive, a BLU-RAY disc, a digital versatile disc (DVD), a compact disc ROM (CD-ROM), a flash memory, a volatile or non-volatile memory, or any other suitable digital storage medium configured to store encoded video data.

In another example, the storage apparatus 40 may correspond to a file server or another intermediate storage apparatus that can store encoded video data generated by the source apparatus 10. The destination apparatus 20 may access the stored video data from the storage apparatus 40 through streaming transmission or downloading. The file server may be any type of server that can store the encoded video data and transmit the encoded video data to the destination apparatus 20. Examples of the file server include a network server (for example, used for a website), aa file transfer protocol (FTP) server, a network-attached storage (NAS) apparatus, or a local disk drive. The destination apparatus 20 may access the encoded video data through any standard data connection (including an internet connection), which may include a wireless channel (for example, a WI-FI connection), a wired connection (for example, a digital subscriber line (DSL) or a cable modem), or a combination thereof that is suitable for accessing the encoded video data stored on the file server. Transmission of the encoded video data from the storage apparatus 40 may be streaming transmission, downloading transmission, or a combination thereof.

A motion vector prediction technology in this application may be applied to video coding and decoding, to support a plurality of multimedia applications, for example, over-the-air television broadcast, cable television transmission, satellite television transmission, streaming video transmission (for example, over the internet), encoding of video data stored in a data storage medium, decoding of video data stored in a data storage medium, or other applications. In some examples, the video coding and decoding system 1 may be configured to support unidirectional or bidirectional video transmission to support applications such as video streaming transmission, video playback, video broadcast, and/or videotelephony.

The video coding and decoding system 1 described in FIG. 1 is merely an example, and the technology in this application may be applicable to a video coding/decoding setting (for example, video coding or video decoding) that does not necessarily include any data communication between an encoding apparatus and a decoding apparatus. In another example, data is retrieved from a local memory, is transmitted on a network in a streaming manner, and the like. The video coding apparatus may encode the data and store the data in the memory, and/or the video decoding apparatus may retrieve the data from the memory and decode the data. In many examples, apparatuses that only encode data and store the data to the memory and/or retrieve the data from the memory and decode the data and that do not communicate with each other perform encoding and decoding.

In the example in FIG. 1, the source apparatus 10 includes a video source 120, the video encoder 100, and the output interface 140. In some examples, the output interface 140 may include a modulator/demodulator (modem) and/or a transmitter. The video source 120 may include a video capture apparatus (for example, a camera), a video archive containing previously captured video data, a video feed-in interface for receiving video data from a video content provider, and/or a computer graphics system for generating video data, or a combination of these sources of video data.

The video encoder 100 may encode video data that is from the video source 120. In some examples, the source apparatus 10 directly transmits the encoded video data to the destination apparatus 20 through the output interface 140. In another example, the encoded video data may alternatively be stored on the storage apparatus 40 such that the destination apparatus 20 subsequently accesses the encoded video data for decoding and/or playing.

In the example in FIG. 1, the destination apparatus 20 includes the input interface 240, the video decoder 200, and a display apparatus 220. In some examples, the input interface 240 includes a receiver and/or a modem. The input interface 240 may receive the encoded video data over the link 30 and/or from the storage apparatus 40. The display apparatus 220 may be integrated with the destination apparatus 20 or may be located outside the destination apparatus 20. Generally, the display apparatus 220 displays decoded video data. The display apparatus 220 may include a plurality of types of display apparatuses, for example, a liquid crystal display (LCD), a plasma display, an organic light-emitting diode (OLED) display, or another type of display apparatus.

Although not shown in FIG. 1, in some aspects, the video encoder 100 and the video decoder 200 may be respectively integrated with an audio encoder and an audio decoder, and may include a proper multiplexer-demultiplexer (MUX-DEMUX) unit or other hardware and software, to process encoding of both audio and video in a common data stream or separate data streams. In some examples, if applicable, the MUX-DEMUX unit may comply with the ITU H.223 multiplexer protocol, or another protocol such as the user datagram protocol (UDP).

The video encoder 100 and the video decoder 200 each may be implemented as, for example, any one of the following plurality of circuits one or more microprocessors, a digital signal processor (DSP), an application-specific integrated circuit (ASIC), a field programmable gate array (FPGA), discrete logic, hardware, or any combination thereof. If this application is implemented partially using software, the apparatus may store, in a proper non-volatile computer-readable storage medium, an instruction used for the software, and may use one or more processors to execute the instruction in hardware, to implement the technology in this application. Any one of the foregoing content (including hardware, software, a combination of hardware and software, and the like) may be considered as one or more processors. The video encoder 100 and the video decoder 200 each may be included in one or more encoders or decoders, and either the encoder or the decoder may be integrated into a combined encoder/decoder (codec) in a corresponding apparatus to be a part of the combined codec.

In this application, the video encoder 100 may be generally referred to as another apparatus "signaling" or "transmitting" some information to, for example, the video decoder 200. The term "signaling" or "transmitting" may roughly refer to transfer of a syntax element and/or other data used to decode compressed video data. The transfer may occur in real time or almost in real time. Alternatively, the communication may occur after a period of time, for example, may occur when a syntax element in an encoded bitstream is being stored into a computer-readable storage medium during encoding, and then the decoding apparatus may retrieve the syntax element at any time after the syntax element is stored in the medium.

The video encoder 100 and the video decoder 200 may operate according to a video compression standard, such as HEVC, or an extension thereof, and may comply with an HEVC test model (HM). Alternatively, the video encoder 100 and the video decoder 200 may operate according to other industry standards, for example, ITU-T H.264 and H.265 standards, or extensions of such standards. However, the technology in this application is not limited to any specific encoding and decoding standards.

In an example, referring to FIG. 3, the video encoder 100 is configured to encode a syntax element related to a current to-be-encoded picture block into a digital video output bitstream (a bitstream or a code stream). Herein, the syntax element used for inter prediction of the current picture block is referred to as inter prediction data. The inter prediction data may include a first identifier used to indicate whether to perform inter prediction on the current picture block using the candidate inter prediction mode set (in other words, a first identifier used to indicate whether to perform inter prediction on the current picture block using the new inter prediction mode proposed in this application). Alternatively, the inter prediction data may include a first identifier used to indicate whether to perform inter prediction on the current to-be-encoded picture block using the candidate inter prediction mode set and a second identifier used to indicate an inter prediction mode of the current to-be-encoded picture block. To determine the inter prediction mode used to encode the current picture block, the video encoder 100 is further configured to determine or select (S301), from the candidate inter prediction mode set, the inter prediction mode used to perform inter prediction on the current picture block (for example, select, from a plurality of new inter prediction modes, an inter prediction mode with an intermediate bit rate distortion cost or a smallest bit rate distortion cost for encoding the current picture block), and encode the current picture block based on the determined inter prediction mode (S303). An encoding process herein may include predicting motion information of one or more sub-blocks (which may specifically be motion information of each sub-block or all sub-blocks) in the current picture block based on the determined inter prediction mode, and performing inter prediction on the current picture block using the motion information of the one or more sub-blocks in the current picture block.

It should be understood that, if a difference (that is, a residual) between a prediction block generated based on the motion information predicted based on the new inter prediction mode proposed in this application and the current to-be-encoded picture block (that is, an original block) is 0, the video encoder 100 only needs to encode the syntax element related to the current to-be-encoded picture block into the bitstream (also referred to as a code stream).

Otherwise, in addition to the syntax element, the corresponding residual further needs to be encoded into the bitstream.

In another example, referring to FIG. 4, the video decoder 200 is configured to decode a bitstream to obtain a syntax element related to a current to-be-decoded picture block (S401), where the syntax element used for inter prediction of the current picture block is referred to as inter prediction data, and the inter prediction data includes a first identifier used to indicate whether to perform inter prediction on the current to-be-decoded picture block using the candidate inter prediction mode set (that is, a first identifier used to indicate whether to perform inter prediction on the current to-be-decoded picture block using the new inter prediction mode proposed in this application), when the inter prediction data instructs to predict the current picture block using the candidate inter prediction mode set (that is, the new inter prediction mode), determine an inter prediction mode that is in the candidate inter prediction mode set and that is used to perform inter prediction on the current picture block (S403), and decode the current picture block based on the determined inter prediction mode (S405). A decoding process herein may include predicting motion information of one or more sub-blocks in the current picture block based on the determined inter prediction mode, and performing inter prediction on the current picture block using the motion information of the one or more sub-blocks in the current picture block.

Optionally, if the inter prediction data further includes a second identifier used to indicate which inter prediction mode is used for the current picture block, the video decoder 200 is configured to determine that the inter prediction mode indicated by the second identifier is the inter prediction mode used to perform inter prediction on the current picture block. Alternatively, if the inter prediction data does not include a second identifier used to indicate which inter prediction mode is used for the current picture block, the video decoder 200 is configured to determine that the first inter prediction mode used for a non-directional motion field is the inter prediction mode used to perform inter prediction on the current picture block.

It should be understood that the candidate inter prediction mode set herein may be one mode, or may be a plurality of modes. When the candidate inter prediction mode set is one mode (for example, the mode 0), the mode may be determined as the inter prediction mode used to encode or decode the current picture block. When the candidate inter prediction mode set is a plurality of modes, a mode with a highest priority or ranked top in the set may be determined by default as the inter prediction mode used to encode or decode the current picture block, or the mode indicated by the second identifier may be determined as the inter prediction mode used to decode the current picture block.

It can be learned from the foregoing that, in this embodiment of this application, the new inter prediction modes are classified, based on a motion field feature, into an inter prediction mode used for a non-directional motion field and/or an inter prediction mode used for a directional motion field. Regardless of whether the video encoder 100 or the video decoder 200 in the video coding and decoding system 1 encodes or decodes a current to-be-encoded or to-be-decoded picture block using an inter prediction mode used for a directional motion field in the candidate inter prediction mode set or using an inter prediction mode used for a non-directional motion field in the candidate inter prediction mode set, motion information (for example, a motion vector) of one or more sub-blocks in the current picture block can be predicted using a motion vector of an available reference block (a reference motion vector) of the current picture block. In this case, from a perspective of a result, the predicted motion vector of the current picture block is basically close to a motion vector obtained using the motion estimation method. In this way, a MVD does not need to be transmitted during encoding, and a bit rate is reduced with video quality unchanged. Therefore, encoding and decoding performance of the video coding and decoding system in this embodiment of this application is further improved.

Figure 2A:
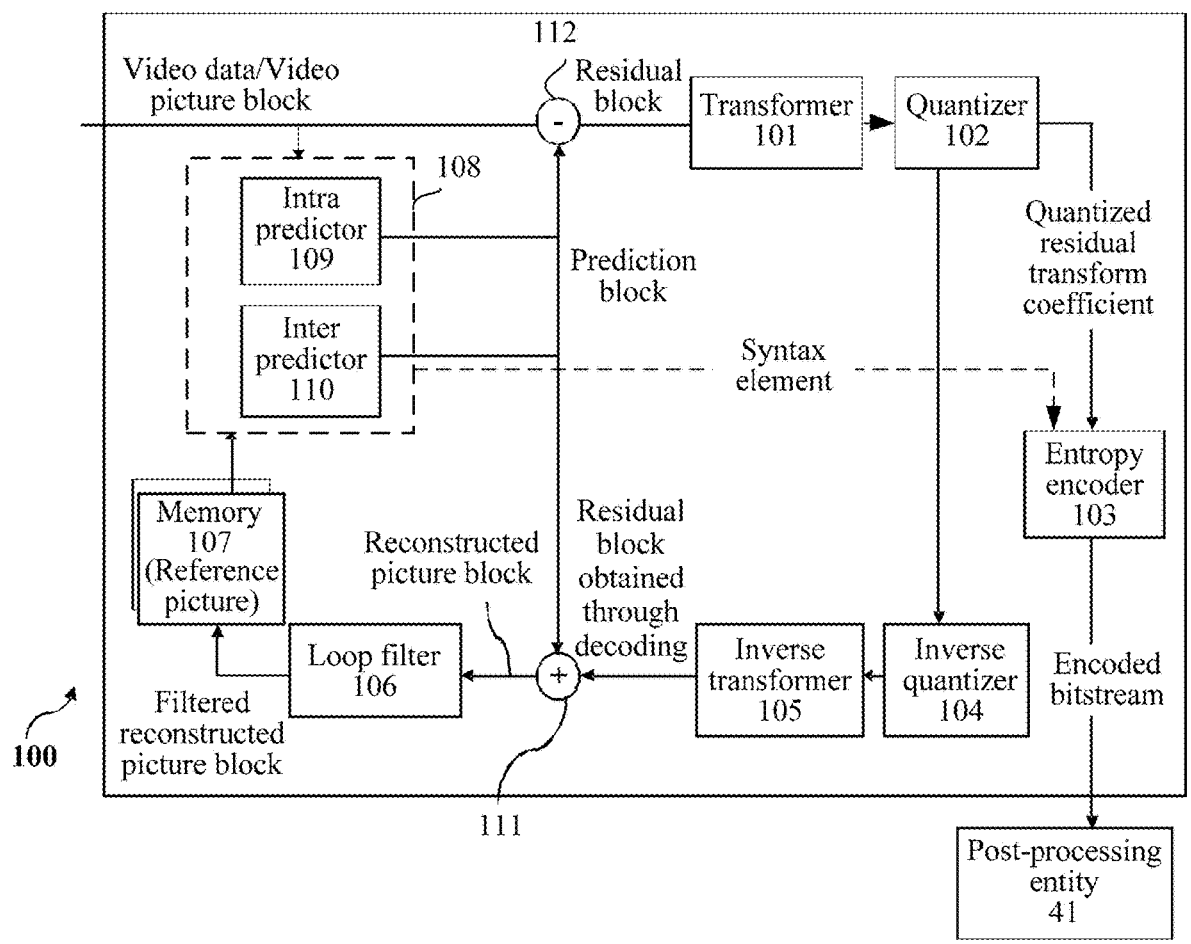
FIG. 2A is a schematic block diagram of a video encoder according to an embodiment of this application.

FIG. 2A is a block diagram of an example video encoder 100 according to an embodiment of this application. The video encoder 100 is configured to output a video to a post-processing entity 41. The post-processing entity 41 represents an instance of a video entity that can process encoded video data that is from the video encoder 100, for example, a media aware network element (MANE) or a splicing apparatus/an editing apparatus. In some cases, the post-processing entity 41 may be an instance of a network entity. In some video coding systems, the post-processing entity 41 and the video encoder 100 may be parts of separate apparatuses, while in other cases, functionality described with respect to the post-processing entity 41 may be performed by a same apparatus including the video encoder 100. In an example, the post-processing entity 41 is an instance of the storage apparatus 40 in FIG. 1.

The video encoder 100 may encode a video picture block, for example, perform inter prediction on the video picture block, based on any new inter prediction mode in the candidate inter prediction mode set that includes the modes 0, 1, 2, . . . , and 10 and that is proposed in this application.

In the example in FIG. 2A, the video encoder 100 includes a prediction processing unit 108, a filter unit 106, a decoded picture buffer (DPB) 107, a summator 112, a transformer 101, a quantizer 102, and an entropy encoder 103. The prediction processing unit 108 includes an inter predictor 110 and an intra predictor 109. For picture block reconstruction, the video encoder 100 further includes an inverse quantizer 104, an inverse transformer 105, and a summator 111. The filter unit 106 represents one or more loop filters, for example, a deblocking filter, an adaptive loop filter (ALF), and a sample adaptive offset (SAO) filter. Although the filter unit 106 is shown as an intra-loop filter in FIG. 2A, in another implementation, the filter unit 106 may be implemented as a post-loop filter. In an example, the video encoder 100 may further include a video data memory and a partitioning unit (not shown in the figure).

The video data memory may store video data that is to be encoded by a component of the video encoder 100. The video data stored in the video data memory may be obtained from a video source 120. The DPB 107 may be a reference picture memory that stores reference video data used for encoding the video data by the video encoder 100 in intra-frame and inter-frame coding/decoding modes. The video data memory and the DPB 107 each may be formed by any one of a plurality of memory apparatuses, for example, a dynamic random access memory (DRAM) including a synchronous DRAM (SDRAM), a magnetoresistive RAM (MRAM), a resistive RAM (RRAM), or another type of memory apparatus. The video data memory and the DPB 107 may be provided by a same memory apparatus or separate memory apparatuses. In various examples, the video data memory may be disposed on a chip with other components of the video encoder 100, or may be outside the chip relative to those components.

As shown in FIG. 2A, the video encoder 100 receives video data and stores the video data in the video data memory. The partitioning unit partitions the video data into picture blocks, and these picture blocks may further be partitioned into smaller blocks, for example, through picture block partitioning based on a quadtree structure or a binary-tree structure. The partitioning may further include partitioning into slices, tiles, or other larger units. The video encoder 100 usually includes a component for encoding a picture block in a to-be-encoded video slice. The slice may be divided into a plurality of picture blocks (and may be divided into picture block sets referred to as tiles). The prediction processing unit 108 may select one of a plurality of possible coding/decoding modes used for the current picture block, for example, one of a plurality of intra-frame coding/decoding modes or one of a plurality of inter-frame coding/decoding modes. The plurality of inter-frame coding/decoding modes include but are not limited to one or more of the modes 0, 1, 2, 3, . . . , and 10 proposed in this application. The prediction processing unit 108 may provide obtained intra-coded/decoded and inter-coded/decoded blocks to the summator 112 to generate a residual block, and provide the blocks to the summator 111 to reconstruct an encoded block used as a reference picture.

The intra predictor 109 in the prediction processing unit 108 may perform intra predictive coding on the current picture block relative to one or more neighboring blocks in a same frame or slice as the current to-be-encoded block, to remove spatial redundancy. The inter predictor 110 in the prediction processing unit 108 may perform inter predictive coding on the current picture block relative to one or more prediction blocks in one or more reference pictures, to remove temporal redundancy.

Further, the inter predictor 110 may be configured to determine an inter prediction mode used to encode the current picture block. For example, the inter predictor 110 may calculate rate-distortion values of various inter prediction modes in the candidate inter prediction mode set through rate-distortion analysis, and select an inter prediction mode with an optimal rate-distortion characteristic from the inter prediction modes. Rate-distortion analysis usually includes determining an amount of distortion (or error) between an encoded block and an original block that has not been encoded and that is to be encoded to generate the encoded block, and a bit rate (that is, a quantity of bits) used to generate the encoded block. For example, the inter predictor 110 may determine an inter prediction mode that is in the candidate inter prediction mode set and that has a smallest bit rate distortion cost for encoding the current picture block, as the inter prediction mode used to perform inter prediction on the current picture block. The following describes in detail an inter predictive coding process, particularly a process of predicting motion information of one or more sub-blocks (which may specifically be each sub-block or all sub-blocks) in the current picture block in various inter prediction modes used for a non-directional or directional motion field in this application.

The inter predictor 110 is configured to predict the motion information (for example, a motion vector) of the one or more sub-blocks in the current picture block based on the determined inter prediction mode, and obtain or generate a prediction block of the current picture block using the motion information (for example, the motion vector) of the one or more sub-blocks in the current picture block. The inter predictor 110 may locate, in one reference picture in a reference picture list, the prediction block to which the motion vector points. The inter predictor 110 may further generate a syntax element associated with the picture block and a video slice, for use by a video decoder 200 when decoding the picture block of the video slice. Alternatively, in an example, the inter predictor 110 performs a motion compensation process using motion information of each sub-block, to generate a prediction block of each sub-block, and further obtain a prediction block of the current picture block. It should be understood that the inter predictor 110 herein performs a motion estimation process and the motion compensation process.

Further, after selecting the inter prediction mode for the current picture block, the inter predictor 110 may provide, to the entropy encoder 103, information indicating the selected inter prediction mode of the current picture block such that the entropy encoder 103 encodes the information indicating the selected inter prediction mode. In this application, the video encoder 100 may include, in a transmitted bitstream, inter prediction data related to the current picture block. The inter prediction data may include a first identifier block_based_enable_flag, to indicate whether to perform inter prediction on the current picture block using the new inter prediction mode proposed in this application. Optionally, the inter prediction data may further include a second identifier block_based_index, to indicate which new inter prediction mode is used for the current picture block. In this application, a process of predicting the motion vector of the current picture block or the sub-block of the current picture block using motion vectors of a plurality of reference blocks in the different modes 0, 1, 2, . . . , and 10 is described in detail below.

The intra predictor 109 may perform intra prediction on the current picture block. Further, the intra predictor 109 may determine an intra prediction mode used to encode the current block. For example, the intra predictor 109 may calculate rate-distortion values of various to-be-tested intra prediction modes through rate-distortion analysis, and select an intra prediction mode with an optimal rate-distortion characteristic from the to-be-tested modes. In any case, after selecting the intra prediction mode for the picture block, the intra predictor 109 may provide, to the entropy encoder 103, information indicating the selected intra prediction mode of the current picture block such that the entropy encoder 103 encodes the information indicating the selected intra prediction mode.

After the prediction processing unit 108 generates the prediction block of the current picture block through inter prediction and intra prediction, the video encoder 100 subtracts the prediction block from the current to-be-encoded picture block to form a residual picture block. The summator 112 represents one or more components that perform the subtraction operation. Residual video data in the residual block may be included in one or more TUs and applied to the transformer 101. The transformer 101 transforms the residual video data into a residual transform coefficient through transformation such as discrete cosine transform (DCT) or conceptually similar transform. The transformer 101 may convert the residual video data from a pixel domain to a transform domain, for example, a frequency domain.

The transformer 101 may send the obtained transform coefficient to the quantizer 102. The quantizer 102 quantizes the transform coefficient to further reduce a bit rate. In some examples, the quantizer 102 may then scan a matrix including the quantized transform coefficient. Alternatively, the entropy encoder 103 may perform scanning.

After quantization, the entropy encoder 103 performs entropy encoding on the quantized transform coefficient. For example, the entropy encoder 103 may perform context-adaptive variable-length coding (CAVLC), context-adaptive binary arithmetic coding (CABAC), syntax-based context-adaptive binary arithmetic coding (SBAC), probability interval partitioning entropy (PIPE) coding, or another entropy encoding method or technology. After the entropy encoder 103 performs entropy encoding, the encoded bitstream may be transmitted to the video decoder 200, or archived for subsequent transmission or to be retrieved by the video decoder 200. The entropy encoder 103 may further perform entropy encoding on a syntax element of the current to-be-encoded picture block.

The inverse quantizer 104 and the inverse transformer 105 respectively apply inverse quantization and inverse transformation, to reconstruct the residual block in the pixel domain, for example, for subsequent use as a reference block of a reference picture. The summator 111 adds the reconstructed residual block to the prediction block generated by the inter predictor 110 or the intra predictor 109, to generate a reconstructed picture block. The filter unit 106 may be applicable to the reconstructed picture block to reduce distortion such as blocking artifacts. Then, the reconstructed picture block is stored as the reference block in the DPB 107, and may be used as the reference block by the inter predictor 110 to perform inter prediction on a block in a subsequent video frame or picture.

It should be understood that other structural variants of the video encoder 100 may be used to encode a video stream. For example, for some picture blocks or picture frames, the video encoder 100 may directly quantize a residual signal without processing by the transformer 101, and correspondingly, without processing by the inverse transformer 105. Alternatively, for some picture blocks or picture frames, the video encoder 100 does not generate residual data, and correspondingly, processing by the transformer 101, the quantizer 102, the inverse quantizer 104, and the inverse transformer 105 is not required. Alternatively, the video encoder 100 may directly store the reconstructed picture block as the reference block without processing by the filter unit 106. Alternatively, the quantizer 102 and the inverse quantizer 104 in the video encoder 100 may be combined.

Figure 2B:
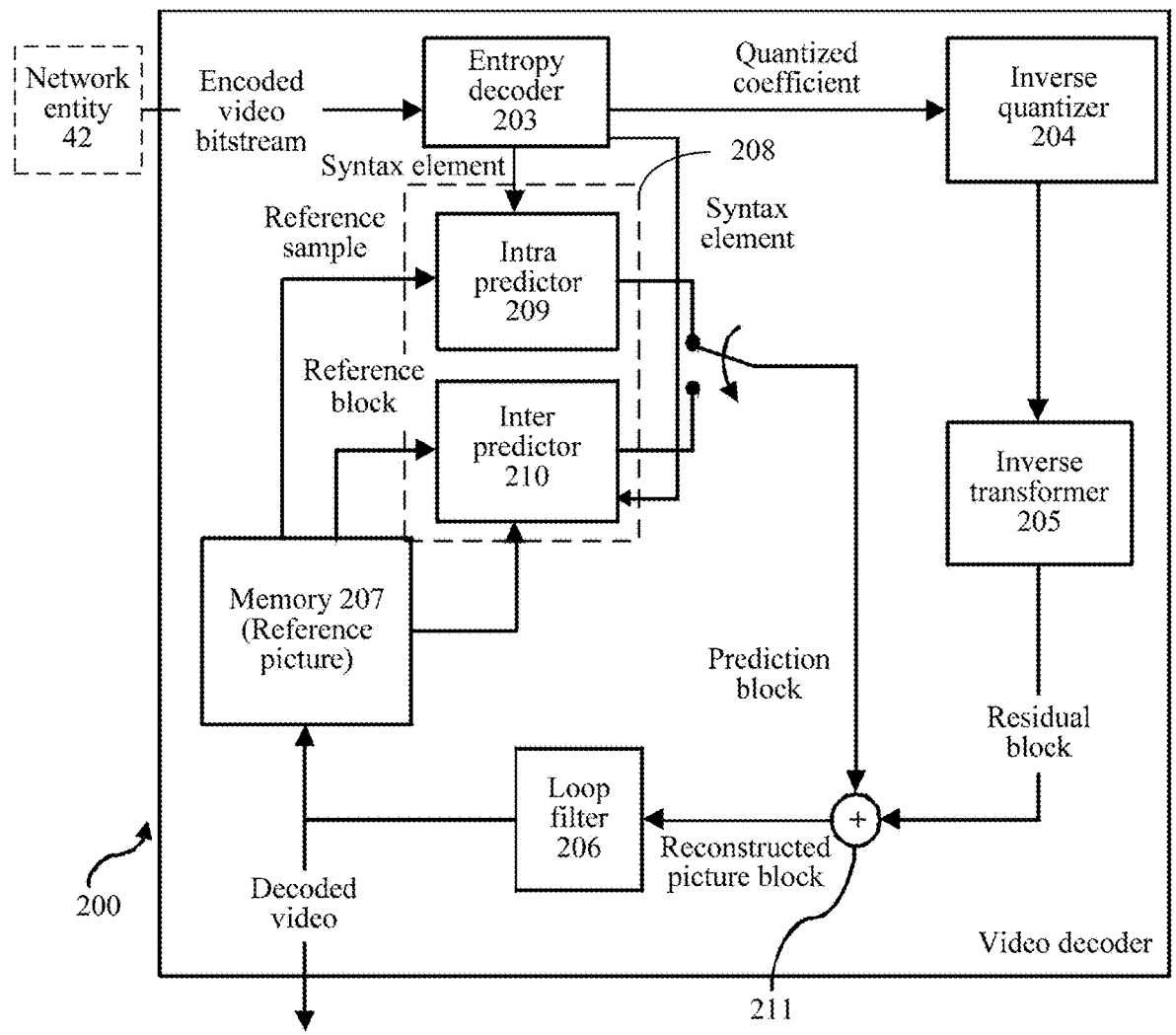
FIG. 2B is a schematic block diagram of a video decoder according to an embodiment of this application.

FIG. 2B is a block diagram of an example video decoder 200 according to an embodiment of this application. In the example in FIG. 2B, the video decoder 200 includes an entropy decoder 203, a prediction processing unit 208, an inverse quantizer 204, an inverse transformer 205, a summator 211, a filter unit 206, and a DPB 207. The prediction processing unit 208 may include an inter predictor 210 and an intra predictor 209. In some examples, the video decoder 200 may perform a decoding process that is substantially inverse to the encoding process of the video encoder 100 in FIG. 2A.

During decoding, the video decoder 200 receives, from the video encoder 100, an encoded video bitstream representing a picture block of an encoded video slice and an associated syntax element. The video decoder 200 may receive video data from a network entity 42, and optionally may further store the video data in a video data memory (not shown in the figure). The video data memory may store video data that is to be decoded by a component of the video decoder 200, for example, the encoded video bitstream. The video data stored in the video data memory, for example, may be obtained from a local video source such as a storage apparatus 40 or a camera, through wired or wireless network communication of the video data, or by accessing a physical data storage medium. The video data memory may be used as a coded picture buffer (CPB) configured to store the encoded video data that is from the encoded video bitstream. Therefore, although the video data memory is not shown in FIG. 2B, the video data memory and the DPB 207 may be a same memory, or may be separately disposed memories. The video data memory and the DPB 207 each may be formed by any one of a plurality of memory apparatuses, for example, a DRAM including a SDRAM, a MRAM, a RRAM, or another type of memory apparatus. In various examples, the video data memory may be integrated into a chip with other components of the video decoder 200, or may be disposed outside the chip relative to those components.

The network entity 42 may be, for example, a server, a MANE, a video editor/splicer, or another such apparatus configured to implement one or more of the technologies described above. The network entity 42 may or may not include a video encoder, for example, the video encoder 100. Before the network entity 42 sends the encoded video bitstream to the video decoder 200, the network entity 42 may implement a part of the technology described in this application. In some video decoding systems, the network entity 42 and the video decoder 200 may be parts of separate apparatuses, while in other cases, functionality described with respect to the network entity 42 may be performed by a same apparatus including the video decoder 200. In some cases, the network entity 42 may be an instance of the storage apparatus 40 in FIG. 1.

The entropy decoder 203 of the video decoder 200 performs entropy decoding on the bitstream to generate a quantized coefficient and some syntax elements. The entropy decoder 203 forwards the syntax elements to the prediction processing unit 208. The video decoder 200 may receive a syntax element/syntax elements at a video slice level and/or a picture block level. In this application, in an example, the syntax element herein may include inter prediction data related to a current picture block. The inter prediction data may include a first identifier block_based_enable_flag, to indicate whether to perform inter prediction on the current picture block using a candidate inter prediction mode set (in other words, to indicate whether to perform inter prediction on the current picture block using a new inter prediction mode proposed in this application). Optionally, the inter prediction data may further include a second identifier block_based_index, to indicate which new inter prediction mode is used for the current picture block.

When the video slice is decoded into an intra-decoded (I) slice, the intra predictor 209 of the prediction processing unit 208 may generate a prediction block of the picture block of the current video slice based on a signaled intra prediction mode and data of a previously decoded block that is from a current frame or picture. When the video slice is decoded into an inter-decoded (that is, B or P) slice, the inter predictor 210 of the prediction processing unit 208 may determine, based on the syntax element received from the entropy decoder 203, an inter prediction mode used to decode the current picture block of the current video slice, and decode (for example, perform inter prediction on) the current picture block based on the determined inter prediction mode. Further, the inter predictor 210 may determine whether to predict the current picture block of the current video slice using the new inter prediction mode, and if the syntax element instructs to predict the current picture block using the new inter prediction mode, predict motion information of the current picture block of the current video slice or a sub-block of the current picture block based on the new inter prediction mode (for example, a new inter prediction mode specified by the syntax element or a default new inter prediction mode), to obtain or generate the prediction block of the current picture block or the sub-block of the current picture block using the predicted motion information of the current picture block or the sub-block of the current picture block in a motion compensation process. The motion information herein may include reference picture information and a motion vector. The reference picture information may include but is not limited to unidirectional/bidirectional prediction information, a reference picture list number, and a reference picture index corresponding to a reference picture list. For inter prediction, the prediction block may be generated from one of reference pictures in one of reference picture lists. The video decoder 200 may construct reference picture lists, namely, a list 0 and a list 1, based on reference pictures stored in the DPB 207. The reference frame index of the current picture may be included in one or more of the reference frame list 0 and the reference frame list 1. In some examples, the video encoder 100 may signal to indicate whether to decode a specific syntax element of a specific block using the new inter prediction mode, or may signal to indicate whether to use the new inter prediction mode and indicate which new inter prediction mode is specifically used to decode a specific syntax element of a specific block. It should be understood that the inter predictor 210 herein performs the motion compensation process. The following describes in detail an inter prediction process of predicting the motion information of the current picture block or the sub-block of the current picture block using motion information of a reference block in various new inter prediction modes.

The inverse quantizer 204 performs inverse quantization on, that is, dequantizes, a quantized transform coefficient provided in the bitstream and decoded by the entropy decoder 203. An inverse quantization process may include determining a to-be-applied quantization degree using a quantization parameter calculated by the video encoder 100 for each picture block in the video slice, and similarly determining a to-be-applied inverse quantization degree. The inverse transformer 205 applies inverse transform, for example, inverse DCT, inverse integer transform, or a conceptually similar inverse transform process, to the transform coefficient in order to generate a pixel-domain residual block.

After the inter predictor 210 generates the prediction block used for the current picture block or the sub-block of the current picture block, the video decoder 200 obtains a reconstructed block, that is, a decoded picture block, by summing the residual block that is from the inverse transformer 205 and the corresponding prediction block that is generated by the inter predictor 210. The summator 211 represents a component that performs the summation operation. When necessary, a loop filter (in a decoding loop or after a decoding loop) may further be used to make pixel transition smooth, or video quality may be improved in another manner. The filter unit 206 may represent one or more loop filters, for example, a deblocking filter, an ALF, and a SAO filter. Although the filter unit 206 is shown as an intra-loop filter in FIG. 2B, in another implementation, the filter unit 206 may be implemented as a post-loop filter. In an example, the filter unit 206 is applicable to block reconstruction to reduce block distortion, and the result is output as a decoded video stream. In addition, a decoded picture block in a given frame or picture may further be stored in the DPB 207, and the DPB 207 stores a reference picture used for subsequent motion compensation. The DPB 207 may be a part of a memory, and may further store a decoded video for subsequent presentation on a display apparatus (for example, the display apparatus 220 in FIG. 1), or may be separated from such a memory.

It should be understood that other structural variants of the video decoder 200 may be used to decode the encoded video bitstream. For example, the video decoder 200 may generate an output video stream without processing by the filter unit 206. Alternatively, for some picture blocks or picture frames, the entropy decoder 203 of the video decoder 200 does not obtain a quantized coefficient through decoding, and correspondingly, processing by the inverse quantizer 204 and the inverse transformer 205 is not required.

The following describes in detail a process of predicting motion information of a current picture block or a sub-block of a current picture block using motion information of a plurality of reference blocks in various new inter prediction modes in this application.

Figure 6B:
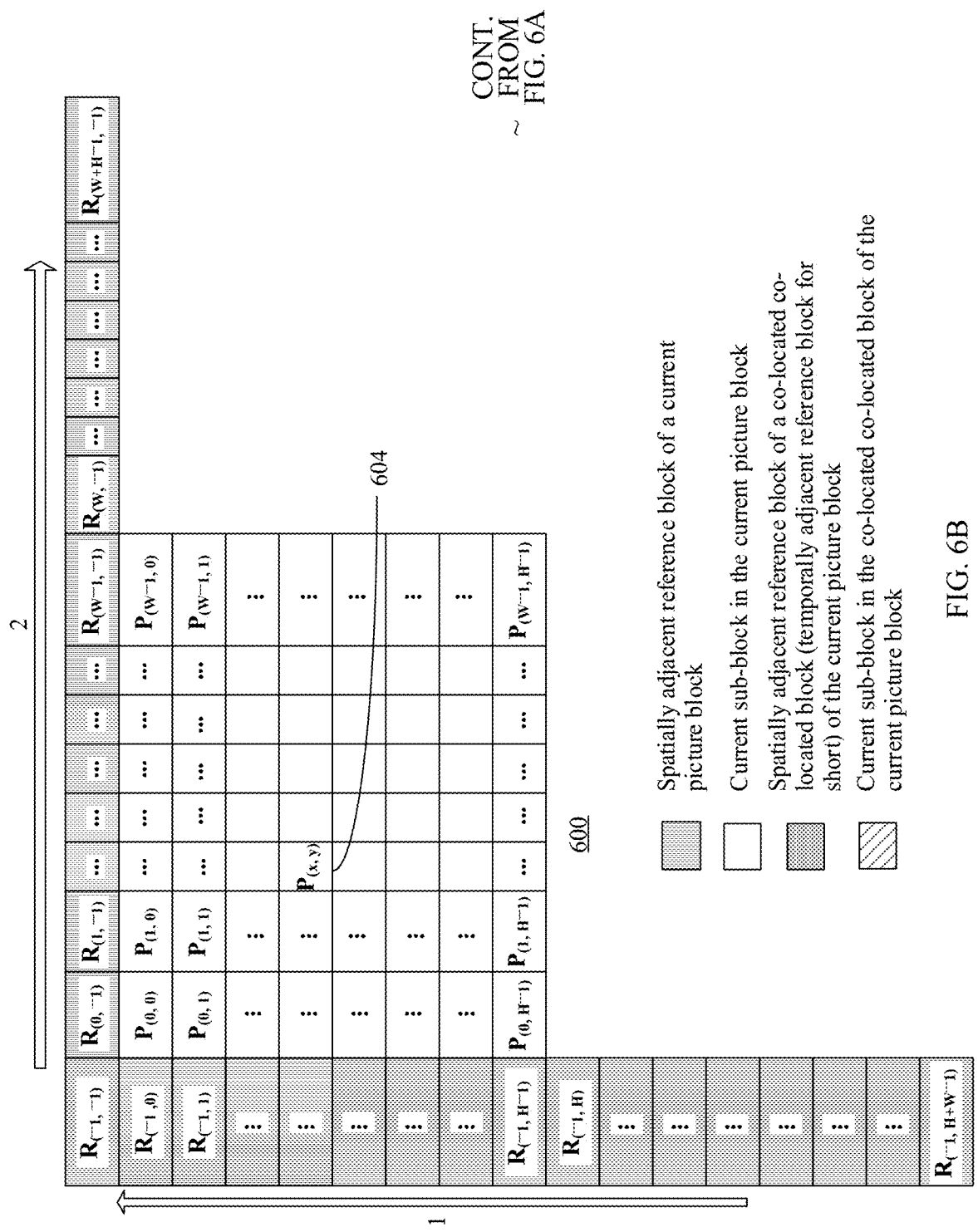
FIG. 6B is another example schematic diagram of motion information of a current picture block and an adjacent reference block according to an embodiment of this application.

FIG. 6A and FIG. 6B are an example schematic diagram of motion information of a current picture block 600 and a reference block according to an embodiment of this application. As shown in FIG. 6A and FIG. 6B, W and H are a width and a height of the current picture block 600 and a co-located co-located block 600' of the current picture block 600. The reference block of the current picture block 600 includes an upper spatially-adjacent block and a left-side spatially-adjacent block of the current picture block 600, and a lower spatially-adjacent block and a right-side spatially-adjacent block of the co-located block 600'. The co-located block 600' is a picture block that is in a reference picture and whose size, shape, and coordinates are the same as those of the current picture block 600. It should be noted that there is no motion information of a lower spatially-adjacent block and a right-side spatially-adjacent block of the current picture block, which are not encoded yet. It should be understood that the current picture block 600 and the co-located block 600' may be of any block size. For example, the current picture block 600 and the co-located block 600' may include but are not limited to 16×16 pixels, 32×32 pixels, 32×16 pixels, 16×32 pixels, and the like. As described above, each picture frame may be partitioned into picture blocks for encoding. These picture blocks may further be partitioned into smaller blocks. For example, the current picture block 600 and the co-located block 600' may be partitioned into a plurality of M×N sub-blocks, that is, a size of each sub-block is M×N pixels. In addition, a size of each reference block is also M×N pixels, that is, the same as the size of the sub-block of the current picture block. The coordinates in FIG. 6A and FIG. 6B are measured using an M×N block as a measurement unit. "M×N" and "M multiplied by N" may be used interchangeably to refer to a pixel size of a picture block in a horizontal dimension and a vertical dimension, in an embodiment, there are M pixels in a horizontal direction and N pixels in a vertical direction, where M and N represent nonnegative integer values. In addition, a block may not need to have a same quantity of pixels in the horizontal direction and in the vertical direction. For example, M=N=4 herein. Certainly, the sub-block size of the current picture block and the reference block size may alternatively be 8×8 pixels, 8×4 pixels, 4×8 pixels, or a smallest prediction block size. In addition, the picture block described in this application may be understood as but is not limited to a PU, a CU, a transform unit (TU), or the like. According to stipulations in different video compression coding/decoding standards, the CU may include one or more PUs, or a size of the PU is the same as a size of the CU. The picture block may have a fixed or variable size, and the size may vary with different video compression coding/decoding standards. In addition, the current picture block is a current to-be-encoded or to-be-decoded picture block, for example, a to-be-encoded or to-be-decoded.

In an example, whether each left-side spatially-adjacent block of the current picture block 600 is available may be sequentially determined along a direction 1, and whether each upper spatially-adjacent block of the current picture block 600 is available may be sequentially determined along a direction 2. For example, whether an adjacent block (also referred to as a reference block, where "adjacent block" and "reference block" may be interchangeably used) is inter-coded is determined, and the adjacent block is available if the adjacent block exists and is inter-coded, or the adjacent block is unavailable if the adjacent block does not exist or is intra-coded. If an adjacent block is intra-coded, motion information of another adjacent reference block is copied as motion information of the adjacent block. Whether the lower spatially-adjacent block and the right-side spatially-adjacent block of the co-located block 600' are available is detected using a similar method. Details are not described herein.

Further, if a size of an available reference block and the size of the sub-block of the current picture block are 4×4, motion information of the available reference block may be directly obtained or fetched. If a size of an available reference block is, for example, 8×4 or 8×8, motion information of a center 4×4 block of the available reference block may be obtained as motion information of the available reference block. Coordinates of an upper-left vertex of the center 4×4 block relative to an upper-left vertex of the reference block are $((W/4)/2\times 4, (H/4)/2\times 4)$. The division operation herein is an exact-division operation. If M=8 and N=4, the coordinates of the upper-left vertex of the center 4×4 block relative to the upper-left vertex of the reference block are (4, 0). Optionally, motion information of an upper-left 4×4 block of the reference block may be obtained as the motion information of the available reference block. However, this application is not limited thereto.

For ease of description, the following uses a sub-block to represent an M×N sub-block and uses an adjacent block to represent an adjacent M×N block for description.

Figure 7:
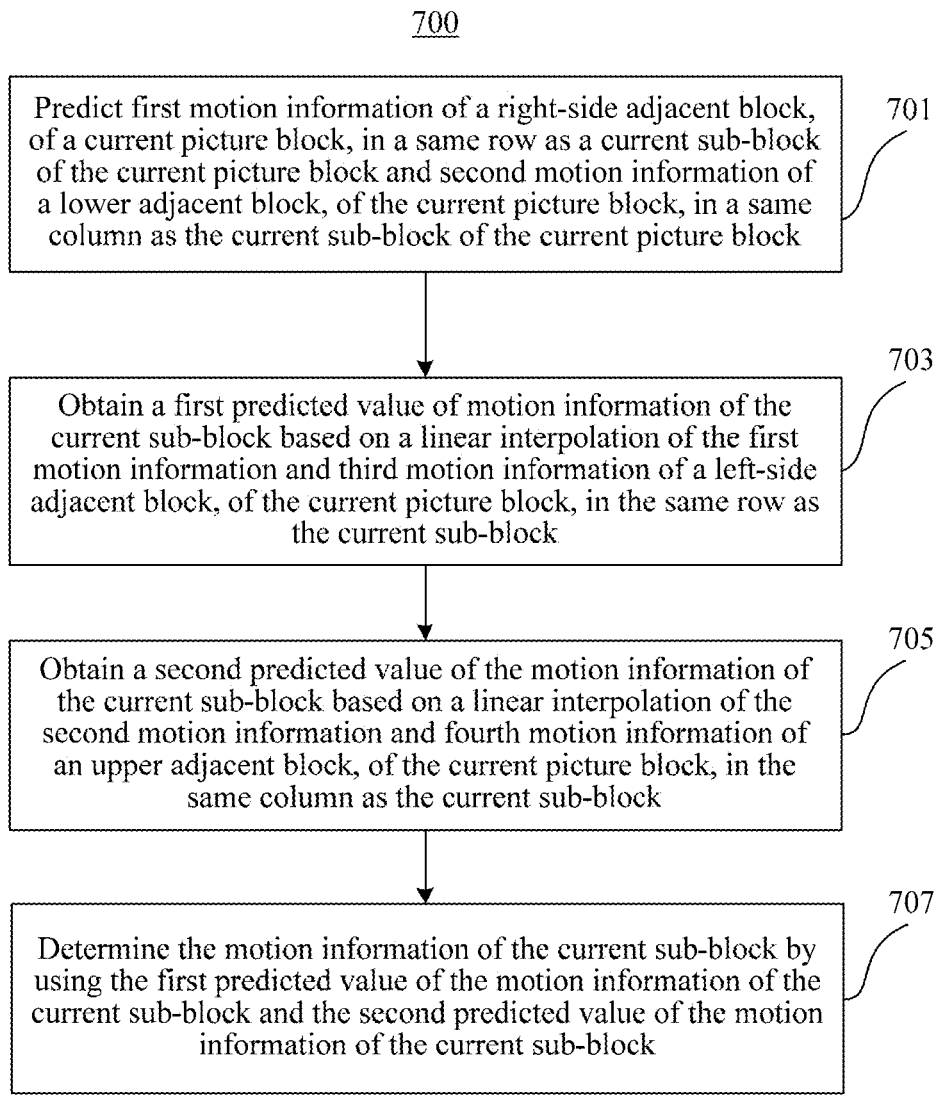
FIG. 7 is a flowchart of a method for obtaining motion information of a current sub-block in a current picture block based on a first inter prediction mode used for a non-directional motion field according to an embodiment of this application.

FIG. 7 is a flowchart of a process 700 of predicting motion information of a current sub-block in a current picture block based on a first inter prediction mode according to an embodiment of this application. The process 700 may be performed by the video encoder 100 or the video decoder 200, and specifically, may be performed by the inter predictor 110 of the video encoder 100 or the inter predictor 210 of the video decoder 200. The process 700 is described as a series of steps or operations. It should be understood that steps or operations of the process 700 may be performed in various sequences and/or simultaneously, not limited to an execution sequence shown in FIG. 7. It is assumed that a video encoder or a video decoder is used for a video data stream with a plurality of video frames, to perform the process 700 including the following steps to predict motion information of a current sub-block of a current picture block of a current video frame.

Step 701 Predict (derive), using motion information of a plurality of reference blocks, first motion information of a right-side spatially-adjacent block 806, of the current picture block 600, in a same row as the current sub-block 604 of the current picture block 600 and second motion information of a lower spatially-adjacent block 808, of the current picture block 600, in a same column as the current sub-block 604 of the current picture block 600, where the reference blocks may include a picture block spatially and/or temporally adjacent to the current picture block 600. In this specification, the current picture block is a current to-be-encoded or to-be-decoded picture block.

Step 703 Obtain a first predicted value $P_h(x, y)$ of the motion information of the current sub-block 604 based on a linear (horizontal) interpolation of the derived first motion information of the right-side spatially-adjacent block 806 and third motion information of a left-side adjacent block 802, of the current picture block 600, in the same row as the current sub-block 604.

In an implementation, in step 703, a weighted value of the first motion information of the right-side adjacent block 806, of the current picture block 600, in the same row as the current sub-block 604 and the third motion information of the left-side adjacent block 802, of the current picture block 600, in the same row as the current sub-block 604 is determined as the first predicted value $P_h(x, y)$ of the motion information of the current sub-block 604. A ratio of a weighting factor of the third motion information to a weighting factor of the first motion information is determined based on a ratio of a first distance between the right-side spatially-adjacent block 806, of the current picture block 600, in the same row as the current sub-block 604 of the current picture block 600 and the current sub-block 604 to a second distance between the current sub-block 604 and the left-side spatially-adjacent block 802, of the current picture block 600, in the same row as the current sub-block 604.

Step 705 Obtain a second predicted value $P_v(x, y)$ of the motion information of the current sub-block 604 based on a linear (vertical) interpolation of the derived second motion information of the lower spatially-adjacent block 808 and fourth motion information of an upper adjacent block 809, of the current picture block 600, in the same column as the current sub-block 604.

In an implementation, in step 705, a weighted value of the fourth motion information of the upper spatially-adjacent block 809, of the current picture block 600, in the same column as the current sub-block 604 and the second motion information of the lower spatially-adjacent block 808, of the current picture block 600, in the same column as the current sub-block 604 is determined as the second predicted value $P_v(x, y)$ of the motion information of the current sub-block 604. A ratio of a weighting factor of the fourth motion information to a weighting factor of the second motion information is determined based on a ratio of a third distance between the lower spatially-adjacent block 808, of the current picture block 600, in the same column as the current sub-block 604 of the current picture block 600 and the current sub-block 604 to a fourth distance between the current sub-block 604 and the upper spatially-adjacent block 809, of the current picture block 600, in the same column as the current sub-block 604.

Step 707 Determine the motion information P(x, y) of the current sub-block 604 using the first predicted value $P_h(x, y)$ of the motion information of the current sub-block 604 and the second predicted value $P_v(x, y)$ of the motion information of the current sub-block 604.

In an implementation, in step 707, the motion information P(x, y) of the current sub-block 604 is obtained by performing weighting processing on the first predicted value $P_h(x, y)$ of the motion information of the current sub-block 604 and the second predicted value $P_v(x, y)$ of the motion information of the current sub-block 604. It should be understood that, when weighting factors are the same, the weighting processing is equivalent to calculating an average value, in an embodiment, an average value of the first predicted value $P_h(x, y)$ of the motion information of the current sub-block 604 and the second predicted value of the motion information of the current sub-block 604 is determined as the motion information of the current sub-block 604.

Figure 8A:
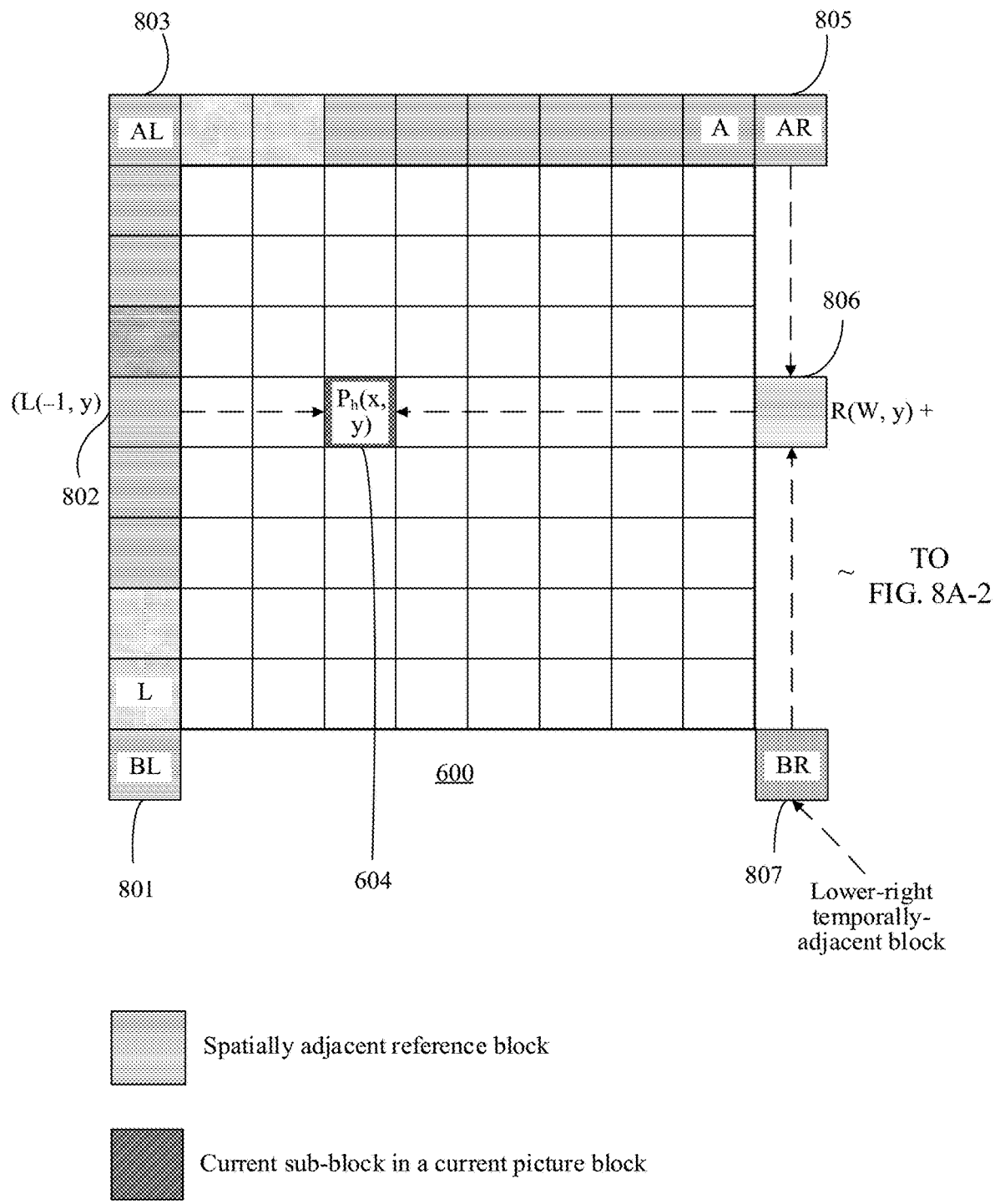
Figure 8B:
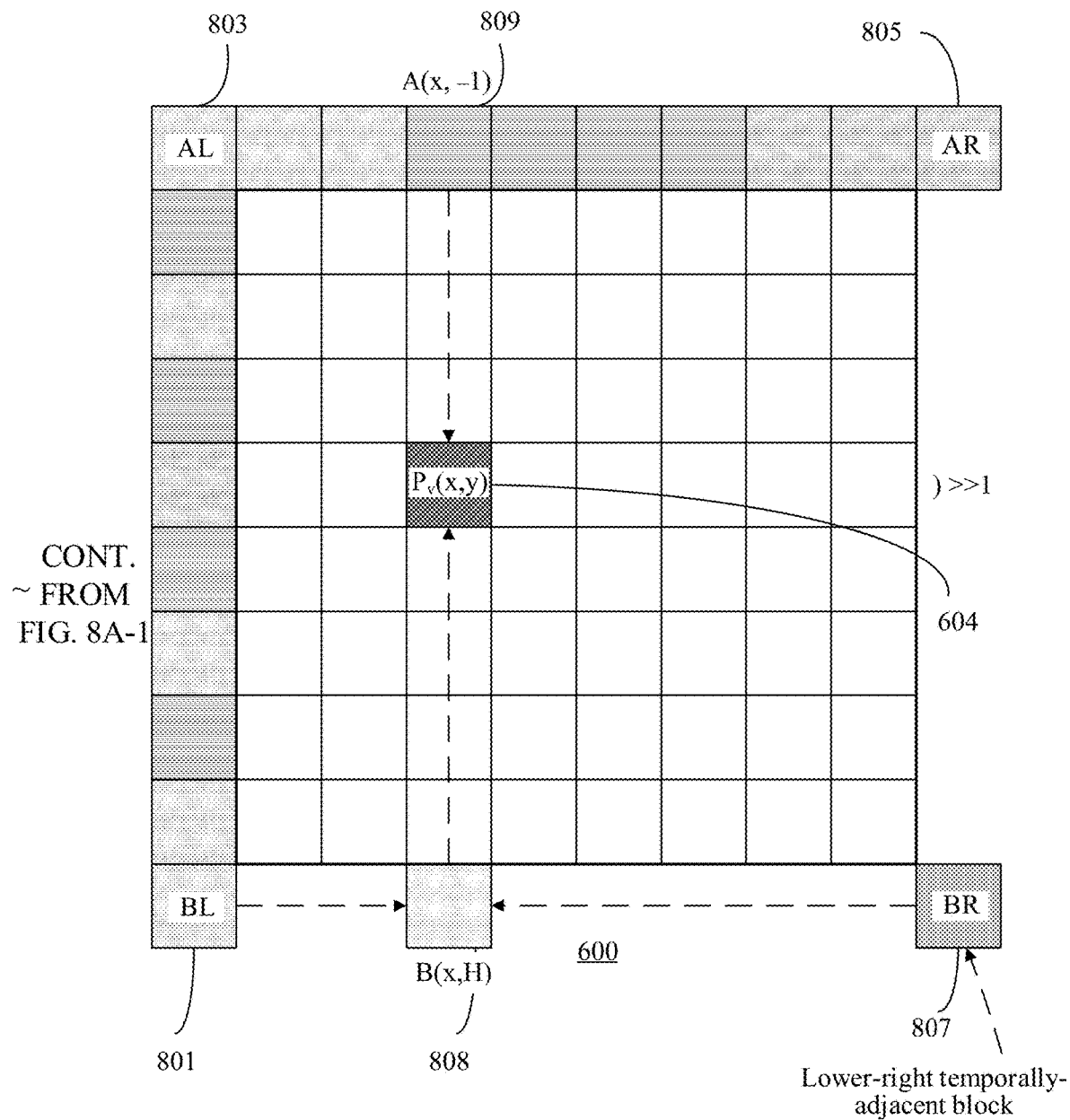

In this embodiment of this application, there are a plurality of different implementations for deriving the first motion information of the right-side spatially-adjacent block 806 in the same row as the current sub-block 604 and the second motion information of the lower spatially-adjacent block 808 in the same column as the current sub-block 604. In a first implementation, as shown in FIG. 8A and FIG. 8B, step 701 may include the following steps.

Step 701A-1 Obtain the first motion information of the right-side spatially-adjacent block 806, of the current picture block 600, in the same row as the current sub-block 604 of the current picture block 600 based on a linear (vertical) interpolation of fifth motion information of a lower-right spatially-adjacent block 807 of a first co-located block 600' (lower-right temporally-adjacent block) of the current picture block 600 and sixth motion information of an upper-right spatially-adjacent block 805 of the current picture block 600.

Step 701A-2 Obtain the second motion information of the lower spatially-adjacent block 808, of the current picture block 600, in the same column as the current sub-block 604 of the current picture block 600 based on a linear interpolation (namely, a horizontal interpolation) of the fifth motion information of the lower-right spatially-adjacent block 807 of the first co-located block 600' (lower-right temporally-adjacent block) of the current picture block 600 and seventh motion information of a lower-left spatially-adjacent block 801 of the current picture block 600, where the first co-located block 600' is a picture block that is in a reference picture and whose size, shape, and coordinates are the same as those of the current picture block 600.

In a specific implementation, in step 701A-1, the first motion information of the right-side spatially-adjacent block 806 is obtained by performing the vertical interpolation on the fifth motion information of the lower-right spatially-adjacent block 807 of the first co-located block 600' and the sixth motion information of the upper-right spatially-adjacent block 805 of the current picture block 600 according to formula (1).

In step 701A-2, the second motion information of the lower spatially-adjacent block 808 is obtained by performing the horizontal interpolation on the fifth motion information of the lower-right spatially-adjacent block 807 of the first co-located block 600' and the seventh motion information of the lower-left spatially-adjacent block 801 of the current picture block 600 according to formula (2).

$$R(W,y)=((H-y-1) \times AR+(y+1) \times BR)/H \quad (1), \text{ and}$$

$$B(x,H)=((W-x-1) \times BL+(x+1) \times BR)/W \quad (2)$$

where (x, y) represents coordinates of the current sub-block 604 relative to an upper-left sub-block of the current picture block 600, x is an integer between 0 and W−1, y is an integer between 0 and H−1, W and H represent a width and a height (measured in sub-blocks) of the current picture block 600, AR represents the sixth motion information of the upper-right spatially-adjacent block 805, BR represents the fifth motion information of the lower-right temporally-adjacent block 807, and BL represents the seventh motion information of the lower-left spatially-adjacent block 801.

In a specific implementation, in step 703, the first predicted value of the motion information of the current sub-block 604 is obtained by performing the horizontal interpolation on the first motion information of the right-side spatially-adjacent block 806 and the third motion information of the left-side spatially-adjacent block 802 according to formula (3).

In a specific implementation, in step 705, the second predicted value of the motion information of the current sub-block 604 is obtained by performing the vertical interpolation on the second motion information of the lower spatially-adjacent block 808 and the fourth motion information of the upper spatially-adjacent block 809 according to formula (4).

In addition, in step 707, an average value of motion vectors obtained through the horizontal and vertical linear interpolations (formula 5) is a motion vector of the current sub-block.

$$P_h(x,y)=(W-1-x) \times L(-1,y)+(x+1) \times R(W,y) \quad (3)$$

$$P_v(x,y)=(H-1-y) \times A(x,-1)+(y+1) \times B(x,H) \quad (4)$$

$$P(x,y)=(H \times P_h(x,y)+W \times P_v(x,y)+H \times W)/(2 \times H \times W) \quad (5)$$

where L(−1,y) represents a third motion vector of the left-side spatially-adjacent block 802 in the row in which the current sub-block 604 is located, R(W,y) represents a first motion vector of the right-side spatially-adjacent block 806 in the row in which the current sub-block 604 is located, A(x,−1) represents a fourth motion vector of the upper spatially-adjacent block 809 in the column in which the current sub-block 604 is located, B(x,H) represents a second motion vector of the lower spatially-adjacent block 808 in the column in which the current sub-block 604 is located, $P_h(x,y)$ represents a motion vector obtained through the horizontal interpolation (that is, the first predicted value), $P_v(x,y)$ represents a motion vector obtained through the vertical interpolation (that is, the second predicted value), and P(x, y) represents the motion vector of the current sub-block 604.

Figure 8D:
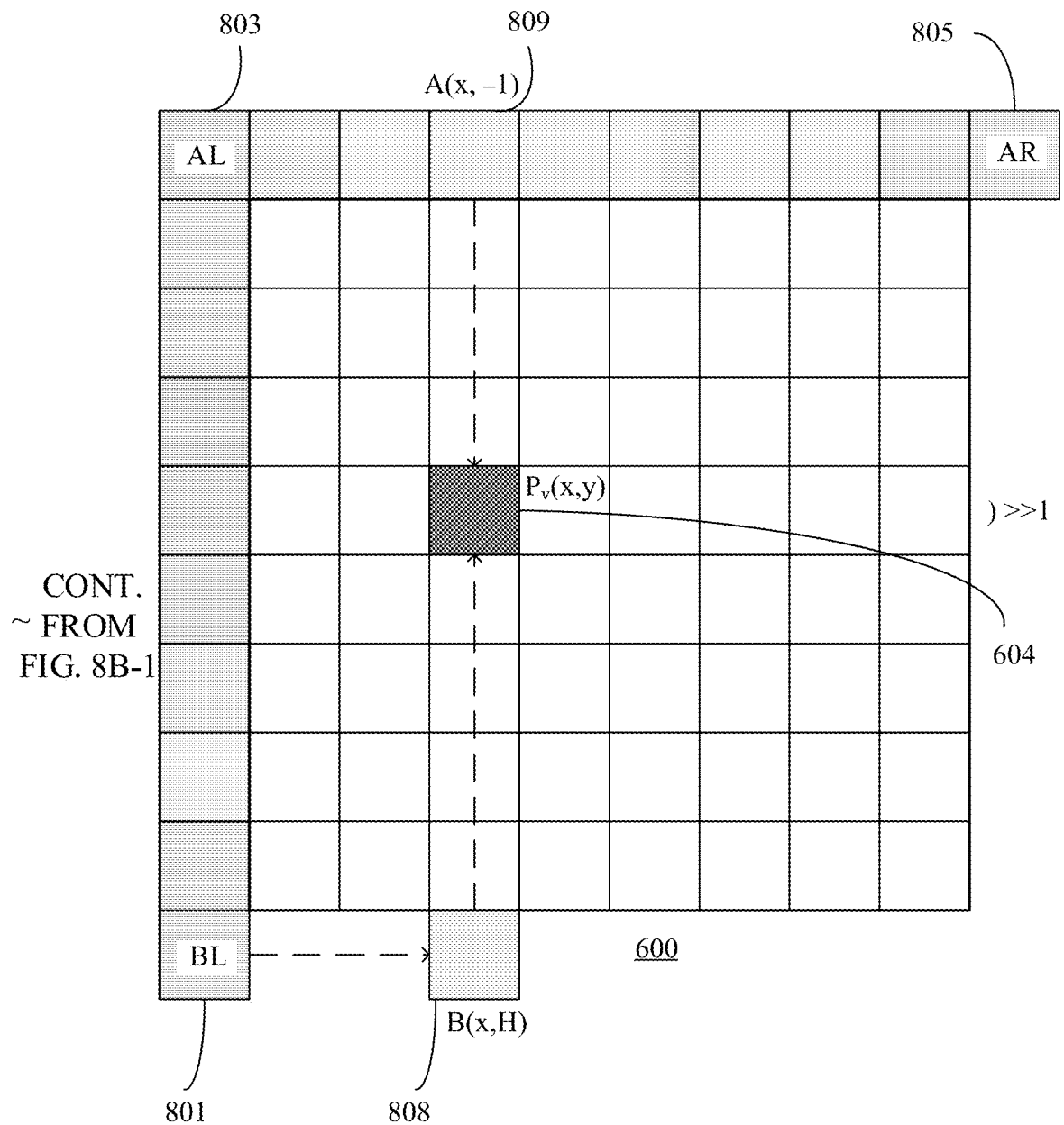

In a second implementation, as shown in FIG. 8C and FIG. 8D, a difference from the foregoing implementation lies in that the first motion information of the right-side spatially-adjacent block 806 and the second motion information of the lower spatially-adjacent block 808 are predicted/derived in the following manner, that is, step 701 may include the following steps.

Step 701B-1 Determine sixth motion information of an upper-right spatially-adjacent block 805 of the current picture block 600 as the first motion information of the right-side spatially-adjacent block 806 in the same row as the current sub-block 604, or determine an average value of motion information of a plurality of upper-right spatially-adjacent blocks of the current picture block 600 as the first motion information of the right-side spatially-adjacent block 806.

Step 701B-2 Determine seventh motion information of a lower-left spatially-adjacent block 801 of the current picture block 600 as the second motion information of the lower spatially-adjacent block 808 in the same column as the current sub-block 604, or determine an average value of motion information of a plurality of lower-left spatially-adjacent blocks of the current picture block 600 as the second motion information of the lower spatially-adjacent block 808.

Figure 8E:
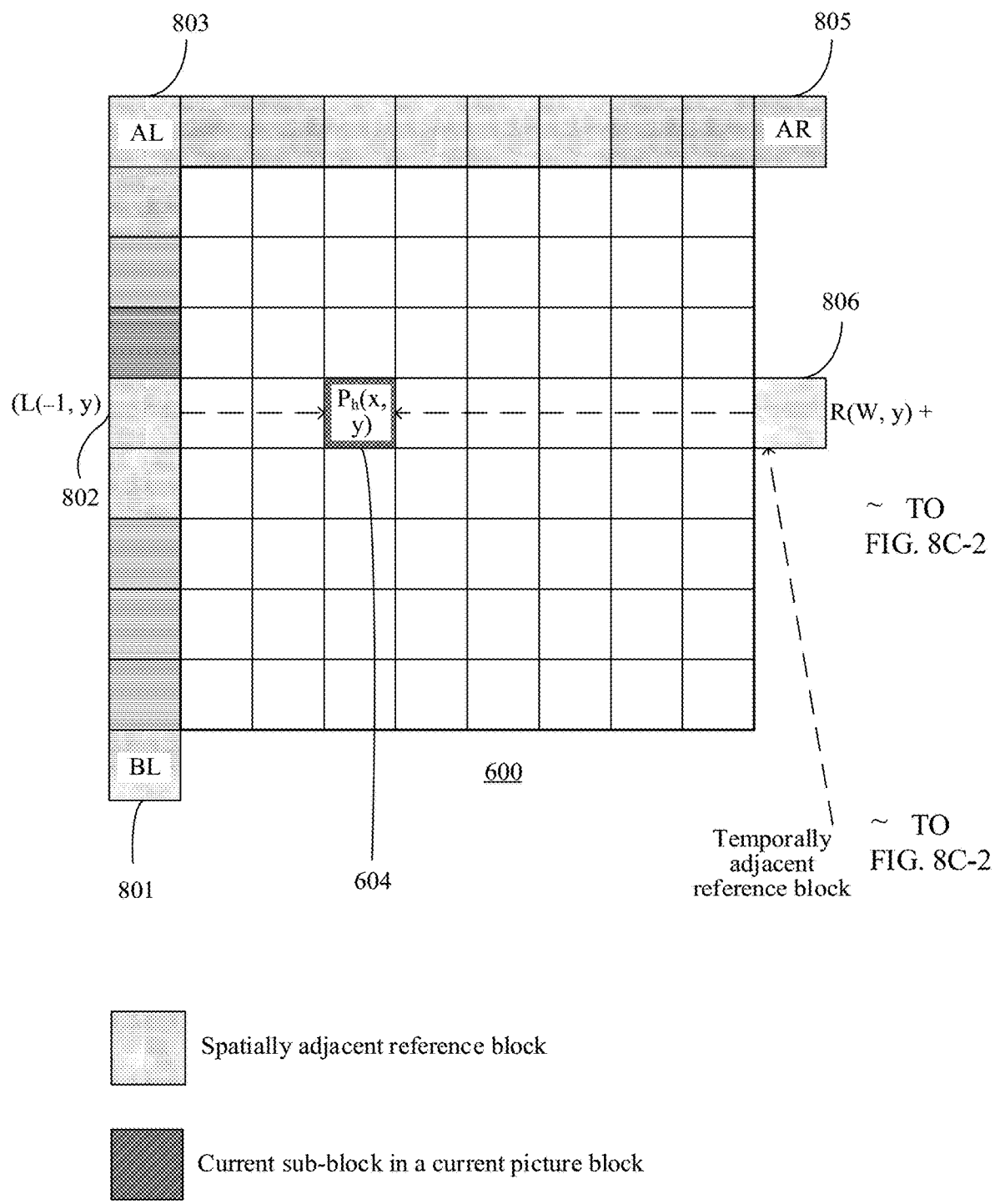
Figure 8F:
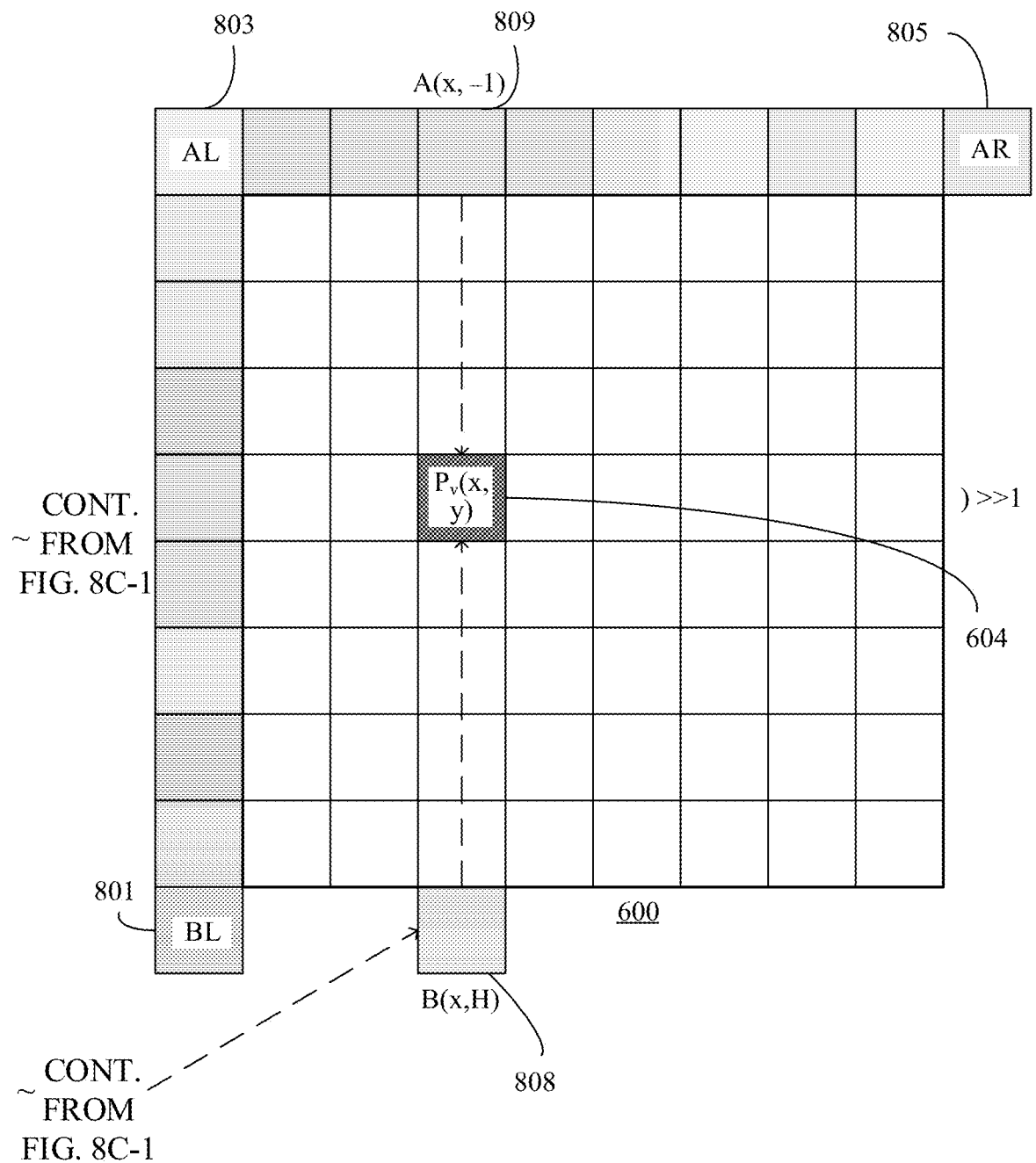

In a third implementation, as shown in FIG. 8E and FIG. 8F, a difference from the foregoing implementation lies in that the first motion information of the right-side spatially-adjacent block 806 and the second motion information of the lower spatially-adjacent block 808 are predicted/derived in the following manner, that is, step 701 may include the following steps Step 701C-1 Determine motion information of a first right-side spatially-adjacent block of a first co-located block

600' (right-side temporally-adjacent reference block) of the current picture block 600 as the first motion information of the right-side spatially-adjacent block 806, where a row in which the first right-side spatially-adjacent block is located in the first co-located block 600' is the same as the row in which the current sub-block 604 is located in the current picture block 600.

Step 701C-2 Determine motion information of a first lower spatially-adjacent block of the first co-located block 600' (lower temporally-adjacent reference block) of the current picture block 600 as the second motion information of the lower spatially-adjacent block 808, where a column in which the first lower spatially-adjacent block is located in the first co-located block 600' is the same as the column in which the current sub-block 604 is located in the current picture block 600, and the first co-located block 600' is a picture block that is in a reference picture and whose size, shape, and coordinates are the same as those of the current picture block 600.

Figure 8G:
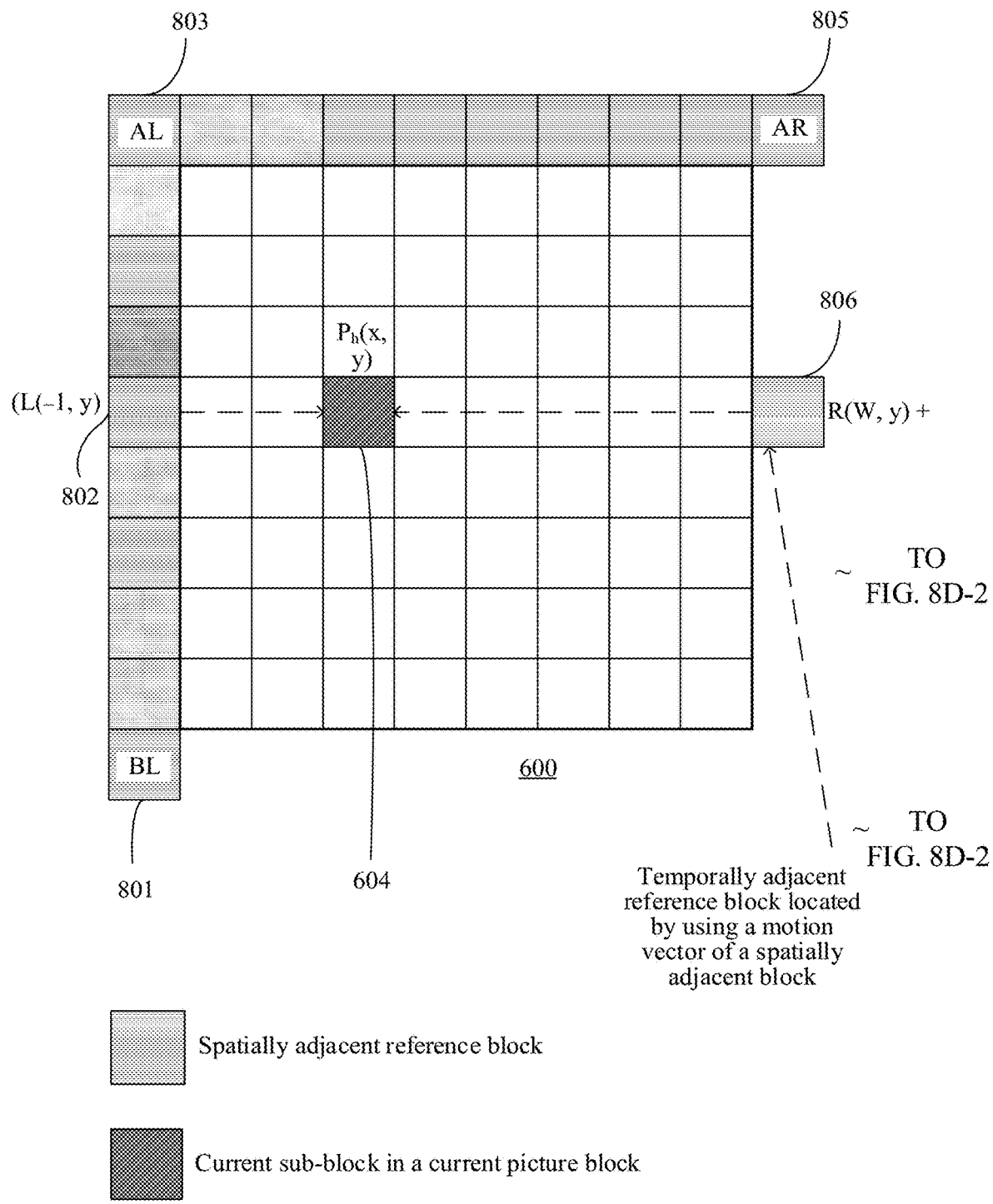
Figure 8H:
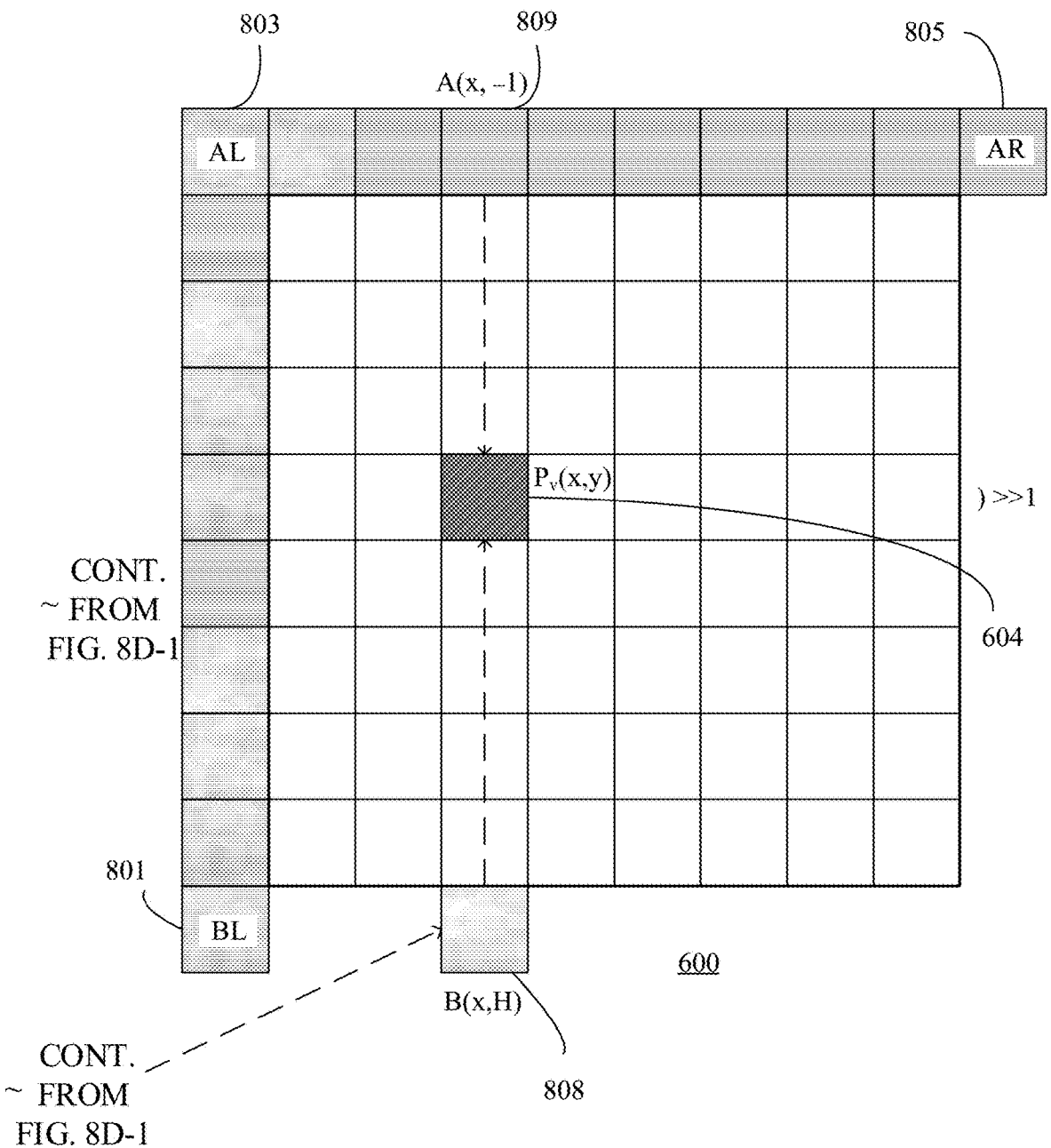

In a fourth implementation, as shown in FIG. 8G and FIG. 8H, a difference from the foregoing implementation lies in that the first motion information of the right-side spatially-adjacent block 806 and the second motion information of the lower spatially-adjacent block 808 are predicted/derived in the following manner, that is, step 701 may include the following steps.

Step 701D-1 Determine motion information of a second right-side spatially-adjacent block of a second co-located block (right-side temporally-adjacent reference block) of the current picture block 600 as the first motion information of the right-side spatially-adjacent block 806, where the second co-located block is a picture block that is in a reference picture and that has a specified location offset from the current picture block 600, a motion vector of a representative spatially-adjacent block of the current picture block 600 is used to indicate the specified location offset, and a row in which the second right-side spatially-adjacent block is located in the second co-located block is the same as the row in which the current sub-block 604 is located in the current picture block 600.

Step 701D-2 Determine motion information of a second lower spatially-adjacent block of the second co-located block (lower temporally-adjacent reference block) of the current picture block 600 as the second motion information of the lower spatially-adjacent block 808, where the second co-located block is the picture block that is in the reference picture and that has the specified location offset from the current picture block 600, the motion vector of the representative spatially-adjacent block of the current picture block 600 is used to indicate the specified location offset, and a column in which the second lower spatially-adjacent block is located in the second co-located block is the same as the column in which the current sub-block 604 is located in the current picture block 600.

It should be noted that the representative spatially-adjacent block herein may be an available spatially-adjacent block in left-side spatially-adjacent blocks or upper spatially-adjacent blocks shown in FIG. 6A and FIG. 6B, for example, may be the first available left-side spatially-adjacent block detected in a direction 1, or may be the first available upper spatially-adjacent block detected in a direction 2. For example, the representative spatially-adjacent block may be the first available spatially-adjacent block obtained by sequentially detecting a plurality of specified spatially-adjacent location points of the current picture block in a merge mode, such as L→A→AR→BL→AL shown in FIG. 8A and FIG. 8B. For example, the representative spatially-adjacent block may alternatively be a representative spatially-adjacent block that is selected randomly or according to a predetermined rule from a plurality of available spatially-adjacent blocks obtained through sequential detection. This is not limited in this embodiment of this application.

It should be understood that, for ease of description, in this embodiment of this application, the current sub-block 604 in the current picture block 600 is used as a representative to describe a motion vector prediction process of the current sub-block 604. For a motion vector prediction process of each sub-block in the current picture block 600, refer to the descriptions in this embodiment, and details are not described herein.

It can be learned from the foregoing that, in the inter prediction process based on the first inter prediction mode used for a non-directional motion field (also referred to as a planar mode used for inter prediction) in this embodiment of this application, the motion vector of the current sub-block is derived using an average value of horizontal and vertical linear interpolations such that a motion vector of a picture block with a graded motion field or a sub-block of such a picture block can be better predicted, thereby improving motion vector prediction accuracy.

Figure 9:
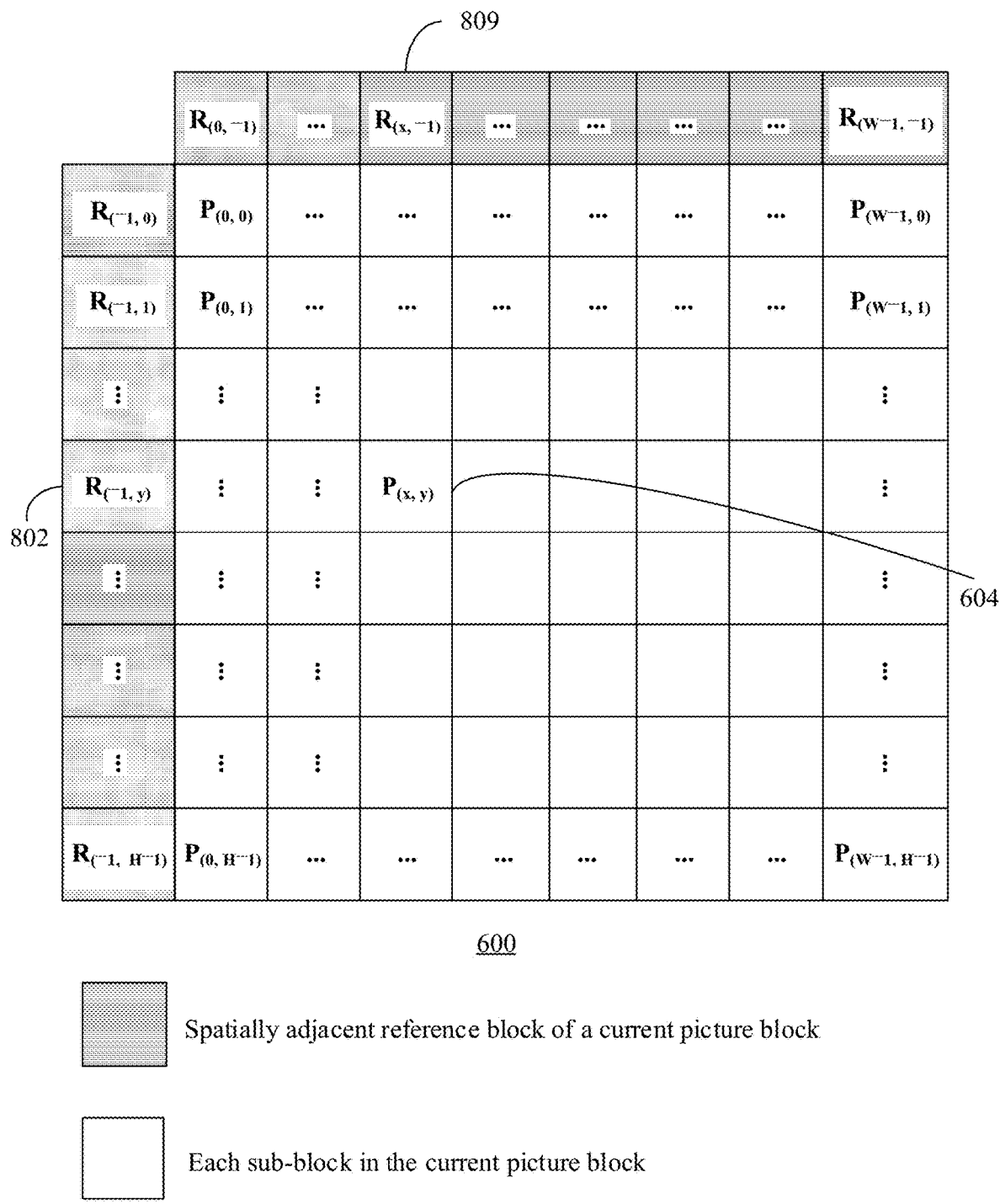
FIG. 9 is a schematic principle diagram of an example second inter prediction mode according to an embodiment of this application.

FIG. 9 is a schematic diagram of predicting motion information of a current sub-block in a current picture block based on a second inter prediction mode according to another embodiment of this application. As shown in FIG. 9, for the current sub-block 604 of the current picture block 600, an average value of third motion information of a left-side spatially-adjacent block 802, of the current picture block 600, in a same row as the current sub-block 604 of the current picture block 600 and fourth motion information of an upper spatially-adjacent block 809, of the current picture block 600, in a same column as the current sub-block 604 is determined as the motion information of the current sub-block 604.

Alternatively, an average value of motion information of a plurality of left-side spatially-adjacent blocks of the current picture block 600 and motion information of a plurality of upper spatially-adjacent blocks of the current picture block 600 is determined as motion information of one or more sub-blocks (which may specifically be all sub-blocks) of the current picture block 600.

It should be understood that, for ease of description, in this embodiment of this application, the current sub-block 604 in the current picture block 600 is used as a representative to describe a motion vector prediction process of the current sub-block 604. For a motion vector prediction process of each sub-block in the current picture block 600, refer to the descriptions in this embodiment, and details are not described herein.

It can be learned from the foregoing that, in an inter prediction process based on the second inter prediction mode used for a non-directional motion field (also referred to as a DC mode used for inter prediction) in this embodiment of this application, a motion vector of the current sub-block is derived using an average value of motion vectors of a direct left-side spatially-adjacent block and the upper spatially-adjacent block of the current picture block such that a motion vector of a picture block with a smooth motion field or a sub-block of such a picture block can be better predicted, thereby improving motion vector prediction accuracy.

FIG. 10A to FIG. 10G are schematic principle diagrams of predicting motion information of a current sub-block in a current picture block based on an inter-frame direction prediction mode according to another embodiment of this application. A process in which the video encoder 100 or the video decoder 200 (specifically the inter predictor 110 or the inter predictor 210) predicts the motion information of the current sub-block of the current picture block is as follows.

A plurality of sub-blocks in the current picture block are projected to a reference row 1010 or a reference column 1020 based on a prediction direction corresponding to the inter-frame direction prediction mode.

The reference row 1010 does not belong to the current picture block 600, and the reference row 1010 is a row of upper spatially-adjacent blocks adjacent to the first row of sub-blocks of the current picture block. The first column of the reference row 1010 may be aligned with the first column of the current picture block, or may not be aligned with the first column of the current picture block (for example, exceeding the first column of the current picture block and extending leftward). The reference column 1020 does not belong to the current picture block 600, and the reference column 1020 is a column of left-side spatially-adjacent adjacent to the first column of sub-blocks of the current picture block. The first row of the reference column 1020 may be aligned with the first row of the current picture block, and the last row of the reference column 1020 may be aligned with the last row of the current picture block, or may not be aligned with the last row of the current picture block 600 (for example, exceeding the last row of the current picture block and extending downward). A reference block on which the reference row 1010 intersects the reference column 1020 is an upper-left spatially-adjacent block of the current picture block 600. It should be understood that the projection herein is not limited to an operation, but is a description manner introduced to facilitate description of a correspondence between a sub-block and a target reference block.

If the current sub-block is projected to a target reference block in the reference row 1010 or the reference column 1020, motion information of the target reference block is determined as the motion information of the current sub-block.

If the current sub-block is projected to two target reference blocks in the reference row 1010 or the reference column 1020, weighting processing is performed on motion information of the two target reference blocks to obtain the motion information of the current sub-block, or weighting processing is performed on motion information of the two target reference blocks and left-side and right-side or upper and lower adjacent blocks of the two target reference blocks to obtain the motion information of the current sub-block. It should be understood that the former is weighting of two motion vectors, and the latter is weighting of four motion vectors. A weighting factor herein is determined based on a distance between a reference block and a projection point, and a shorter distance indicates a larger weight.

It should be understood that the target reference block (also referred to as a projection reference block) mentioned herein is a reference block that is determined in the reference row 1010 or the reference column 1020 based on the prediction direction (angle) corresponding to the inter-frame direction prediction mode and that corresponds to the current sub-block. Such a correspondence may be understood as that the current sub-block and the target reference block are in a same prediction direction.

Figure 10A:
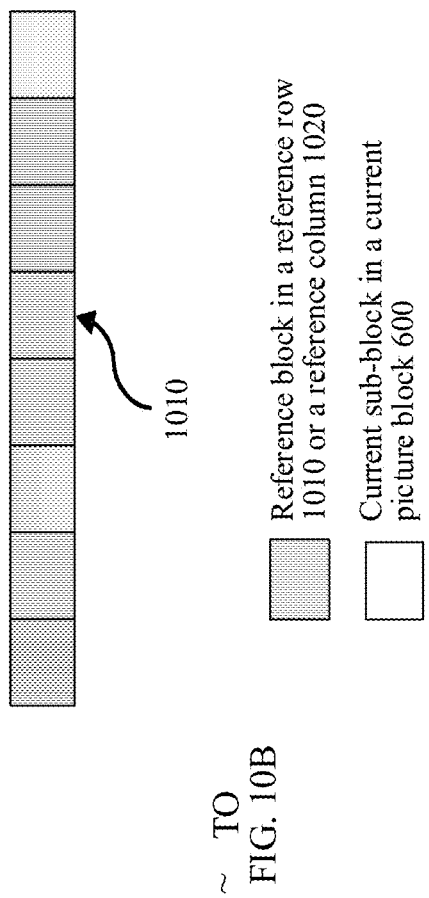
FIG. 10A to FIG. 10G are schematic principle diagrams of five example inter-frame direction prediction modes according to an embodiment of this application.
Figure 10B:
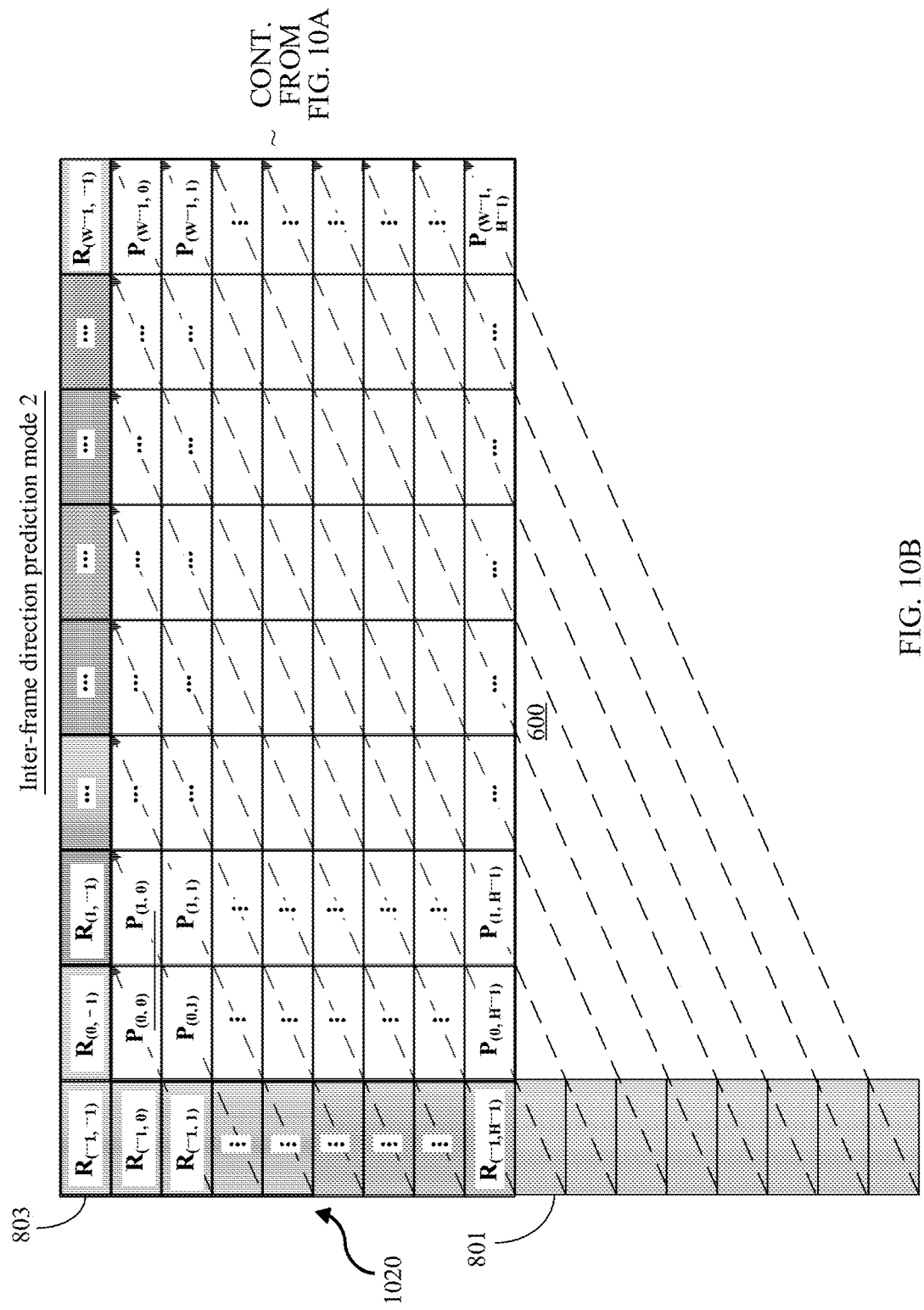

FIG. 10A and FIG. 10B show a projection manner of an inter-frame direction prediction mode (the mode 2 in FIG. 5 or Table 2). A dashed-line arrow represents a prediction direction corresponding to the inter-frame direction prediction mode 2. For example, $P_{(0, 0)}=R_{(-1, 1)}$, where $P_{(0, 0)}$ represents a motion vector of an upper-left sub-block (0, 0) of the current picture block, and $R_{(-1, 1)}$ represents a motion vector of a left-side spatially-adjacent block (−1, 1) of the current picture block. The rest may be deduced by analogy, and is not described one by one herein.

Figure 10C:
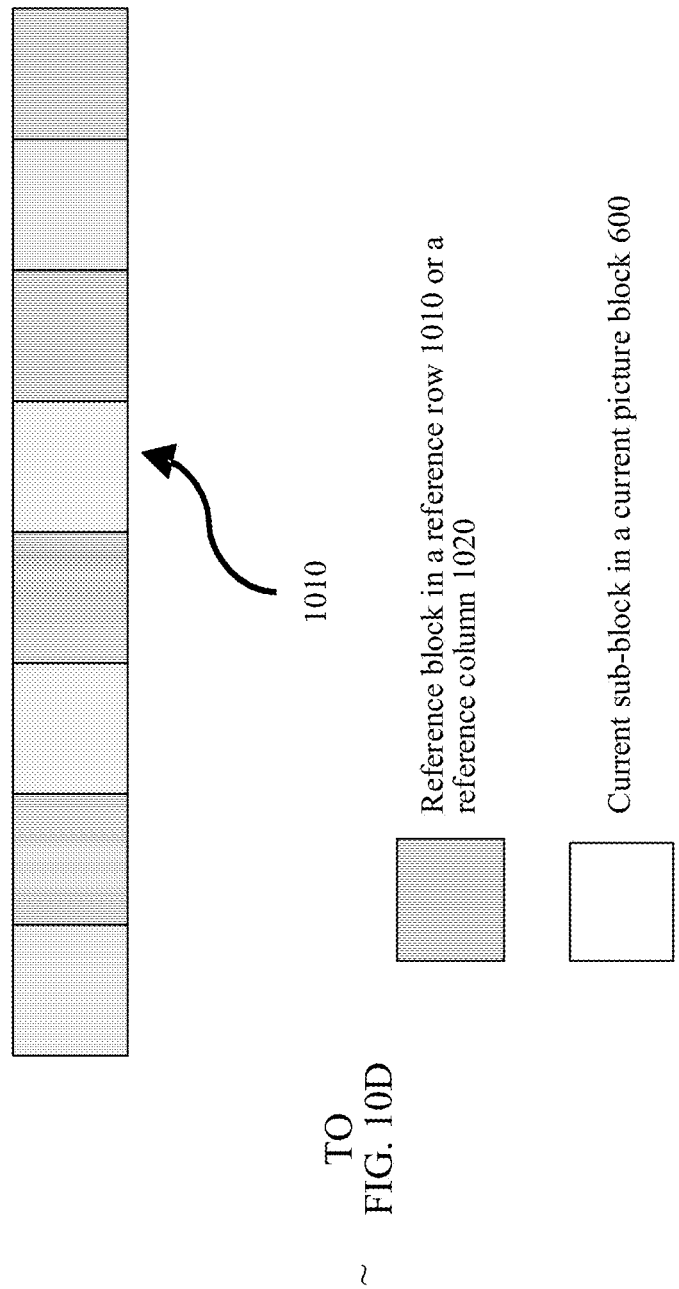
Figure 10D:
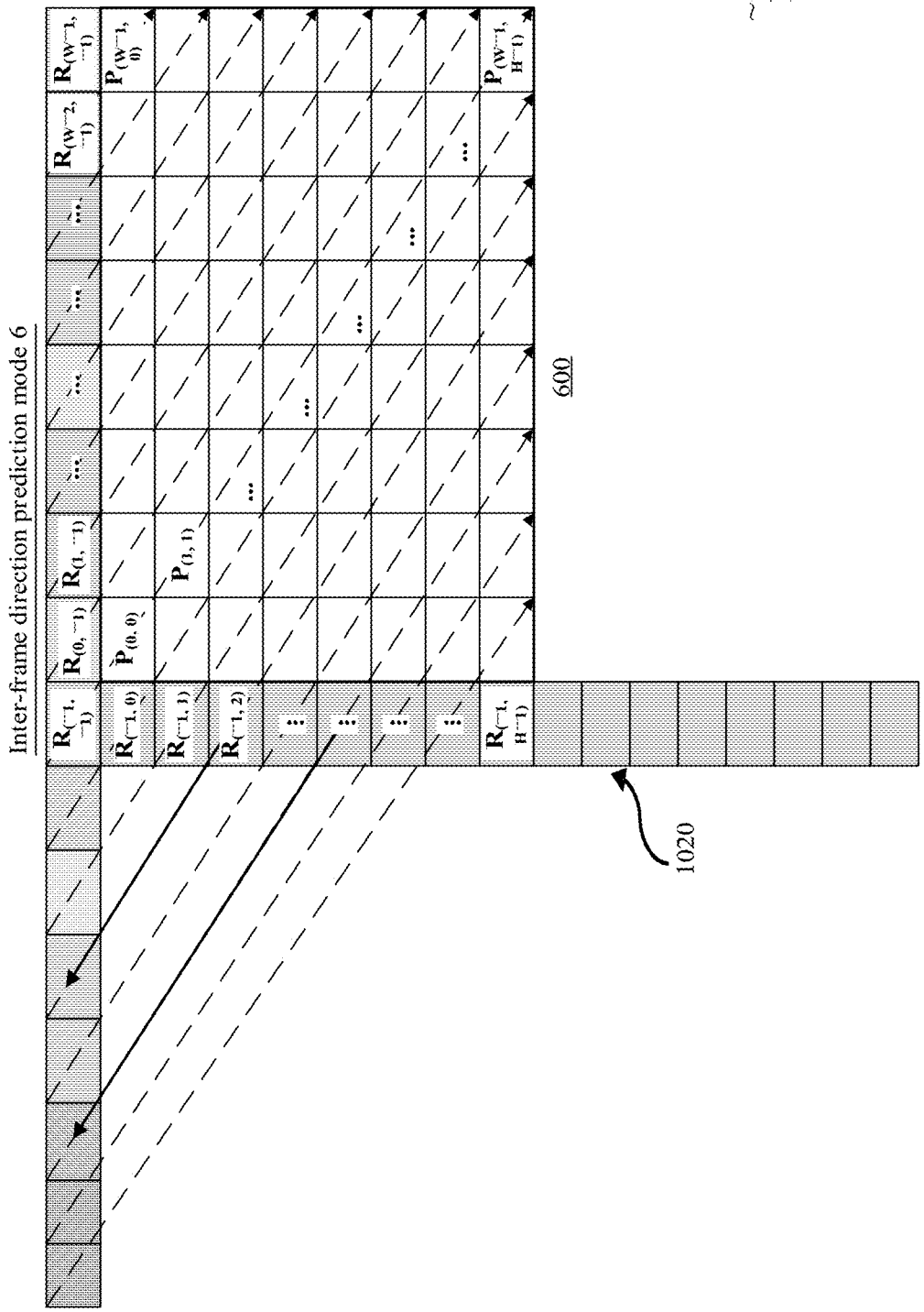

FIG. 10C and FIG. 10D show a projection manner of another inter-frame direction prediction mode (the mode 6 in FIG. 5 or Table 2). A dashed-line arrow represents a prediction direction corresponding to the inter-frame direction prediction mode 6. For example, $P_{(0, 0)}=P_{(1, 1)}=R_{(W-1, H-1)}=R_{(-1, 1)}$, where $P_{(0, 0)}, P_{(1, 1)}, \ldots,$ and $P_{(W-1, H-1)}$ represent motion vectors of sub-blocks whose coordinate positions are (0, 0), (1, 1), . . . , and (W−1, H−1) in the current picture block, and $R_{(-1, -1)}$ represents a motion vector of an upper-left spatially-adjacent block (−1, −1) of the current picture block. The rest may be deduced by analogy, and is not described one by one herein. It should be noted that, as shown by solid-line arrows in FIG. 10C and FIG. 10D, motion vectors of some reference blocks (that is, some left-side adjacent reference blocks) in the reference column 1020 are projected or mapped as motion vectors of some corresponding reference blocks in the reference row (especially an extension part of the reference row).

Figure 10E:
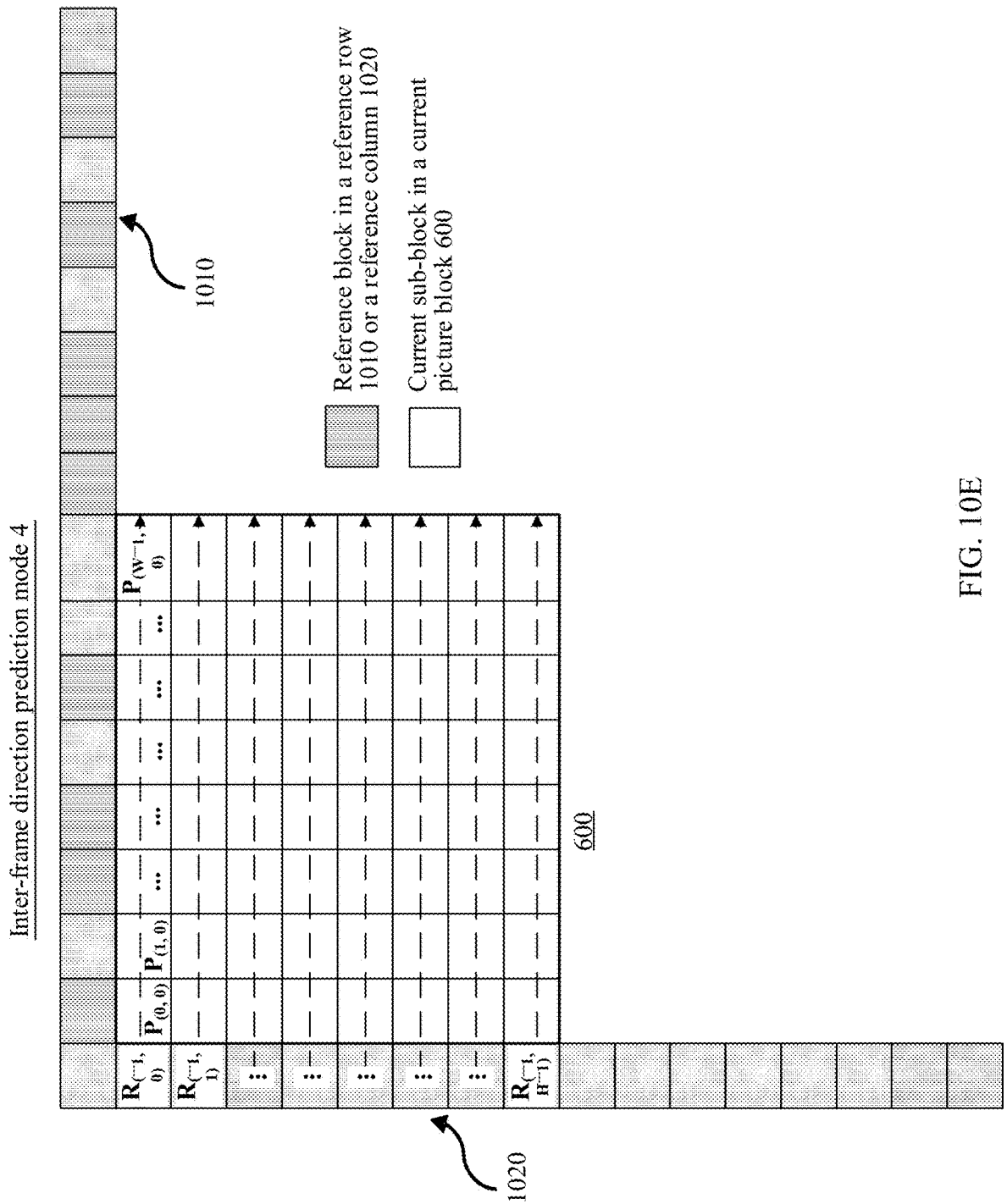

FIG. 10E shows a projection manner of another inter-frame direction prediction mode (a directly horizontal mode, for example, the mode 4 in FIG. 5 or Table 2, or the mode 10 in Table 3). A dashed-line arrow represents a prediction direction corresponding to the inter-frame direction prediction mode (that is, a horizontal direction). For example, $P_{(0, 0)}=P_{(1, 0)}=R_{(-1, 0)}$, where $P_{(0, 0)}, P_{(1,0)}, \ldots,$ and $P_{(W-1, 0)}$ respectively represent motion vectors of sub-blocks in the first row in the current picture block, and $R_{(-1, 0)}$ represents a motion vector of a left-side spatially-adjacent block (−1, 0) of the current picture block. The rest may be deduced by analogy, and is not described one by one herein.

Figure 10F:
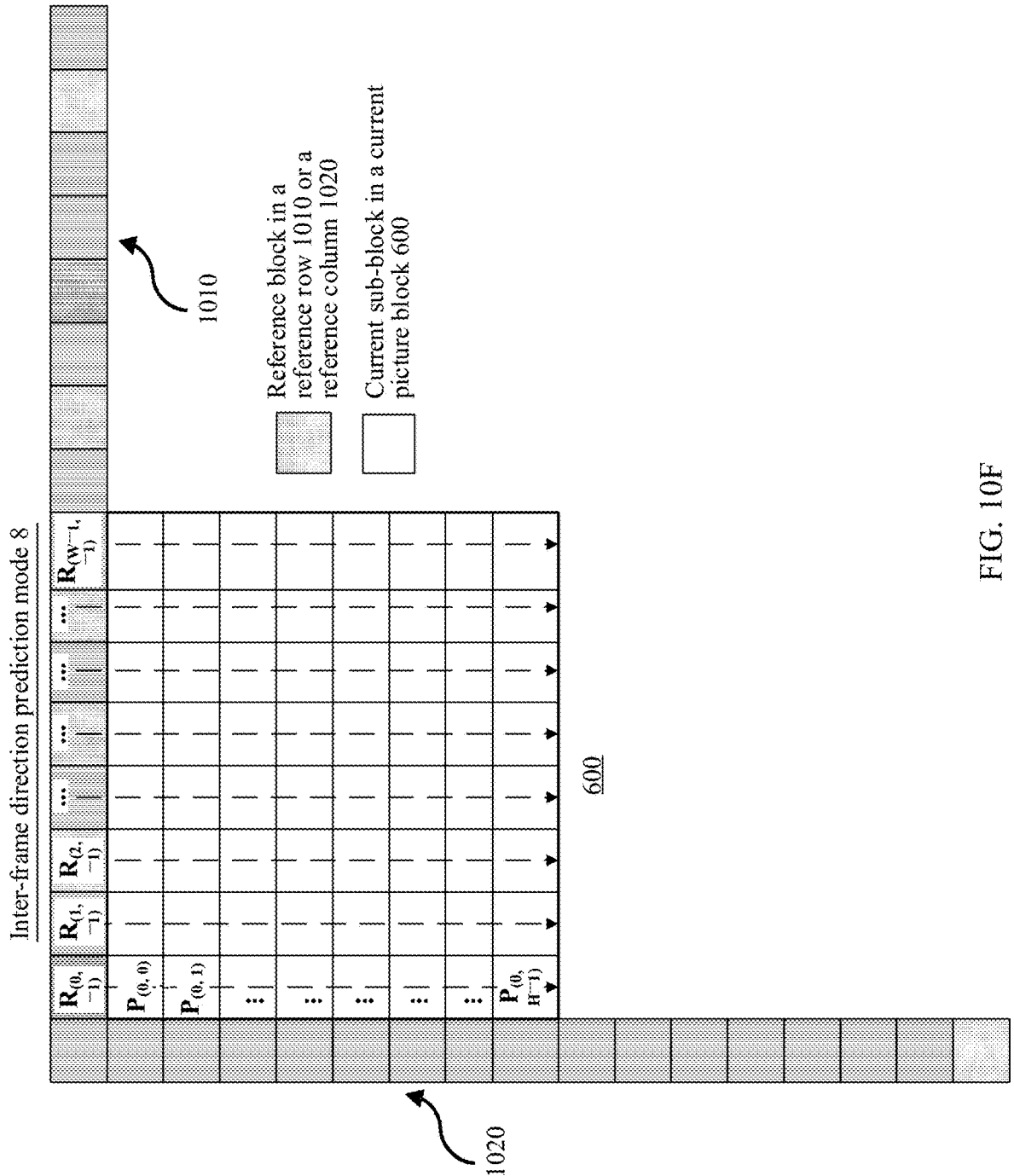

FIG. 10F shows a projection manner of another inter-frame direction prediction mode (a directly vertical mode, for example, the mode 8 in FIG. 5 or Table 2, or the mode 26 in Table 3). A dashed-line arrow represents a prediction direction corresponding to the inter-frame direction prediction mode (that is, a vertical direction). For example, $P_{(0, 0)}=P_{(0, 1)}=\ldots=P_{(0,H-1)}=R_{(0, -1)}$, where $P_{(0, 0)}, P_{(0, 1)}, \ldots,$ and $P_{(0, H-1)}$ respectively represent motion vectors of sub-blocks in the first column in the current picture block, and $R_{(0, -1)}$ represents a motion vector of an upper spatially-adjacent block (0, −1) of the current picture block. The rest may be deduced by analogy, and is not described one by one herein.

Figure 10G:
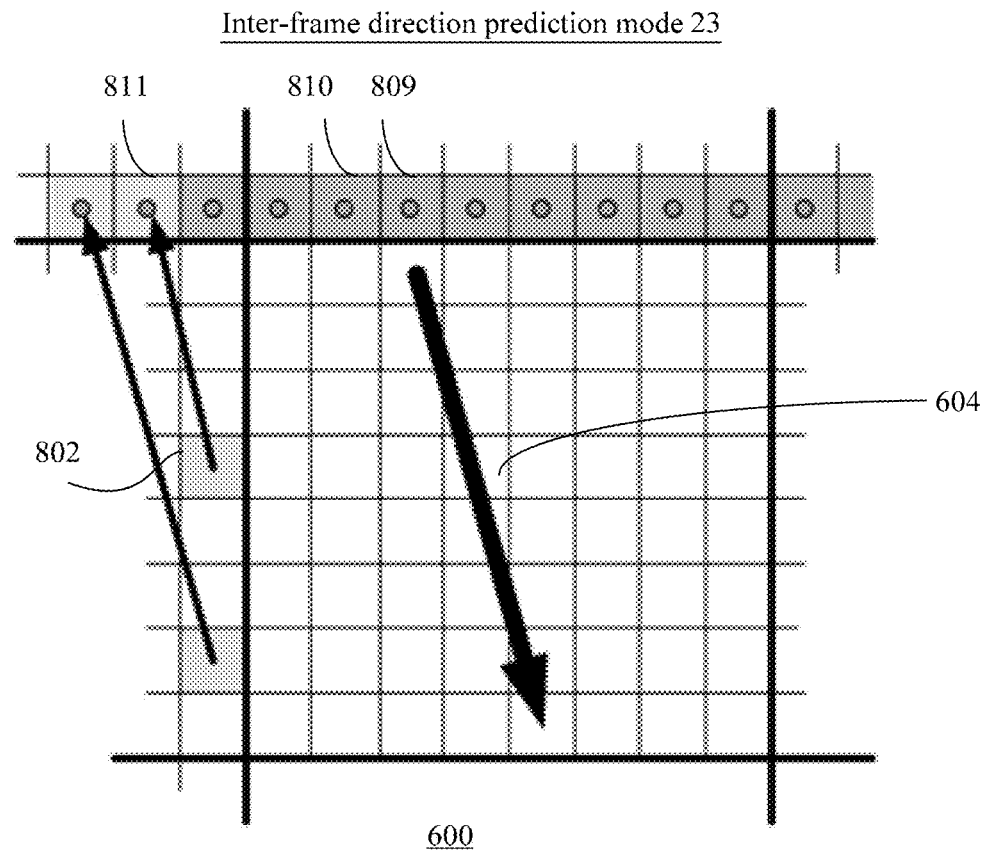

FIG. 10G shows a projection manner of still another inter-frame direction prediction mode (the mode 23 in Table 3). A bold arrow represents a prediction direction corresponding to the inter-frame direction prediction mode 23. For example, a weighted value of motion vectors of two upper spatially-adjacent blocks 809 and 810 that are adjacent to each other is a motion vector of the current sub-block 604. It should be noted that, in FIG. 10G, as shown by thin arrows, motion vectors of some left-side adjacent reference blocks are projected to extend a reference row. For example, a motion vector of a left-side spatially-adjacent block 802 is projected or mapped as a motion vector of an upper-left spatially-adjacent block 811 in an extension part of the reference row.

In a first example, for a motion information weighting manner in this embodiment of this application, 4-tap cubic intra-frame interpolation filtering in joint video exploration team (JVET) may be used.

Using an inter-frame vertical-direction prediction mode as an example (the modes 6 to 10 in FIG. 5 or Table 2), i is an integer part of a projection displacement, f represents a fractional part of the projection displacement, A is an angular parameter, y is a vertical coordinate of the current sub-block, and x is a horizontal coordinate of the current sub-block.

```
i=((y+1)×A)>>5  (6)
f=((y+1)×A)&31  (7)
Int xw = CubicFilter[f],
Int CubicFilter[32][4] = {
    { 0, 256, 0, 0 }, // 0 Integer-Pel
    { -3, 252, 8, -1 }, // 1
    { -5, 247, 17, -3 }, // 2
    { -7, 242, 25, -4 }, // 3
    { -9, 236, 34, -5 }, // 4
    { -10, 230, 43, -7 }, // 5
    { -12, 224, 52, -8 }, // 6
    { -13, 217, 61, -9 }, // 7
    { -14, 210, 70, -10 }, // 8
    { -15, 203, 79, -11 }, // 9
    { -16, 195, 89, -12 }, // 10
    { -16, 187, 98, -13 }, // 11
    { -16, 179, 107, -14 }, // 12
    { -16, 170, 116, -14 }, // 13
    { -17, 162, 126, -15 }, // 14
    { -16, 153, 135, -16 }, // 15
    { -16, 144, 144, -16 }, // 16 Half-Pel
},
P(x, y)=(w[0]×R(x+i-1, -1)+w[1]×R(x+i, -1)+w[2]×R(x+i+1,
-1)+w[3]×R(x+i+2, -1)+128)>>8  (8)
```

(x, y) represents coordinates of the current sub-block relative to an upper-left sub-block of the current picture block. $R(x+i-1, -1)$, $R(x+i, -1)$, $R(x+i+1, -1)$, and $R(x+i+2, -1)$ represent motion vectors of four neighboring reference blocks. Correspondingly, w[0], w[1], w[2], and w[3] represent weighting factors of the foregoing four reference blocks. P(x, y) represents a motion vector of the current sub-block.

It should be noted that, in an inter-frame horizontal-direction prediction mode, only x and y coordinates need to be exchanged in the formula (6), the formula (7), and the formula (8). Details are not described herein.

In a second example, for a motion information weighting manner in this embodiment of this application, 4-tap Gaussian intra-frame interpolation filtering in NET may be used, and the cubic intra-frame interpolation filtering in the first example is replaced with Gaussian intra-frame interpolation filtering. Details are not described herein.

```
Int xw = GaussFilter[f],
Int GaussFilter[32][4] = {
    { 47, 161, 47, 1 }, // 0 Integer-Pel
    { 43, 161, 51, 1 }, // 1
    { 40, 160, 54, 2 }, // 2
    { 37, 159, 58, 2 }, // 3
    { 34, 158, 62, 2 }, // 4
    { 31, 156, 67, 2 }, // 5
    { 28, 154, 71, 3 }, // 6
    { 26, 151, 76, 3 }, // 7
    { 23, 149, 80, 4 }, // 8
    { 21, 146, 85, 4 }, // 9
    { 19, 142, 90, 5 }, // 10
    { 17, 139, 94, 6 }, // 11
    { 16, 135, 99, 6 }, // 12
    { 14, 131, 104, 7 }, // 13
    { 13, 127, 108, 8 }, // 14
    { 11, 123, 113, 9 }, // 15
    { 10, 118, 118, 10 }, // 16 Half-Pel
},
```

In a third example, for a motion information weighting manner in this embodiment of this application, 2-tap intra-frame interpolation filtering in HEVC may be used.

The formula (8) in the first example is replaced with the following formula (9), and details are not described herein.

$$P(x,y)=((32-f) \times R(x+i,-1)+f \times R(x+i+1,-1)+16)>>5 \quad (9)$$

(x, y) represents coordinates of the current sub-block relative to an upper-left sub-block of the current picture block. $R(x+i, -1)$ and $R(x+i+1, -1)$ represent motion vectors of two target reference blocks that neighbor each other. Correspondingly, (32−f) and f represent weighting factors of the two target reference blocks. P(x, y) represents a motion vector of the current sub-block.

It can be learned from the foregoing that, in an inter prediction process based on the inter-frame direction prediction mode used for a directional motion field in this embodiment of this application, motion vectors of one or more sub-blocks in a prediction direction are the same, and a value of the motion vector depends on a motion vector of a target reference block such that a motion vector of a picture block with a directional motion field or a sub-block of such a picture block can be better predicted, thereby improving motion vector prediction accuracy.

In an example of this application, motion information of each reference block (for example, a spatially adjacent reference block or a temporally adjacent reference block) (that is, each group of motion information) may include a motion vector, a reference picture list, and a reference picture index corresponding to the reference picture list. A reference picture index is used to identify a reference picture to which a motion vector in a specified reference picture list (RefPicList0 or RefPicList1) points. A motion vector refers to location offsets in a horizontal direction and a vertical direction, that is, a horizontal component of the motion vector and a vertical component of the motion vector.

To improve motion vector prediction effectiveness, regardless of which new inter prediction mode is used to predict the motion information of the one or more sub-blocks in the current picture block, before a linear interpolation, weighting, or averaging is performed on a plurality of groups of motion information, the video encoder 100 or the video decoder 200 (specifically the inter predictor 110 or the inter predictor 210) may further be configured to (or the method in the embodiments of this application may further include) determine a target reference picture index, of the current picture block, corresponding to a specified reference picture list, where the specified reference picture list herein may be a reference picture list 0 or a reference picture list 1, and the target reference picture index herein may be 0, 1, or another index, or may be a reference picture index that is most frequently used in the specified reference picture list, for example, a reference picture index that is pointed to by motion vectors of all reference blocks or weighted motion vectors of reference blocks/most frequently used, determine whether a reference picture index that is included in each of the plurality of groups of motion information and that corresponds to the specified reference picture list is the same as the target reference picture index, and if a reference picture index that is included in current motion information and that corresponds to the specified reference picture list is different from the target reference picture index, perform time-domain-distance-based scaling processing on a motion vector that is included in the current motion information and that corresponds to the specified reference picture list, to obtain a motion vector that points to a reference frame corresponding to the target reference picture index.

In an example, the motion vector is proportionally scaled based on a time distance between a current picture and a reference picture that is indicated by the reference picture index in the current motion information and a time distance between the current picture and a reference picture that is indicated by the target reference picture index.

For example, before an interpolation is performed on motion vectors of a plurality of reference blocks, if reference picture indexes that are respectively included in motion information of the plurality of reference blocks and that correspond to the list 0 are different, for example, a reference picture index, of a first reference block, corresponding to the list 0 is 0, and a reference picture index, of a second reference block, corresponding to the list 0 is 1, and when it is assumed that a reference picture index, of the current picture block, corresponding to the list 0 is 0, time-domain-distance-based scaling is performed on a motion vector (corresponding to the list 0) of the second reference block, to obtain a motion vector that points to a reference frame indicated by the reference picture index 0.

In another example of this application, for some inter-frame direction prediction modes, before the motion vector of the current sub-block is derived using the motion vector of the target reference block, to reduce a contour effect of the motion information of the current block caused by an edge effect of the motion information of the reference block, the video encoder 100 or the video decoder 200 may further be configured to (or the method in the embodiments of this application may further include) selectively filter the motion information of the target reference block based on a prediction direction or angle corresponding to the inter-frame direction prediction mode. For example, when the determined inter prediction mode is the inter-frame direction prediction mode 2, 6, or 10 with a relatively large angle, the motion vector of the target reference block is filtered before the motion vector of the current sub-block is derived using the motion vector of the target reference block. For example, motion information of an adjacent reference block may be used to filter the motion information of the target reference block using a filter of $\{1/4, 2/4, 1/4\}$, where the adjacent reference block is an adjacent reference block that is directly adjacent to the target reference block (for example, is adjacent to the target reference block on a left or right side, or is adjacent to the target reference block on top or bottom).

In particular, the motion information of the target reference block may be selectively filtered based on a block size and the prediction direction or angle corresponding to the inter-frame direction prediction mode. For example, a larger block and an inter-frame direction prediction mode with a larger angle indicates greater necessity of performing filtering processing in advance before the motion vector of the current sub-block is derived using the motion vector of the target reference block.

In still another example of this application, considering that motion vectors of a plurality of sub-blocks (for example, sub-blocks that neighbor each other on top/bottom) at a boundary of the current picture block may be different (discontinuous), and therefore prediction blocks obtained from a reference picture are not adjacent to each other in the reference picture, which results in discontinuity between the prediction blocks of the boundary sub-blocks, causing discontinuity of residuals and affecting residual picture encoding/decoding performance, filtering of the motion vectors of the sub-blocks at the boundary of the picture block is considered.

Correspondingly, the video encoder 100 or the video decoder 200 may further be configured to (or the method in the embodiments of this application may further include) filter motion information of a boundary sub-block of the current picture block, where the boundary sub-block is one or more sub-blocks located at the boundary of the current picture block. In particular, motion information of the boundary sub-block of the current picture block in a specific inter prediction mode (for example, the second inter prediction mode, a vertical prediction mode, or a horizontal prediction mode) is filtered. Optionally, filtering may be performed using a filter of $\{1/4, 3/4\}$ or $\{1/4, 2/4, 1/4\}$ such that a motion vector of the boundary sub-block changes more smoothly. It should be understood that this application is not limited thereto.

Figure 11:
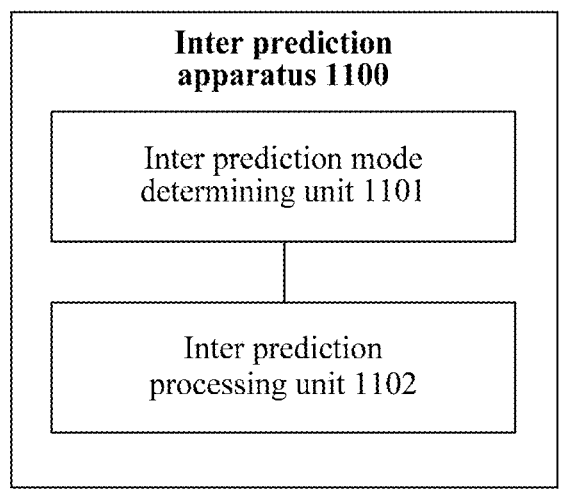
FIG. 11 is a schematic block diagram of a video picture inter prediction apparatus according to an embodiment of this application.

FIG. 11 is a schematic block diagram of an inter prediction apparatus 1100 according to an embodiment of this application. It should be noted that the inter prediction apparatus 1100 is not only applicable to inter prediction for decoding a video picture, but also applicable to inter prediction for encoding a video picture. It should be understood that the inter prediction apparatus 1100 herein may correspond to the inter predictor 110 in FIG. 2A, or may correspond to the inter predictor 210 in FIG. 2B. The inter prediction apparatus 1100 may include an inter prediction mode determining unit 1101 configured to determine an inter prediction mode used to perform inter prediction on a current picture block, where the inter prediction mode is one mode in a candidate inter prediction mode set, and the candidate inter prediction mode set includes a plurality of inter prediction modes used for a non-directional motion field and/or a plurality of inter prediction modes used for a directional motion field, and an inter prediction processing unit 1102 configured to perform inter prediction on the current picture block based on the determined inter prediction mode.

In a feasible implementation, the inter prediction processing unit 1102 is configured to predict motion information of one or more sub-blocks (which may specifically be each sub-block or all sub-blocks) in the current picture block based on the determined inter prediction mode, and perform inter prediction on the current picture block using the motion information of the one or more sub-blocks in the current picture block. It should be understood that, after a motion vector of the one or more sub-blocks in the current picture block is obtained through prediction, a prediction block of the corresponding sub-block may be generated through a motion compensation process, to obtain a prediction block of the current picture block.

It can be learned from the foregoing that the inter prediction apparatus in this embodiment of this application can predict the motion information (for example, the motion vector) of the one or more sub-blocks in the current picture block based on any one of the inter prediction modes used for a directional motion field or a non-directional motion field. In this way, from a perspective of a result, the predicted motion vector of the current picture block is basically close to a motion vector obtained using a motion estimation method. Therefore, a MVD does not need to be transmitted during encoding such that a bit rate is reduced with video quality unchanged. Therefore, encoding and decoding performance of the inter prediction apparatus in this embodiment of this application is further improved.

In some possible implementation scenarios, if the inter prediction mode determining unit 1101 determines a first inter prediction mode used for a non-directional motion field (a planar mode used for inter prediction), the inter prediction processing unit 1102 is configured to predict or derive first motion information of a right-side adjacent block, of the current picture block, in a same row as a current sub-block of the current picture block, predict or derive second motion information of a lower adjacent block, of the current picture block, in a same column as the current sub-block, obtain a first predicted value of motion information of the current sub-block based on a linear interpolation of the first motion information and third motion information of a left-side adjacent block, of the current picture block, in the same row as the current sub-block, obtain a second predicted value of the motion information of the current sub-block based on a linear interpolation of the second motion information and fourth motion information of an upper adjacent block, of the current picture block, in the same column as the current sub-block, and determine the motion information of the current sub-block using the first predicted value of the motion information of the current sub-block and the second predicted value of the motion information of the current sub-block.

In some feasible implementations, in terms of the predicting (deriving) first motion information of a right-side adjacent block, of the current picture block, in a same row as a current sub-block of the current picture block, the inter prediction processing unit 1102 is configured to obtain the first motion information based on a linear interpolation of fifth motion information of a lower-right spatially-adjacent block of a first co-located block of the current picture block and sixth motion information of an upper-right spatially-adjacent block of the current picture block, where the first co-located block is a picture block that is in a reference picture and whose size, shape, and coordinates are the same as those of the current picture block, or determine motion information of a first right-side spatially-adjacent block of a first co-located block of the current picture block as the first motion information, where a row in which the first right-side spatially-adjacent block is located in the first co-located block is the same as the row in which the current sub-block is located in the current picture block, or determine motion information of a second right-side spatially-adjacent block of a second co-located block of the current picture block as the first motion information, where the second co-located block is a picture block that is in a reference picture and that has a specified location offset from the current picture block, a motion vector of a representative spatially-adjacent block of the current picture block is used to indicate the specified location offset, and a row in which the second right-side spatially-adjacent block is located in the second co-located block is the same as the row in which the current sub-block is located in the current picture block, or determine sixth motion information of an upper-right spatially-adjacent block of the current picture block as the first motion information, or determine an average value of motion information of two upper-right spatially-adjacent blocks of the current picture block as the first motion information.

In some feasible implementations, in terms of the obtaining second motion information of a lower adjacent block, of the current picture block, in a same column as the current sub-block, the inter prediction processing unit 1102 is configured to obtain the second motion information based on a linear interpolation of the fifth motion information of the lower-right spatially-adjacent block of the first co-located block of the current picture block and seventh motion information of a lower-left spatially-adjacent block of the current picture block, where the first co-located block is the picture block that is in the reference picture and whose size, shape, and coordinates are the same as those of the current picture block, or determine motion information of a first lower spatially-adjacent block of the first co-located block of the current picture block as the second motion information, where a column in which the first lower spatially-adjacent block is located in the first co-located block is the same as the column in which the current sub-block is located in the current picture block, or determine motion information of a second lower spatially-adjacent block of the second co-located block of the current picture block as the second motion information, where the second co-located block is the picture block that is in the reference picture and that has the specified location offset from the current picture block, the motion vector of the representative spatially-adjacent block of the current picture block is used to indicate the specified location offset, and a column in which the second lower spatially-adjacent block is located in the second co-located block is the same as the column in which the current sub-block is located in the current picture block, or determine seventh motion information of a lower-left spatially-adjacent block of the current picture block as the second motion information, or determine an average value of motion information of two lower-left spatially-adjacent blocks of the current picture block as the second motion information.

In a feasible implementation, in terms of the obtaining a first predicted value of motion information of the current sub-block based on a linear interpolation of the first motion information and third motion information of a left-side adjacent block, of the current picture block, in the same row as the current sub-block, the inter prediction processing unit 1102 is configured to determine, as the first predicted value of the motion information of the current sub-block, a weighted value of the first motion information of the right-side adjacent block, of the current picture block, in the same row as the current sub-block and the third motion information of the left-side adjacent block, of the current picture block, in the same row as the current sub-block, where a ratio of a weighting factor of the third motion information to a weighting factor of the first motion information is determined based on a ratio of a first distance between the right-side spatially-adjacent block, of the current picture block, in the same row as the current sub-block of the current picture block and the current sub-block to a second distance between the current sub-block and the left-side spatially-adjacent block, of the current picture block, in the same row as the current sub-block.

In terms of the obtaining a second predicted value of the motion information of the current sub-block based on a linear interpolation of the second motion information and fourth motion information of an upper adjacent block, of the current picture block, in the same column as the current sub-block, the inter prediction processing unit 1102 is configured to determine, as the second predicted value of the motion information of the current sub-block, a weighted value of the fourth motion information of the upper spatially-adjacent block, of the current picture block, in the same column as the current sub-block and the second motion information of the lower spatially-adjacent block, of the current picture block, in the same column as the current sub-block, where a ratio of a weighting factor of the fourth motion information to a weighting factor of the second motion information is determined based on a ratio of a third distance between the lower spatially-adjacent block, of the current picture block, in the same column as the current sub-block of the current picture block and the current sub-block to a fourth distance between the current sub-block and the upper spatially-adjacent block, of the current picture block, in the same column as the current sub-block.

It can be learned from the foregoing that, in an inter prediction process based on the first inter prediction mode used for a non-directional motion field (also referred to as the planar mode used for inter prediction) in this embodiment of this application, a motion vector of the current sub-block is derived using an average value of horizontal and vertical linear interpolations such that a motion vector of a picture block with a graded motion field or a sub-block of such a picture block can be better predicted, thereby improving motion vector prediction accuracy.

In some possible implementation scenarios, if the inter prediction mode determining unit determines a second inter prediction mode used for a non-directional motion field (a DC mode used for inter prediction), the inter prediction processing unit 1102 is configured to determine, as the motion information of the current sub-block, an average value of third motion information of a left-side spatially-adjacent block, of the current picture block, in a same row as the current sub-block of the current picture block and fourth motion information of an upper spatially-adjacent block, of the current picture block, in a same column as the current sub-block, or determine an average value of motion information of a plurality of left-side spatially-adjacent blocks of the current picture block and motion information of a plurality of upper spatially-adjacent blocks of the current picture block as the motion information of the one or more sub-blocks (which may be, for example, all sub-blocks) of the current picture block.

It can be learned that, in an inter prediction process based on the second inter prediction mode used for a non-directional motion field (also referred to as the DC mode used for inter prediction) in this embodiment of this application, a motion vector of the current sub-block is derived using an average value of motion vectors of the direct left-side spatially-adjacent block and the upper spatially-adjacent block of the current picture block such that a motion vector of a picture block with a smooth motion field or a sub-block of such a picture block can be better predicted, thereby improving motion vector prediction accuracy.

In some possible implementation scenarios, if the inter prediction mode determining unit determines an inter-frame direction prediction mode used for a directional motion field (a direction prediction mode used for inter prediction), the inter prediction processing unit 1102 is configured to determine motion information of one target reference block as motion information of a current sub-block of the current picture block, or determine a weighted value of motion information of two target reference blocks as the motion information of the current sub-block, or determine a weighted value of motion information of two target reference blocks and two adjacent blocks of the two target reference blocks as the motion information of the current sub-block, where the target reference block is a reference block that is determined in a reference row or a reference column based on a prediction direction (angle) corresponding to the inter-frame direction prediction mode and that corresponds to the current sub-block.

It can be learned that, in an inter prediction process based on the inter-frame direction prediction mode used for a directional motion field in this embodiment of this application, motion vectors of one or more sub-blocks in a prediction direction are the same, and a value of the motion vector depends on a motion vector of a target reference block such that a motion vector of a picture block with a directional motion field or a sub-block of such a picture block can be better predicted, thereby improving motion vector prediction accuracy.

In some feasible implementations, to improve motion vector prediction effectiveness, before a linear interpolation, weighting, or averaging is performed on a plurality of groups of motion information, the inter prediction processing unit 1102 is further configured to determine a target reference picture index, of the current picture block, corresponding to a specified reference picture list, determine whether a reference picture index that is included in each of the plurality of groups of motion information and that corresponds to the specified reference picture list is the same as the target reference picture index, and if a reference picture index that is included in current motion information and that corresponds to the specified reference picture list is different from the target reference picture index, perform time-domain-distance-based scaling processing on a motion vector that is included in the current motion information and that corresponds to the specified reference picture list, to obtain a motion vector that points to a reference frame corresponding to the target reference picture index.

When the apparatus 1100 is configured to decode a video picture, the apparatus 1100 may further include an inter prediction data obtaining unit (not shown in the figure) configured to receive inter prediction data that includes a first identifier used to indicate whether to perform inter prediction on the current picture block using the candidate inter prediction mode set.

Correspondingly, the inter prediction mode determining unit 1101 is configured to when the inter prediction data instructs to predict the current picture block using the candidate inter prediction mode set, determine, from the candidate inter prediction mode set, the inter prediction mode used to perform inter prediction on the current picture block.

Further, if the inter prediction data received by the inter prediction data obtaining unit further includes a second identifier used to indicate the inter prediction mode of the current picture block, the inter prediction mode determining unit 1101 is configured to determine that the inter prediction mode indicated by the second identifier is the inter prediction mode used to perform inter prediction on the current picture block.

If the inter prediction data received by the inter prediction data obtaining unit does not include a second identifier used to indicate the inter prediction mode of the current picture block, the inter prediction mode determining unit 1101 is configured to determine that the first inter prediction mode used for a non-directional motion field (also referred to as the planar mode used for inter prediction) is the inter prediction mode used to perform inter prediction on the current picture block.

When the apparatus 1100 is configured to encode a video picture, the apparatus 1100 may further include the inter prediction mode determining unit 1101 is configured to determine an inter prediction mode that is in the candidate inter prediction mode set and that has a smallest bit rate distortion cost for encoding the current picture block, as the inter prediction mode used to perform inter prediction on the current picture block.

It should be noted that modules in the inter prediction apparatus in this embodiment of this application are functional entities for implementing various execution steps included in the inter prediction method in this application, in an embodiment, functional entities that can implement all steps in the inter prediction method in this application and extensions and variants of these steps. For details, refer to descriptions of the inter prediction method in this specification. For brevity, details are not described in this specification.

Figure 12:
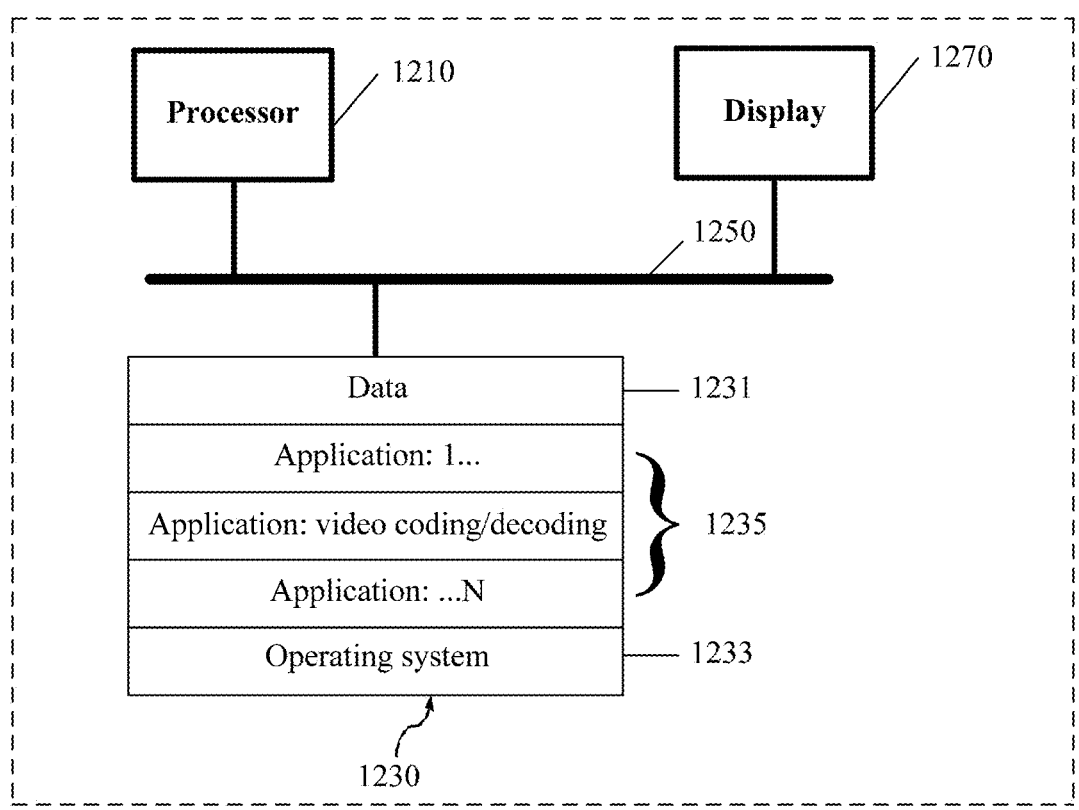
FIG. 12 is a schematic block diagram of an encoding device or a decoding device according to an embodiment of this application.

FIG. 12 is a schematic block diagram of an implementation of an encoding device or a decoding device (encoding/decoding device 1200) according to an embodiment of this application. The encoding/decoding device 1200 may include a processor 1210, a memory 1230, and a bus system 1250. The processor and the memory are connected to each other using the bus system. The memory is configured to store an instruction. The processor is configured to execute the instruction stored in the memory. The memory of the encoding/decoding device stores program code. The processor may invoke the program code stored in the memory, to perform the video coding or decoding methods described in this application, particularly video coding or decoding methods in various new inter prediction modes, and motion information prediction methods in various new inter prediction modes. To avoid repetition, details are not described herein.

In this embodiment of this application, the processor 1210 may be a central processing unit (CPU), or the processor 1210 may be another general purpose processor, a DSP, an ASIC, a FPGA or another programmable logic device, a discrete gate or transistor logic device, a discrete hardware component, or the like. The general purpose processor may be a microprocessor, or the processor may be any conventional processor or the like.

The memory 1230 may include a ROM device or a RAM device. Any other proper type of storage device may also be used as the memory 1230. The memory 1230 may include code and data 1231 that are accessed by the processor 1210 using the bus 1250. The memory 1230 may further include an operating system 1233 and an application program 1235. The application program 1235 includes at least one program that allows the processor 1210 to perform the video coding or decoding method described in this application (particularly the inter prediction method or the motion information prediction method described in this application). For example, the application program 1235 may include applications 1 to N, and further includes a video coding or decoding application (video coding/decoding application) that performs the video coding or decoding method described in this application.

The bus system 1250 may further include a power bus, a control bus, a status signal bus, and the like, in addition to a data bus. However, for clear description, in the figure, various types of buses are marked as the bus system 1250.

Optionally, the coding/decoding device 1200 may further include one or more output devices, for example, a display 1270. In an example, the display 1270 may be a touch display that combines a display and a touch unit that operably senses touch input. The display 1270 may be connected to the processor 1210 using the bus 1250.

A person skilled in the art can understand that, the functions described with reference to various illustrative logical blocks, modules, and algorithm steps disclosed and described in this specification can be implemented by hardware, software, firmware, or any combination thereof. If implemented by software, the functions described with reference to the various illustrative logical blocks, modules, and steps may be stored in or transmitted over a computer-readable medium as one or more instructions or code and executed by a hardware-based processing unit. The computer-readable medium may include a computer-readable storage medium, which corresponds to a tangible medium such as a data storage medium, or a communications medium including any medium that facilitates transfer of a computer program from one place to another (for example, according to a communications protocol). In this manner, the computer-readable medium generally may correspond to (1) a non-transitory tangible computer-readable storage medium or (2) a communications medium such as a signal or a carrier. The data storage medium may be any available medium that can be accessed by one or more computers or one or more processors to retrieve instructions, code, and/or data structures for implementing the technologies described in this application. A computer program product may include a computer-readable medium.

By way of example and not by way of limitation, such computer-readable storage media may include a RAM, a ROM, an EEPROM, a CD-ROM or another compact disc storage apparatus, a magnetic disk storage apparatus or another magnetic storage apparatus, a flash memory, or any other medium that can be used to store desired program code in a form of an instruction or a data structure and that can be accessed by a computer. In addition, any connection is properly termed a computer-readable medium. For example, if an instruction is transmitted from a website, server, or another remote source through a coaxial cable, a fiber optic cable, a twisted pair, a DSL, or wireless technologies such as infrared, radio, and microwave, the coaxial cable, fiber optic cable, twisted pair, DSL, or wireless technologies such as infrared, radio, and microwave are included in a definition of medium. However, it should be understood that the computer-readable storage medium and the data storage medium do not include connections, carriers, signals, or other transitory media, but actually means non-transitory tangible storage media. Disks and discs used in this specification include a compact disc (CD), a laser disc, an optical disc, a DVD, and a Blu-ray disc. The disks usually reproduce data magnetically, whereas the discs reproduce data optically with lasers. Combinations of the foregoing should also be included in the scope of computer-readable media.

An instruction may be executed by one or more processors such as one or more DSP, general purpose microprocessors, ASIC, FPGA, or other equivalent integrated or discrete logic circuits. Therefore, the term "processor" used in this specification may refer to any of the foregoing structures or any other structure suitable for implementing the technologies described in this specification. In addition, in some aspects, the functions described with reference to the various illustrative logical blocks, modules, and steps described in this specification may be provided in dedicated hardware and/or software modules configured for encoding and decoding, or may be incorporated into a combined codec. In addition, the technologies may be completely implemented in one or more circuits or logic elements.

The technologies in this application may be implemented in various apparatuses or devices, including a wireless handset, an integrated circuit (IC), or a set of ICs (for example, a chip set). Various components, modules, or units are described in this application to emphasize functional aspects of the apparatuses configured to perform the disclosed technologies, but are not necessarily implemented by different hardware units. Actually, as described above, various units may be combined, in combination with proper software and/or firmware, into a codec hardware unit, or be provided by interoperable hardware units (including one or more processors described above).

The foregoing descriptions are merely examples of specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A video picture inter prediction method, comprising:
    selecting an inter prediction mode from a candidate inter prediction mode set comprising a first inter prediction mode to predict a non-directional motion field and a second inter prediction mode to predict a directional motion field, wherein the inter prediction mode is to perform inter prediction on a current picture block;
    performing inter prediction on the current picture block based on the inter prediction mode;
    encoding the current picture block based on the inter prediction mode;
    encoding the current picture block and inter prediction data into an output bitstream, wherein the inter prediction data includes an identifier indicating to perform inter prediction on the current picture block using the candidate inter prediction mode set;
    determining a target reference picture index of the current picture block corresponding to a specified reference picture list; and
    performing time-domain-distance-based scaling processing on a motion vector that is in a group of motion information and that corresponds to the specified reference picture list to obtain another motion vector that points to a reference frame corresponding to the target reference picture index when a reference picture index that is in each of a plurality of groups of motion information and that corresponds to the specified reference picture list is different from the target reference picture index.

2. The video picture inter prediction method of claim 1, further comprising:
    predicting motion information of one or more sub-blocks in the current picture block based on the inter prediction mode; and
    performing inter prediction on the current picture block using the motion information of the one or more sub-blocks in the current picture block.

3. The video picture inter prediction method of claim 2, wherein the inter prediction mode is a first inter prediction mode used for the non-directional motion field, and wherein the video picture inter prediction method further comprises:
    predicting first motion information of a right-side spatially-adjacent block of the current picture block in a same row as a current sub-block of the current picture block;
    predicting second motion information of a lower spatially-adjacent block of the current picture block in a same column as the current sub-block of the current picture block;
    obtaining a first predicted value of motion information of the current sub-block based on a linear interpolation of the first motion information and third motion information of a left-side spatially-adjacent block of the current picture block in the same row as the current sub-block;
    obtaining a second predicted value of the motion information of the current sub-block based on a linear interpolation of the second motion information and fourth motion information of an upper adjacent block of the current picture block in the same column as the current sub-block; and
    determining the motion information of the current sub-block using the first predicted value and the second predicted value.

4. The video picture inter prediction method of claim 3, further comprising one of:
    obtaining the first motion information based on a linear interpolation of fifth motion information of a lower-right spatially-adjacent block of a first co-located block of the current picture block and sixth motion information of an upper-right spatially-adjacent block of the current picture block, wherein the first co-located block is a picture block that is in a reference picture and that has a same size, a same shape, and same coordinates as those of the current picture block;
    determining the first motion information based on a first right-side spatially-adjacent block of the first co-located block of the current picture block, wherein a first row in which the first right-side spatially-adjacent block is located in the first co-located block is the same as the row in which the current sub-block is located in the current picture block;
    determining the first motion information based on a second right-side spatially-adjacent block of a second co-located block of the current picture block, wherein the second co-located block is the picture block that is in the reference picture and that has a specified location offset from the current picture block, wherein a motion vector of a representative spatially-adjacent block of the current picture block indicates the specified location offset, and wherein a second row in which the second right-side spatially-adjacent block is located in the second co-located block is the same as the row in which the current sub-block is located in the current picture block;
    determining the sixth motion information as the first motion information; or
    determining an average value of motion information of a plurality of upper-right spatially-adjacent blocks of the current picture block as the first motion information.

5. The video picture inter prediction method of claim 3, further comprising one of:
    obtaining the second motion information based on a linear interpolation of fifth motion information of a lower-right spatially-adjacent block of a first co-located block of the current picture block and seventh motion information of a lower-left spatially-adjacent block of the current picture block, wherein the first co-located block is a picture block that is in a reference picture and has a same size, a same shape, and same coordinates as those of the current picture block;
    determining the second motion information based on a first lower spatially-adjacent block of the first co-located block of the current picture block, wherein a first column in which the first lower spatially-adjacent block is located in the first co-located block is the same as the column in which the current sub-block is located in the current picture block;
    determining the second motion information based on a second lower spatially-adjacent block of a second co-located block of the current picture block, wherein the second co-located block is a picture block that is in the reference picture and that has a specified location offset from the current picture block, wherein a motion vector of a representative spatially-adjacent block of the current picture block indicates the specified location offset, and wherein a second column in which the second lower spatially-adjacent block is located in the second co-located block is the same as the column in which the current sub-block is located in the current picture block;

determining the seventh motion information as the second motion information; or determining an average value of motion information of a plurality of lower-left spatially-adjacent blocks of the current picture block as the second motion information.

6. The video picture inter prediction method of claim 3, further comprising determining, as the first predicted value, a weighted value of the first motion information and the third motion information, wherein a ratio of a weighting factor of the third motion information to a weighting factor of the first motion information is based on a ratio of a first distance to a second distance, wherein the first distance is between the right-side spatially-adjacent block of the current picture block in the same row as the current sub-block of the current picture block and the current sub-block, and wherein the second distance is between the current sub-block and the left-side spatially-adjacent block of the current picture block in the same row as the current sub-block is the second distance.

7. The video picture inter prediction method of claim 2, wherein the inter prediction mode is a second inter prediction mode used for the non-directional motion field, and wherein the video picture inter prediction method further comprises:

determining, as the motion information of a current sub-block, an average value of third motion information of a left-side spatially-adjacent block of the current picture block in a same row as a current sub-block of the current picture block and fourth motion information of an upper spatially-adjacent block of the current picture block in a same column as the current sub-block; or determining an average value of motion information of a plurality of left-side spatially-adjacent blocks of the current picture block and motion information of a plurality of upper spatially-adjacent blocks of the current picture block as the motion information of the one or more sub-blocks in the current picture block.

8. The video picture inter prediction method of claim 2, wherein the inter prediction mode is an inter-frame direction prediction mode used for the directional motion field, and wherein the video picture inter prediction method further comprises:

determining motion information of one target reference block as motion information of a current sub-block of the current picture block;

determining a weighted value of motion information of two target reference blocks as motion information of the current sub-block of the current picture block; or determining the weighted value of the motion information of the two target reference blocks and two adjacent blocks of the two target reference blocks as motion information of the current sub-block of the current picture block, wherein the target reference block is from a reference row or a reference column based on a prediction direction corresponding to the inter-frame direction prediction mode and corresponds to the current sub-block.

9. The video picture inter prediction method of claim 3, further comprising determining, as the second predicted value, a weighted value of the fourth motion information and the second motion information, wherein a ratio of a weighting factor of the fourth motion information to a weighting factor of the second motion information is based on a ratio of a third distance to a fourth distance, wherein the third distance is between the lower spatially-adjacent block of the current picture block in the same column as the current sub-block of the current picture block and the current sub-block, and wherein the fourth distance is the current sub-block and an upper spatially-adjacent block of the current picture block in the same column as the current sub-block.

10. The video picture inter prediction method of claim 1, further comprising:

decoding a video picture;

decoding a bitstream to obtain the inter prediction data; and determining the inter prediction mode used to perform inter prediction on the current picture block from the candidate inter prediction mode set when the inter prediction data instructs to predict the current picture block using the candidate inter prediction mode set.

11. The video picture inter prediction method of claim 10, further comprising:

determining that the inter prediction mode indicated by a second identifier is the inter prediction mode used to perform inter prediction on the current picture block when the inter prediction data further comprises the second identifier used to indicate the inter prediction mode of the current picture block; or determining that a first inter prediction mode used for the non-directional motion field is the inter prediction mode used to perform inter prediction on the current picture block when the inter prediction data does not comprise the second identifier used to indicate the inter prediction mode of the current picture block.

12. The video picture inter prediction method of claim 1, further comprising:

determining the inter prediction mode that is in the candidate inter prediction mode set and that has a smallest bit rate distortion cost for encoding the current picture block as the inter prediction mode used to perform inter prediction on the current picture block.

13. The video picture inter prediction method of claim 1, wherein the inter prediction data further comprises a second identifier used to indicate the inter prediction mode of the current picture block.

14. A video picture inter prediction method, comprising:

selecting an inter prediction mode from a candidate inter prediction mode set comprising a first inter prediction mode to predict a non-directional motion field and a second inter prediction mode to predict a directional motion field, wherein the inter prediction mode is to perform inter prediction on a current picture block;

predicting motion information of each sub-block in the current picture block based on the inter prediction mode;

performing inter prediction on the current picture block using the motion information of each sub-block in the current picture block;

encoding the current picture block based on the inter prediction mode;

encoding the current picture block and inter prediction data into an output bitstream, wherein the inter prediction data includes an identifier indicating to perform inter prediction on the current picture block using the candidate inter prediction mode set;

determining a target reference picture index of the current picture block corresponding to a specified reference picture list; and performing time-domain-distance-based scaling processing on a motion vector that is in a group of motion information and that corresponds to the specified reference picture list to obtain another motion vector that points to a reference frame corresponding to the target reference picture index when a reference picture index that is in each of a plurality of groups of motion information and that corresponds to the specified reference picture list is different from the target reference picture index.

15. The video picture inter prediction method of claim 14, wherein the inter prediction mode is a first inter prediction mode used for a smooth or graded motion field, and wherein the video picture inter prediction method further comprises:

predicting first motion information of a right-side spatially-adjacent block of the current picture block in a same row as a current sub-block of the current picture block;

predicting second motion information of a lower spatially-adjacent block of the current picture block in a same column as the current sub-block of the current picture block;

obtaining a first predicted value of motion information of the current sub-block based on a linear interpolation of the first motion information and third motion information of a left-side adjacent block of the current picture block in the same row as the current sub-block;

obtaining a second predicted value of the motion information of the current sub-block based on a linear interpolation of the second motion information and fourth motion information of an upper adjacent block of the current picture block in the same column as the current sub-block; and determining the motion information of the current sub-block using the first predicted value and the second predicted value of the motion information of the current sub-block.

16. The video picture inter prediction method of claim 15, further comprising one of:

obtaining the first motion information based on a linear interpolation of fifth motion information of a lower-right spatially-adjacent block of a first co-located block of the current picture block and sixth motion information of an upper-right spatially-adjacent block of the current picture block, wherein the first co-located block is a picture block that is in a reference picture and has a same size, a same shape, and same coordinates as those of the current picture block;

determining the first motion information based on a first right-side spatially-adjacent block of the first co-located block of the current picture block, wherein a first row in which the first right-side spatially-adjacent block is located in the first co-located block is the same as the row in which the current sub-block is located in the current picture block;

determining the first motion information based on a second right-side spatially-adjacent block of a second co-located block of the current picture block, wherein the second co-located block is the picture block that is in the reference picture and that has a specified location offset from the current picture block, wherein a motion vector of a representative spatially-adjacent block of the current picture block indicates the specified location offset, and wherein a second row in which the second right-side spatially-adjacent block is located in the second co-located block is the same as the row in which the current sub-block is located in the current picture block;

determining the sixth motion information as the first motion information; or determining an average value of motion information of a plurality of upper-right spatially-adjacent blocks of the current picture block as the first motion information.

17. The video picture inter prediction method of claim 15, further comprising one of:

obtaining the second motion information based on a linear interpolation of fifth motion information of a lower-right spatially-adjacent block of a first co-located block of the current picture block and seventh motion information of a lower-left spatially-adjacent block of the current picture block, wherein the first co-located block is a picture block that is in a reference picture and has a same size, a same shape, and same coordinates as those of the current picture block;

determining the second motion information based on a first lower spatially-adjacent block of the first co-located block of the current picture block, wherein a first column in which the first lower spatially-adjacent block is located in the first co-located block is the same as the column in which the current sub-block is located in the current picture block;

determining the second motion information based on a second lower spatially-adjacent block of a second co-located block of the current picture block, wherein the second co-located block is the picture block that is in the reference picture and that has a specified location offset from the current picture block, wherein a motion vector of a representative spatially-adjacent block of the current picture block indicates the specified location offset, and wherein a second column in which the second lower spatially-adjacent block is located in the second co-located block is the same as the column in which the current sub-block is located in the current picture block;

determining the seventh motion information as the second motion information; or determining an average value of motion information of a plurality of lower-left spatially-adjacent blocks of the current picture block as the second motion information.

18. The video picture inter prediction method of claim 15, further comprising one of:

determining, as the first predicted value, a weighted value of the first motion information and the third motion information, wherein a ratio of a weighting factor of the third motion information to a weighting factor of the first motion information is based on a ratio of a first distance between the right-side spatially-adjacent block of the current picture block in the same row as the current sub-block of the current picture block and the current sub-block to a second distance between the current sub-block and the left-side adjacent block of the current picture block in the same row as the current sub-block; or determining, as the second predicted value, a weighted value of the fourth motion information and the second motion information, wherein a ratio of a weighting factor of the fourth motion information to a weighting factor of the second motion information is based on a ratio of a third distance between the lower spatially-adjacent block of the current picture block in the same column as the current sub-block of the current picture block and the current sub-block to a fourth distance between the current sub-block and the upper adjacent block of the current picture block in the same column as the current sub-block.

19. A video picture inter prediction apparatus, comprising:
a processor; and
a memory coupled to the processor and storing instructions that, when executed by the processor, cause the video picture inter prediction apparatus to be configured to:
   select an inter prediction mode from a candidate inter prediction mode set comprising a first inter prediction mode to predict a non-directional motion field and a second inter prediction mode to predict a directional motion field, wherein the inter prediction mode is to perform inter prediction on a current picture block;
   perform inter prediction on the current picture block based on the inter prediction mode;
   encode the current picture block based on the inter prediction mode;
   encode the current picture block and inter prediction data into an output bitstream, wherein the inter prediction data includes an identifier indicating to perform inter prediction on the current picture block using the candidate inter prediction mode set;
   determine a target reference picture index of the current picture block corresponding to a specified reference picture list; and
   perform time-domain-distance-based scaling processing on a motion vector that is in a group of motion information and that corresponds to the specified reference picture list to obtain another motion vector that points to a reference frame corresponding to the target reference picture index when a reference picture index that is in each of a plurality of groups of motion information and that corresponds to the specified reference picture list is different from the target reference picture index.

20. The video picture inter prediction apparatus of claim 19, wherein the instructions further cause the video picture inter prediction apparatus to be configured to:
   predict motion information of one or more sub-blocks in the current picture block based on the inter prediction mode; and
   perform inter prediction on the current picture block using the motion information of the one or more sub-blocks in the current picture block.

* * * * *